(12) United States Patent
Higaki et al.

(10) Patent No.: US 9,948,194 B2
(45) Date of Patent: Apr. 17, 2018

(54) DC/DC CONVERTER INCLUDING PHASE SHIFT CONTROL

(71) Applicant: Mitsubishi Electric Corporation, Chiyoda-ku (JP)

(72) Inventors: Yusuke Higaki, Chiyoda-ku (JP); Ryota Kondo, Chiyoda-ku (JP); Masaki Yamada, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/524,124

(22) PCT Filed: Nov. 30, 2015

(86) PCT No.: PCT/JP2015/083610
§ 371 (c)(1),
(2) Date: May 3, 2017

(87) PCT Pub. No.: WO2016/125374
PCT Pub. Date: Aug. 11, 2016

(65) Prior Publication Data
US 2017/0358996 A1 Dec. 14, 2017

(30) Foreign Application Priority Data
Feb. 2, 2015 (JP) ................. 2015-018092

(51) Int. Cl.
*H02M 3/335* (2006.01)
*H02M 1/08* (2006.01)
*H02M 1/00* (2006.01)

(52) U.S. Cl.
CPC ....... *H02M 3/33584* (2013.01); *H02M 1/083* (2013.01); *H02M 2001/0048* (2013.01)

(58) Field of Classification Search
CPC ............ H02M 1/32; H02M 1/36; H02M 3/07; H02M 3/18; H02M 2001/007; H02M 2001/0048; H02M 2001/0058
See application file for complete search history.

(56) References Cited

U.S. PATENT DOCUMENTS

| 7,638,904 B2* | 12/2009 | Shoji ................. H02M 1/34 307/154 |
| 2012/0300502 A1 | 11/2012 | Shimada et al. |

(Continued)

FOREIGN PATENT DOCUMENTS

| JP | 2007-006653 A | 1/2007 |
| JP | 2012-249375 A | 12/2012 |

(Continued)

OTHER PUBLICATIONS

International Search Report dated Feb. 16, 2016 in PCT/JP2015/083610, filed Nov. 30, 2015.

*Primary Examiner* — Yusef Ahmed
(74) *Attorney, Agent, or Firm* — Oblon, McClelland, Maier & Neustadt, L.L.P.

(57) ABSTRACT

In a DC/DC converter, a first switching circuit is connected between a first winding of a transformer and a DC power supply, and a second switching circuit is connected between a second winding and a battery. In charging the battery, a control circuit controls respectively phase shift amounts of first and second diagonal elements in the first and second switching circuits relative to the drive phase of a first reference element in the first switching circuit. During a step-up charge control period, if charge current is positive or zero, the control circuit performs control so that the phase shift amount becomes greater than the phase shift amount by an amount exceeding a short-circuit prevention time for the (Continued)

switching elements, allowing step-up operation to be performed, improving controllability in step-up control.

13 Claims, 70 Drawing Sheets

(56) References Cited

U.S. PATENT DOCUMENTS

| | | | | |
|---|---|---|---|---|
| 2014/0078782 A1* | 3/2014 | Rosado | ............ | H02M 3/33584 363/17 |
| 2014/0104890 A1* | 4/2014 | Matsubara | ........ | H02M 3/33584 363/17 |
| 2014/0268903 A1* | 9/2014 | Reiter | ................ | H02M 3/3376 363/21.02 |
| 2015/0015181 A1* | 1/2015 | Kondo | ............. | H02M 3/33584 320/103 |
| 2015/0124490 A1* | 5/2015 | Sanuki | ............. | H02M 3/33546 363/17 |
| 2015/0372606 A1* | 12/2015 | Tamura | ............ | H02M 3/33584 363/21.04 |
| 2015/0381064 A1* | 12/2015 | Matsubara | ........ | H02M 3/33584 363/17 |
| 2016/0087545 A1* | 3/2016 | Higaki | ................. | H02J 7/0054 363/17 |
| 2016/0204707 A1* | 7/2016 | Takahara | ............ | H02M 1/4258 363/16 |
| 2016/0233777 A1* | 8/2016 | Murakami | ........ | H02M 3/33561 |
| 2016/0352253 A1* | 12/2016 | Liu | ................... | H02M 7/53871 |
| 2017/0310212 A1* | 10/2017 | Higaki | ................... | H02M 3/07 |

FOREIGN PATENT DOCUMENTS

| | | |
|---|---|---|
| JP | 2014-075944 A | 4/2014 |
| JP | 2014-087134 A | 5/2014 |
| WO | 2013/121665 A1 | 8/2013 |

\* cited by examiner

FIG. 21 CURRENT ROUTE IN PERIOD Ea

FIG. 23  CURRENT ROUTE IN PERIOD Ga

FIG. 25    CURRENT ROUTE IN PERIOD Ia

FIG. 40          CURRENT ROUTE IN PERIOD J+

FIG. 42 GATE PATTERN IN STEP-DOWN CHARGING

FIG. 50  CURRENT ROUTE IN PERIOD A−

DC/DC CONVERTER INCLUDING PHASE SHIFT CONTROL

TECHNICAL FIELD

The present invention relates to a DC/DC converter having a primary side and a secondary side isolated from each other via a transformer, and in particular, to a DC/DC converter that performs power transmission between two DC power supplies.

BACKGROUND ART

A conventional bidirectional DC/DC converter performs bidirectional power transmission between a first DC power supply and a second DC power supply, and includes: a transformer; a first converter unit which has a plurality of semiconductor switching elements, is connected between the first DC power supply and a first winding of the transformer, and performs power conversion between DC and AC; a second converter unit which has a plurality of semiconductor switching elements, is connected between the second DC power supply and a second winding of the transformer, and performs power conversion between DC and AC; and a control circuit which controls the semiconductor switching elements in the first and second converter units. The first and second converter units have capacitors connected in parallel to the respective semiconductor switching elements, and first and second reactors connected to AC input/output lines. In power transmission from the first DC power supply to the second DC power supply, the control circuit performs control so that the semiconductor switching elements in the first converter unit perform zero voltage switching, using the first reactor, and when voltage of the second DC power supply is higher than voltage generated at the second winding of the transformer, the control circuit performs control so that the second converter unit performs step-up operation, using the second reactor. In power transmission from the second DC power supply to the first DC power supply, the control circuit performs control so that the semiconductor switching elements in the second converter unit perform zero voltage switching, using the second reactor, and when voltage of the first DC power supply is higher than voltage generated at the first winding of the transformer, the control circuit performs control so that the first converter unit performs step-up operation, using the first reactor (see, for example, Patent Document 1).

CITATION LIST

Patent Document

Patent Document 1: International Publication No. WO2013/121665

SUMMARY OF THE INVENTION

Problems to be Solved by the Invention

The bidirectional DC/DC converter as disclosed in the above Patent Document 1 has a simple circuit configuration symmetric with respect to the transformer, and can achieve bidirectional power transmission through simple control.

However, drive signals for semiconductor switching elements in upper and lower arms are provided with a short-circuit prevention time which is a period during which these semiconductor switching elements are both turned off, in order to prevent short-circuit of the arms. During the short-circuit prevention time, step-up operation of the DC/DC converter cannot be performed, and thus a region in which transmission power cannot be controlled is present in the step-up operation region.

The present invention has been made to solve the above problem, and an object of the present invention is to provide a DC/DC converter that enables power transmission over a wide voltage range with a simple circuit configuration, prevents controllability in a step-up operation region from being deteriorated due to the short-circuit prevention time, and achieves output control with high reliability.

Solution to the Problems

A DC/DC converter according to the present invention performs power transmission between a first DC power supply and a second DC power supply, and includes: a transformer; a first converter unit formed by a full-bridge circuit including two bridge circuits each having a plurality of semiconductor switching elements to which antiparallel diodes are respectively connected, the first converter unit being connected between the first DC power supply and a first winding of the transformer; a second converter unit formed by a full-bridge circuit including two bridge circuits each having a plurality of semiconductor switching elements to which antiparallel diodes are respectively connected, the second converter unit being connected between the second DC power supply and a second winding of the transformer; a second reactor connected on an AC input/output line of the second converter unit; and a control circuit which calculates a duty cycle on the basis of transmission power from the first DC power supply to the second DC power supply and a command value therefor, and performs drive control of the semiconductor switching elements in the first converter unit and the second converter unit.

In first power transmission from the first DC power supply to the second DC power supply, in which the duty cycle is positive or zero, the control circuit controls a first phase shift amount which is a phase shift amount between drive signals for, among the plurality of semiconductor switching elements in the first converter unit, a semiconductor switching element as a first reference element, and a semiconductor switching element as a first diagonal element which is diagonal to the first reference element, and controls a second phase shift amount which is a phase shift amount between drive signals for the first reference element and a semiconductor switching element as a second diagonal element which is diagonal to a semiconductor switching element as a second reference element among the plurality of semiconductor switching elements in the second converter unit. In a case where the transmission power from the first DC power supply to the second DC power supply is positive or zero and step-up control is performed in which output voltage to the second DC power supply is higher than voltage generated at the second winding of the transformer, the control circuit performs control so that, irrespective of the duty cycle, the second phase shift amount becomes greater than the first phase shift amount by an amount exceeding a short-circuit prevention time for the semiconductor switching elements in the first and second converter units.

Another DC/DC converter according to the present invention performs bidirectional power transmission between a first DC power supply and a second DC power supply, and includes: a transformer; a first converter unit formed by a full-bridge circuit including a bridge circuit A and a bridge circuit B each having a plurality of semiconductor switching elements to which antiparallel diodes are respectively connected, the first converter unit being connected between the first DC power supply and a first winding of the transformer and performing bidirectional power conversion between DC and AC; a second converter unit formed by a full-bridge circuit including a bridge circuit C and a bridge circuit D each having a plurality of semiconductor switching elements to which antiparallel diodes are respectively connected, the second converter unit being connected between the second DC power supply and a second winding of the transformer and performing bidirectional power conversion between DC and AC; a first reactor and a second reactor connected on AC input/output lines of the first converter unit and the second converter unit, respectively; and a control circuit which calculates a duty cycle on the basis of transmission power from the first DC power supply to the second DC power supply and a command value therefor, and performs drive control of the semiconductor switching elements in the first converter unit and the second converter unit by PWM control.

In first power transmission from the first DC power supply to the second DC power supply, in which the duty cycle is positive or zero, the control circuit uses: a first control in which, when the duty cycle increases, an ON time tA of the semiconductor switching elements in the bridge circuit A and an ON time tB of the semiconductor switching elements in the bridge circuit B are increased at an equal value to maximum, and an ON time tC of the semiconductor switching elements in the bridge circuit C and an ON time tD of the semiconductor switching elements in the bridge circuit D are both kept at zero; and a second control in which the ON times tA and tB are kept maximum and the ON time tD is kept at zero, and the ON time tC is increased when the duty cycle increases, and in a case where voltage of the second DC power supply is higher than voltage generated at the second winding of the transformer, control is performed to provide a period for exciting the second reactor so that the second converter unit performs step-up operation.

In second power transmission from the second DC power supply to the first DC power supply, in which the duty cycle is negative, the control circuit uses: a third control in which, when the duty cycle increases in a negative direction, the ON time tC and the ON time tD are increased at an equal value to maximum, and the ON time tA and the ON time tB are both kept at zero; and a fourth control in which the ON times tC and tD are kept maximum and the ON time tB is kept at zero, and the ON time tA is increased, and in a case where voltage of the first DC power supply is higher than voltage generated at the first winding of the transformer, control is performed to provide a period for exciting the first reactor so that the first converter unit performs step-up operation. When the ON times to and tB are minimum in the first power transmission, and when the ON times tC and tD are minimum in the second power transmission, the control circuit switches between the first power transmission and the second power transmission.

Effect of the Invention

The DC/DC converters according to the present invention enable power transmission over a wide voltage range with a simple circuit configuration, prevent controllability in a step-up operation region from being deteriorated due to the short-circuit prevention time, and achieve output control with high reliability.

DESCRIPTION OF EMBODIMENTS

Embodiment 1

Hereinafter, embodiment 1 of the present invention will be described.

Figure 1:
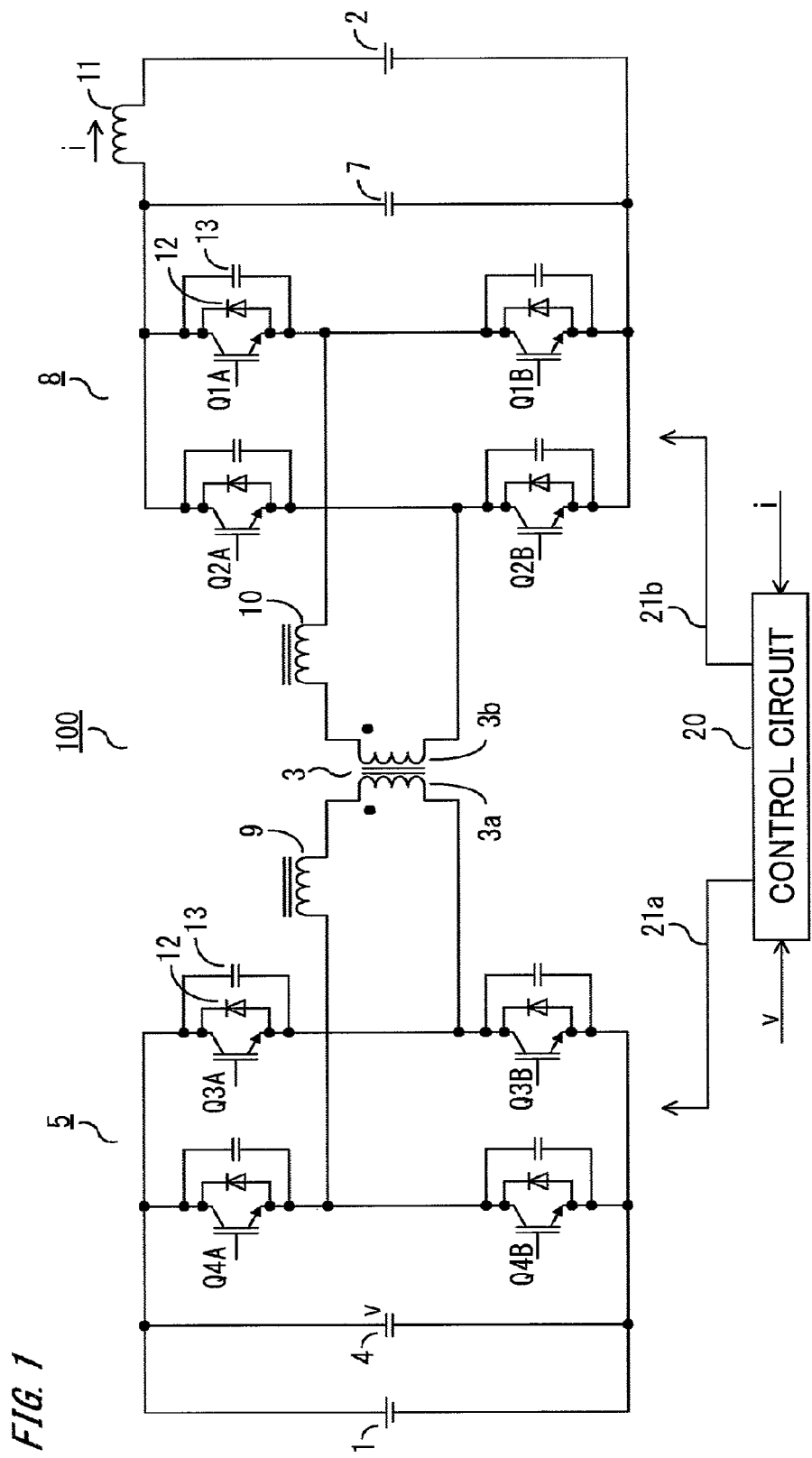
FIG. 1 is a circuit configuration diagram of a battery charge/discharge device according to embodiment 1 of the present invention.

FIG. 1 is a diagram showing the circuit configuration of a battery charge/discharge device 100 as a DC/DC converter according to embodiment 1 of the present invention. As shown in FIG. 1, the battery charge/discharge device 100 performs bidirectional power conversion between a DC power supply 1 as a first DC power supply and a battery 2 as a second DC power supply, to charge or discharge the battery 2.

The battery charge/discharge device 100 includes: a high-frequency transformer 3 (hereinafter, simply referred to as a transformer 3) as an isolation transformer; a first smoothing capacitor 4 connected in parallel to the DC power supply 1; a first switching circuit 5 as a first converter unit; a second smoothing capacitor 7 connected in parallel to the battery 2; a second switching circuit 8 as a second converter unit; and a first reactor 9 and a second reactor 10 connected on respective AC input/output lines of the first switching circuit 5 and the second switching circuit 8. The battery charge/discharge device 100 further includes a control circuit 20 for controlling the first switching circuit 5 and the second switching circuit 8.

The first switching circuit 5 is a full-bridge circuit having a plurality of semiconductor switching elements Q4A, Q4B, Q3A, Q3B (hereinafter, simply referred to as Q4A, Q4B, Q3A, Q3B or semiconductor switching elements Q) such as IGBT or MOSFET, to which diodes 12 are respectively connected in antiparallel, and has a DC side connected to the first smoothing capacitor 4 and an AC side connected to a first winding 3a of the transformer 3, to perform bidirectional power conversion between DC and AC. In addition, the first switching circuit 5 is a zero voltage switching circuit which allows voltage between both ends of each semiconductor switching element Q to be almost zero at the time of switching thereof, and a capacitor 13 is connected in parallel to each semiconductor switching element Q. The first reactor 9 is connected on the AC input/output line between the semiconductor switching elements Q and the transformer 3, and the first reactor 9 and the first winding 3a are connected in series.

The second switching circuit 8 is a full-bridge circuit having a plurality of semiconductor switching elements Q2A, Q2B, Q1A, Q1B (hereinafter, simply referred to as Q2A, Q2B, Q1A, Q1B or semiconductor switching elements Q) such as IGBT or MOSFET, to which diodes 12 are respectively connected in antiparallel, and has a DC side connected to the second smoothing capacitor 7 and an AC side connected to a second winding 3b of the transformer 3, to perform bidirectional power conversion between DC and AC. In addition, the second switching circuit 8 is a zero voltage switching circuit which allows voltage between both ends of each semiconductor switching element Q to be almost zero at the time of switching thereof, and a capacitor 13 is connected in parallel to each semiconductor switching element Q. The second reactor 10 is connected on the AC input/output line between the semiconductor switching elements Q and the transformer 3, and the second reactor 10 and the second winding 3b are connected in series. Further, a reactor 11 is connected to the DC side of the second switching circuit 8.

A current sensor (not shown) for detecting current flowing through the reactor 11 as charge current i (the arrow indicates the positive direction) of the battery 2 is provided between the second smoothing capacitor 7 and the battery 2, and the sensing output is inputted to the control circuit 20. A voltage sensor (not shown) for detecting voltage v of the first smoothing capacitor 4 is provided, and the sensing output is inputted to the control circuit 20. The control circuit 20 generates drive signals 21a, 21b for performing switching control of the semiconductor switching elements Q of the first switching circuit 5 and the second switching circuit 8, on the basis of the values of charge current i and voltage v that are inputted, thereby performing drive control of the first switching circuit 5 and the second switching circuit 8.

The current sensor for detecting charge current i of the battery 2 may be provided on the second switching circuit 8 side with respect to the second smoothing capacitor 7.

Next, operation of the battery charge/discharge device 100 will be described below.

Figure 2:
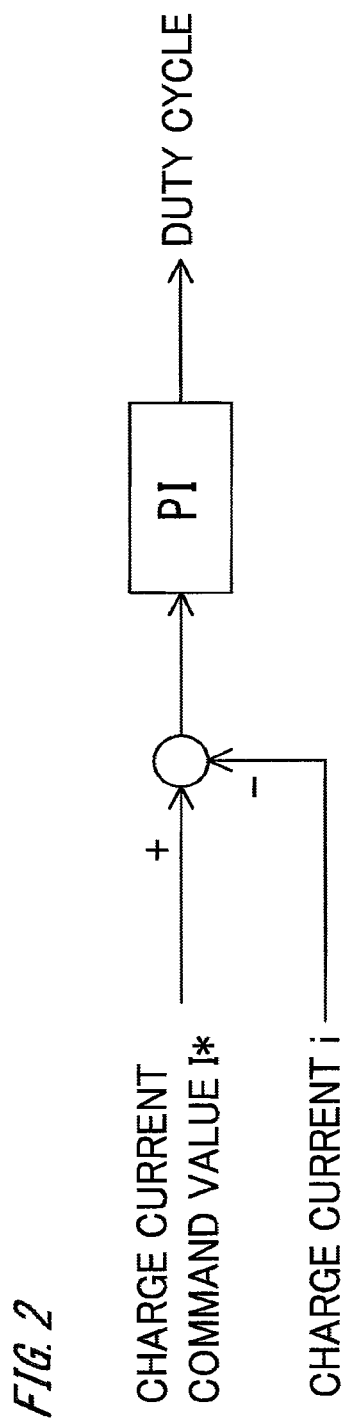
FIG. 2 is a control block diagram in the case where the battery charge/discharge device performs charging, according to embodiment 1 of the present invention.

FIG. 2 is a control block diagram in the case of transmitting power from the DC power supply 1 to the battery 2, i.e., charging the battery 2. The charge current i which is output current of the battery charge/discharge device 100 is detected and inputted to the control circuit 20. As shown in FIG. 2, in the control circuit 20, the inputted charge current i is subtracted from a charge current command value i* to calculate the difference therebetween, and feedback control is performed by a PI controller so that the difference approaches zero, thereby determining a duty cycle for the first switching circuit 5 and the second switching circuit 8. Then, the drive signals 21a, 21b for the semiconductor switching elements Q are generated on the basis of the duty cycle.

In the case of charging the battery 2, voltage of the first smoothing capacitor 4 connected in parallel to the DC power supply 1 is the same DC voltage as voltage of the DC power supply 1.

In the case of transmitting power from the battery 2 to the DC power supply 1, i.e., discharging from the battery 2, the charge current command value i* and the charge current i are negative. In this case, the operation is reverse to that in the case of supplying power from the DC power supply 1, and therefore the second smoothing capacitor 7 connected in parallel to the battery 2 is the same DC voltage as voltage of the battery 2.

Figure 3:
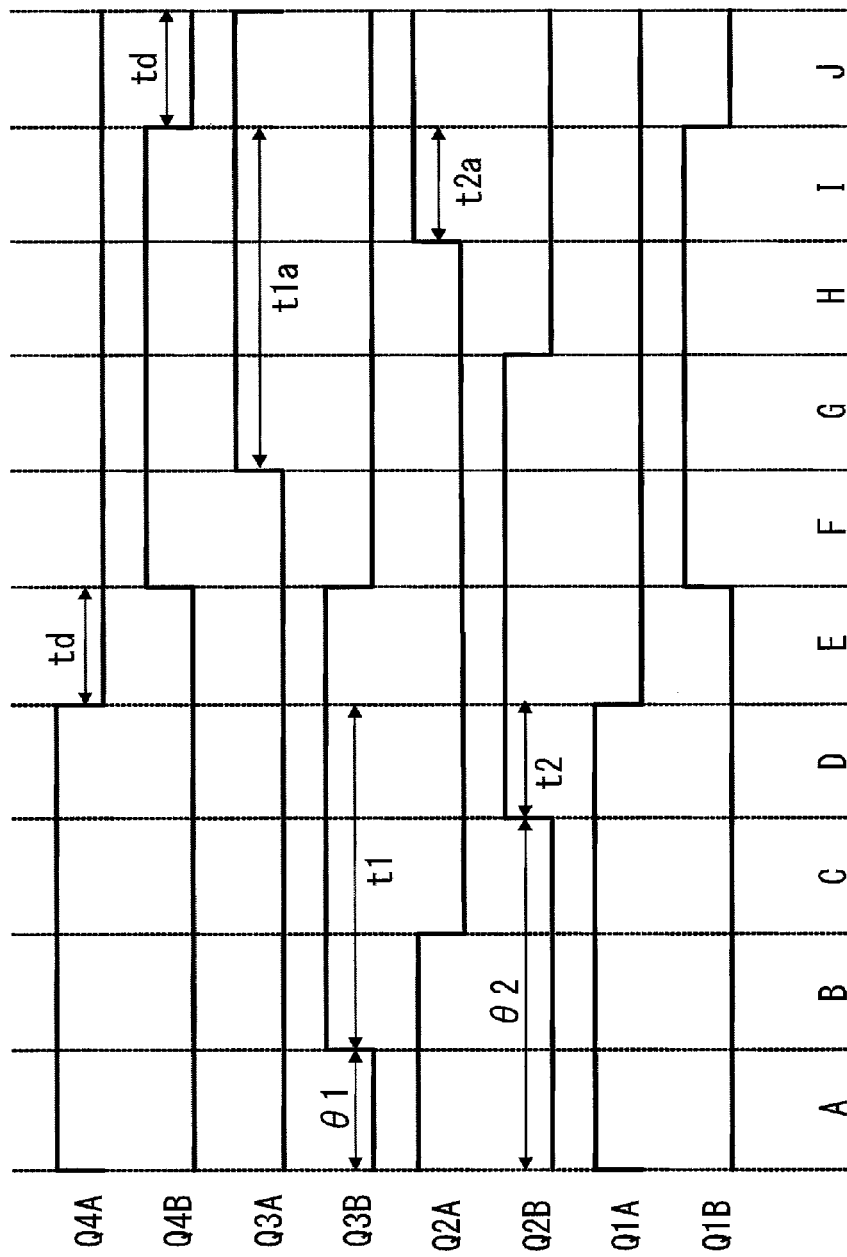
FIG. 3 is a waveform diagram of drive signals by a phase shift method in the battery charge/discharge device according to embodiment 1 of the present invention.

FIG. 3 is a diagram showing waveforms in one cycle of the drive signals 21a, 21b for the semiconductor switching elements Q of the first switching circuit 5 and the second switching circuit 8 in step-up charging of the battery charge/discharge device 100. In this case, drive signals by a phase shift method which controls a phase shift amount as described later are shown, and they are shown with periods A to J allocated for respective plurality of gate patterns which are combination patterns of the drive signals. In FIG. 3, for convenience sake, the drive signals for Q4A, Q4B, Q3A, Q3B, Q2A, Q2B, Q1A, Q1B are denoted by the reference characters of these elements.

In this case, Q4A in a first bridge circuit (Q4A, Q4B) which is one of the bridge circuits in the first switching circuit 5 is defined as a first reference element, Q1A in a second bridge circuit (Q1A, Q1B) which is one of the bridge circuits in the second switching circuit 8 is defined as a second reference element, and the first reference element Q4A and the second reference element Q1A are driven by drive signals having the same phase.

In addition, Q3B which is diagonal to the first reference element Q4A is defined as a first diagonal element, and Q2B which is diagonal to the second reference element Q1A is defined as a second diagonal element.

In the four bridge circuits in the first and second switching circuits 5 and 8, the positive-side (high-voltage side) Q4A, Q3A, Q2A, Q1A and the negative-side (low-voltage side) Q4B, Q3B, Q2B, Q1B composing the bridge circuits are each controlled at an ON time ratio of 50% excluding a short-circuit prevention time td, and the drive signal to the positive side and the drive signal to the negative side of each bridge circuit have waveforms with their phases inverted from each other by 180 degrees. The short-circuit prevention time td is set for preventing the positive-side semiconductor switching element and the negative-side semiconductor switching element from being turned on at the same time, and when the set short-circuit prevention time td has elapsed since one of the semiconductor switching elements was turned off, the other one is turned on. The setting is made such that, in order that the semiconductor switching elements Q of the first switching circuit 5 (or second switching circuit 8) on the power transmitting side perform zero voltage switching, voltage of the capacitor 13 connected in parallel to each semiconductor switching element Q increases to be voltage of the first smoothing capacitor 4 (or second smoothing capacitor 7) or decreases to be close to zero voltage, during the short-circuit prevention time td.

A phase shift amount θ1 (first phase shift amount) of the drive signal for the first diagonal element Q3B relative to the phase of the drive signal for the first reference element Q4A, and a phase shift amount θ2 (second phase shift amount) of the drive signal for the second diagonal element Q2B relative to the phase of the drive signal for the first reference element Q4A are determined in accordance with the duty cycle which is a control command. That is, the phase shift amounts θ1, θ2 are controlled in accordance with the duty cycle. Although the details of the control for the phase shift amounts θ1, θ2 will be described later, in this case, the phase shift amount θ1 is kept minimum, and the phase shift amount θ2 is changed in accordance with the duty cycle.

The period during which the first reference element Q4A and the first diagonal element Q3B are both ON is defined as a diagonal ON time t1, and the diagonal ON time t1 is determined by the phase shift amount θ1. A diagonal ON time t1a during which Q4B and Q3A are both ON is also equal to the diagonal ON time t1.

The period during which the second reference element Q1A and the second diagonal element Q2B are both ON is defined as a diagonal ON time t2, and the diagonal ON time t2 is determined by the phase shift amount θ2. A diagonal ON time t2a during which Q1B and Q2A are both ON is also equal to the diagonal ON time t2.

Since the battery charge/discharge device 100 has a circuit configuration symmetric with respect to the transformer 3, if the relationship between the phase shift amount θ1 and the phase shift amount θ2 shown in FIG. 3 is reversed, it is possible to control power transmission from the battery 2 to the DC power supply 1, that is, operation of discharging from the battery 2. In this case, the phase shift amount θ2 is kept minimum, and the phase shift amount θ1 is changed in accordance with the duty cycle.

Figure 4:
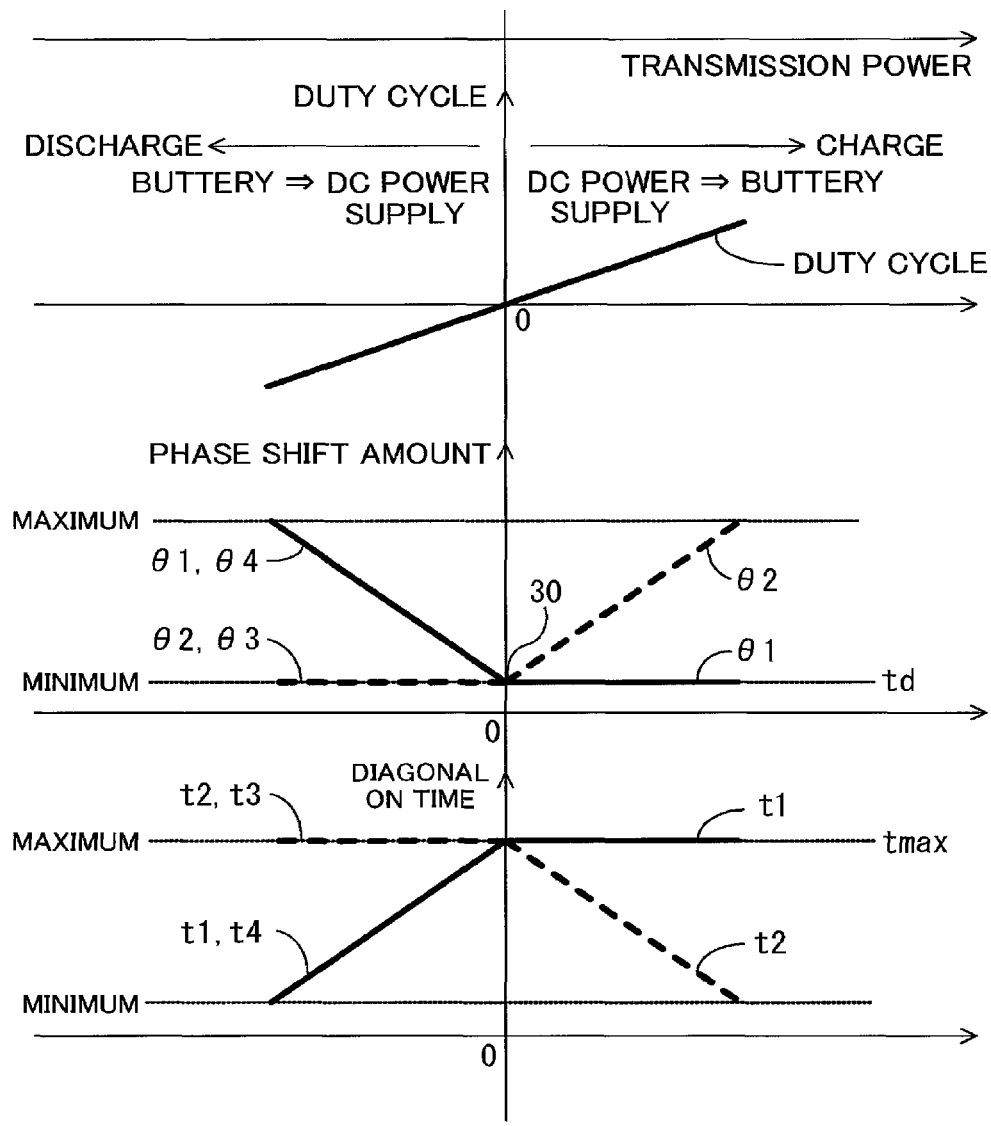
FIG. 4 is a waveform diagram illustrating basic control operation of the battery charge/discharge device according to embodiment 1 of the present invention.

FIG. 4 is a waveform diagram illustrating basic control operation of the battery charge/discharge device 100, and shows the phase shift amounts θ1, θ2 according to the duty cycle, and the diagonal ON times t1, t2. In this case, transmission power (charge power) from the DC power supply 1 to the battery 2 is positive, and the charge/discharge control involves step-up operation. The basic control operation is control operation at a stage before an offset phase described later is added.

As shown in FIG. 4, the duty cycle is determined in accordance with the transmission power. When the duty cycle is positive, the control circuit 20 performs charge control of keeping the phase shift amount θ1 minimum and changing the phase shift amount θ2, and when the duty cycle is negative, the control circuit 20 performs discharge control of keeping the phase shift amount θ2 minimum and changing the phase shift amount θ1. When the duty cycle is zero, i.e., at a reference point 30 at which the phase shift amounts θ1, θ2 are both minimum, the control circuit 20 switches between the charge control and the discharge control.

Although the point at which the duty cycle is zero is a point at which the control is switched between the charge control and the discharge control, it may be considered, for convenience sake, that charge control is performed when the duty cycle is positive or zero, and discharge control is performed when the duty cycle is negative. Power transmission by charge control is defined as first power transmission, and power transmission by discharge control is defined as second power transmission.

First, charge control in the case where the battery charge/discharge device 100 charges the battery 2 from the DC power supply 1 will be described.

A period during which power is transmitted from the first winding 3a to the second winding 3b of the transformer 3 and voltage is generated at the second winding 3b is the diagonal ON time t1 during which Q4A and Q3B are both ON and the diagonal ON time t1a during which Q4B and Q3A are both ON. In control for step-up charging, the control circuit 20 sets the diagonal ON time t1 (=t1a) to a maximum ON time tmax so that a period during which voltage is applied to the first winding 3a of the transformer 3 is maximized. The maximum ON time tmax is set on the basis of the short-circuit prevention time td needed for each semiconductor switching element Q of the first switching circuit 5 to perform zero voltage switching. In this case, the phase shift amount θ1 of the drive signal for Q3B relative to the phase of the drive signal for Q4A is minimum, and equal to the short-circuit prevention time td.

In the step-up charging, a period during which the second reactor 10 is excited by the second switching circuit 8 is present in the diagonal ON time (t1, t1a) during which voltage is applied to the transformer 3. That is, the phase shift amount θ2 of the drive signal for the second diagonal element Q2B relative to the phase of the drive signal for Q4A is equal to or greater than the phase shift amount θ1, and a reference point 30 at which both phase shift amounts θ1 and θ2 are minimum (short-circuit prevention time td) is set as a base point. When the duty cycle increases, the control circuit 20 increases the phase shift amount θ2 while keeping the phase shift amount θ1 minimum.

It is noted that discharge control can be performed by reversing the relationship between the phase shift amount θ1 and the phase shift amount θ2 and reversing the relationship between the diagonal ON time t1 and the diagonal ON time t2, and therefore the description thereof is omitted.

In this case, since the drive signal for the first reference element Q4A is the same as the drive signal for the second reference element Q1A, in discharge control, a phase shift amount θ3 (third phase shift amount) of the drive signal for the second diagonal element Q2B relative to the phase of the drive signal for the second reference element Q1A is the same as the phase shift amount θ2 thereof relative to the drive signal for the first reference element Q4A. Similarly, in discharge control, a phase shift amount θ4 (fourth phase shift amount) of the drive signal for the first diagonal element Q3B relative to the phase of the drive signal for the second reference element Q1A is the same as the phase shift amount θ1 thereof relative to the drive signal for the first reference element Q4A.

In the phase shift method, the duty cycle does not necessarily become zero at a time when the transmission power becomes zero and the operation actually switches between charging and discharging. The power when the duty cycle becomes zero changes depending on an input/output voltage condition or the turns ratio which is the ratio between the number of turns of the first winding 3a and the number of turns of the second winding 3b of the transformer 3.

Figure 5:
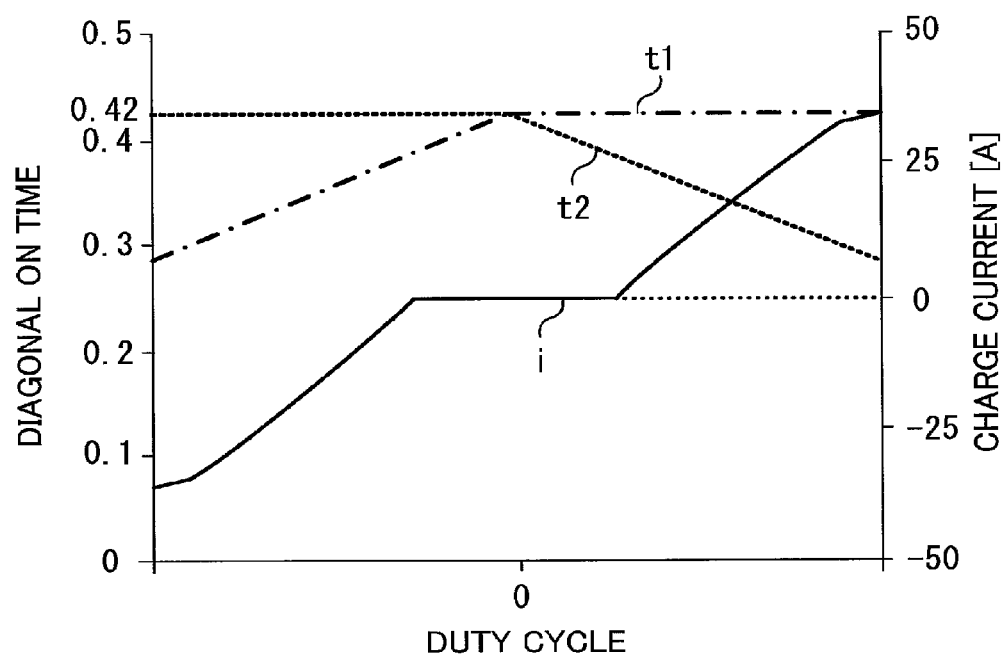
FIG. 5 is a waveform diagram showing charge current in basic control operation of the battery charge/discharge device according to embodiment 1 of the present invention.

FIG. 5 shows transition of the charge current i when the diagonal ON times t1, t2 are changed as shown in FIG. 4. In this case, the voltage values of the DC power supply 1 and the battery 2 are set to be equal to each other, the turns ratio of the transformer 3 is set at 1:1, and the short-circuit prevention time td is set at 4% of the switching cycle. The diagonal ON times t1, t2 and the short-circuit prevention time td are shown, being normalized such that the switching cycle is 1. The short-circuit prevention time td is set on the basis of the switching speed of the semiconductor switching elements. In general, the switching speed is written on a data sheet disclosed by a semiconductor manufacturer.

When the charge current i has a positive value, the polarity of transmission power from the DC power supply 1 to the battery 2 is also positive and the battery 2 is charged. When the charge current i has a negative value, the polarity of transmission power from the DC power supply 1 to the battery 2 is also negative and the battery 2 is discharged. In FIG. 5, at the point at which the control switches between the charge control and the discharge control, i.e., when the duty cycle is zero, the charge current i is zero and the transmission power is zero.

As shown in FIG. 5, in the basic control operation before the offset phase is added, there is a period during which the charge current i remains at a constant value even though the diagonal ON times t1, t2 are changed. In step-up operation, it is necessary to, by setting one of the diagonal ON times t1, t2 at the maximum ON time tmax (0.42) and decreasing the other one, provide a period during which only one of the positive-side and negative-side semiconductor switching elements is turned on, and generate a route (circulation route) through which current circulates, thereby exciting the first reactor 9 or the second reactor 10. At this time, if such an operation overlaps the short-circuit prevention time td of the bridge circuit, since the positive-side and negative-side semiconductor switching elements are both turned off, the circulation route of current cannot be generated, and the first reactor 9 or the second reactor 10 cannot be excited. Thus, there is a period during which step-up operation cannot be performed due to the short-circuit prevention time td and the charge current i continues to have a constant value (in this case, zero).

In FIG. 3, the phase shift amounts θ1, θ2 satisfy a relationship of θ2>θ1+td, and the diagonal ON times t1, t2 satisfy a relationship of t1>t2+td. In this case, step-up charging operation is performed without a problem due to the short-circuit prevention time td.

FIG. 6 to FIG. 15 show current routes according to the respective gate patterns in FIG. 3. FIG. 6 to FIG. 15 respectively correspond to the periods B to J and then the period A in FIG. 3, in this order.

Hereinafter, operation of the battery charge/discharge device 100 in one cycle will be described with reference to FIG. 3 and FIG. 6 to FIG. 15. For convenience sake, the description will be started from the period B.

Figure 6:
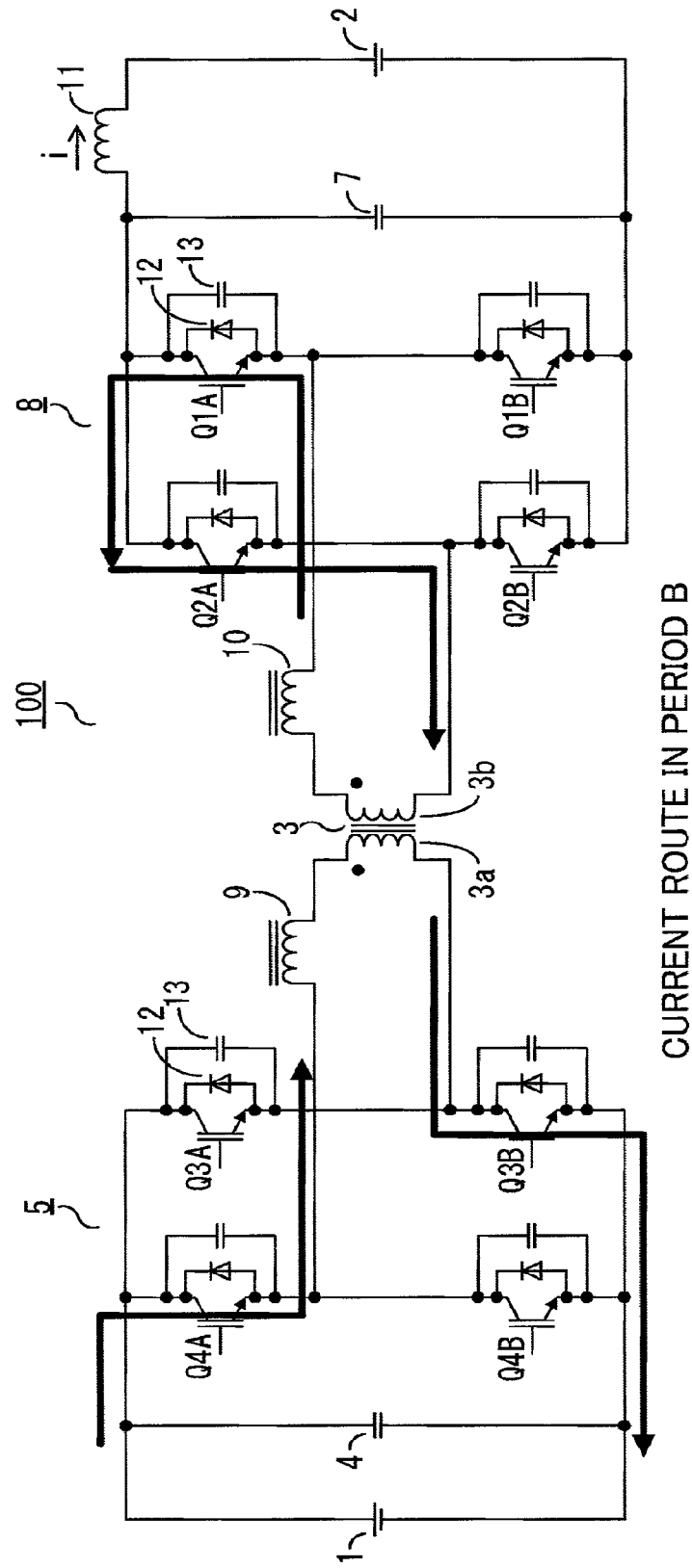
FIG. 6 is a current route diagram illustrating charging operation of the battery charge/discharge device according to embodiment 1 of the present invention.

During the period B, in the first switching circuit 5, Q4A and Q3B are ON and thus the diagonal two elements are conductive. Therefore, energy is transmitted via Q4A and Q3B from the DC power supply 1 side. In the second switching circuit 8, Q1A and Q2A are ON, and therefore current circulates via Q1A or the diode of Q1A, and Q2A. Thus, the period B is a period during which the first reactor 9 and the second reactor 10 are excited (FIG. 6).

Figure 7:
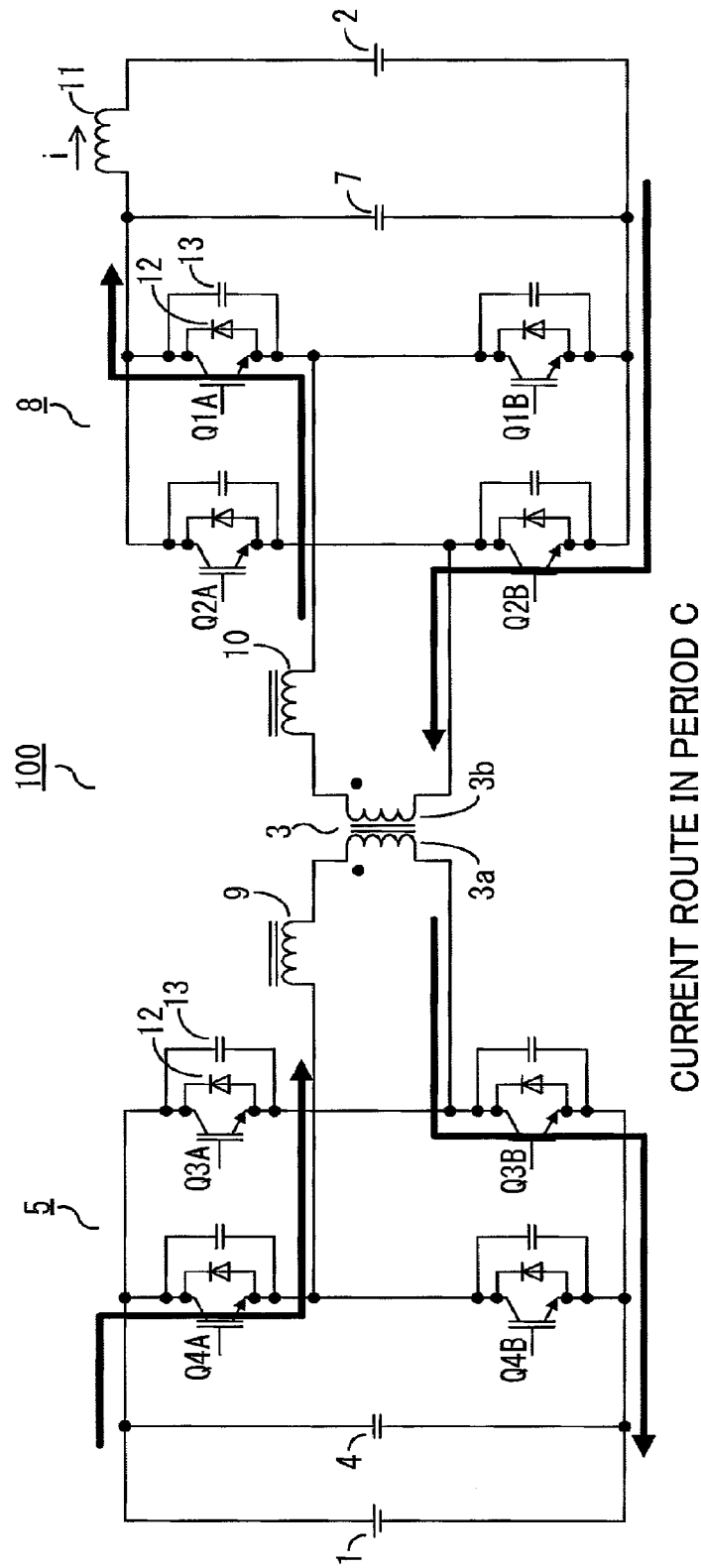
FIG. 7 is a current route diagram illustrating charging operation of the battery charge/discharge device according to embodiment 1 of the present invention.

During the period C, in the first switching circuit 5, Q4A and Q3B are ON and thus the diagonal two elements are conductive. Therefore, energy is transmitted from the DC power supply 1 side. In the second switching circuit 8, Q2A is turned off, current flows via the diode of Q2B from Q1A or the diode of Q1A, and power is transmitted to the battery 2 side. Thus, the period C is a period during which the excitation energy of the first reactor 9 and the second reactor 10 is transmitted to the battery 2 side (FIG. 7).

Figure 8:
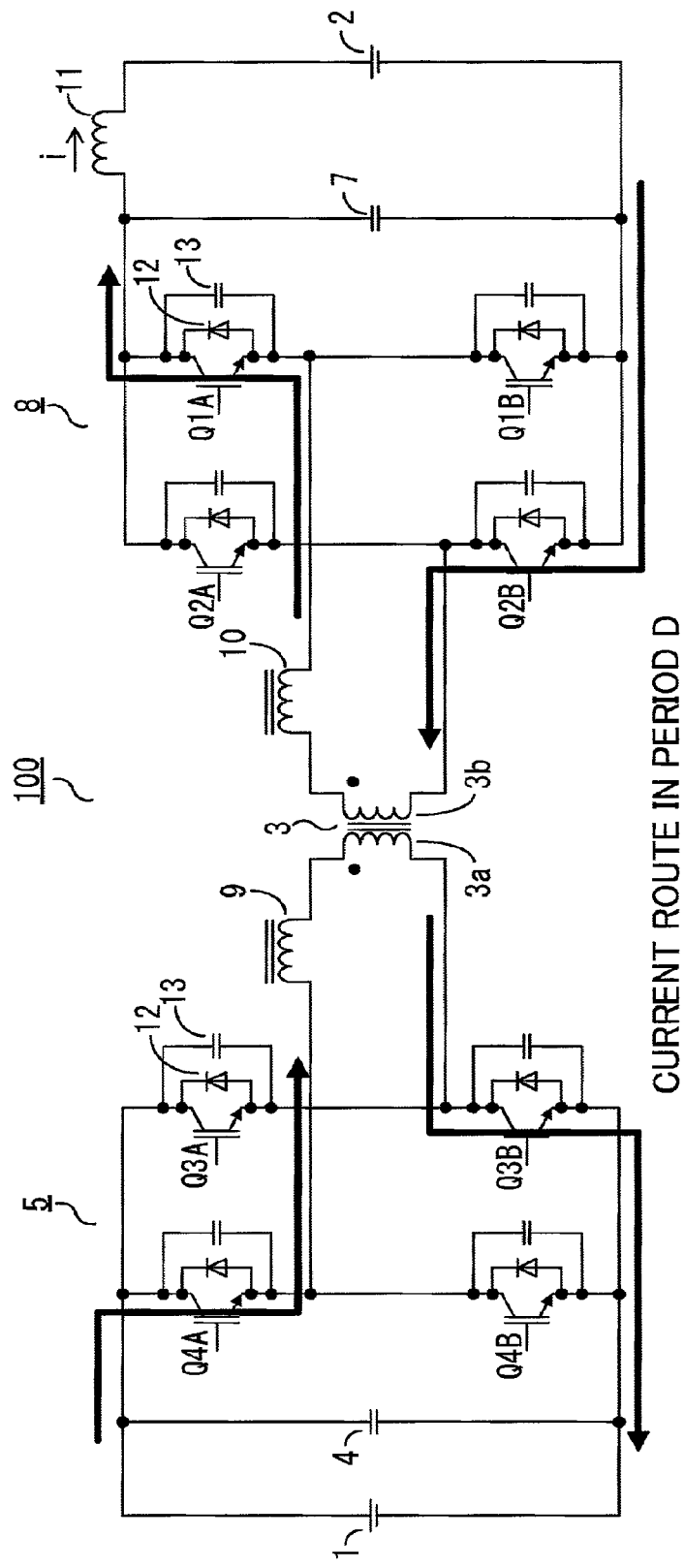
FIG. 8 is a current route diagram illustrating charging operation of the battery charge/discharge device according to embodiment 1 of the present invention.

During the period D, in the first switching circuit 5, Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from Q1A or the diode of Q1A, and power is transmitted to the battery 2 side. Thus, the period D is a period during which the excitation energy of the first reactor and the second reactor 10 is transmitted to the battery 2 side (FIG. 8).

Figure 9:
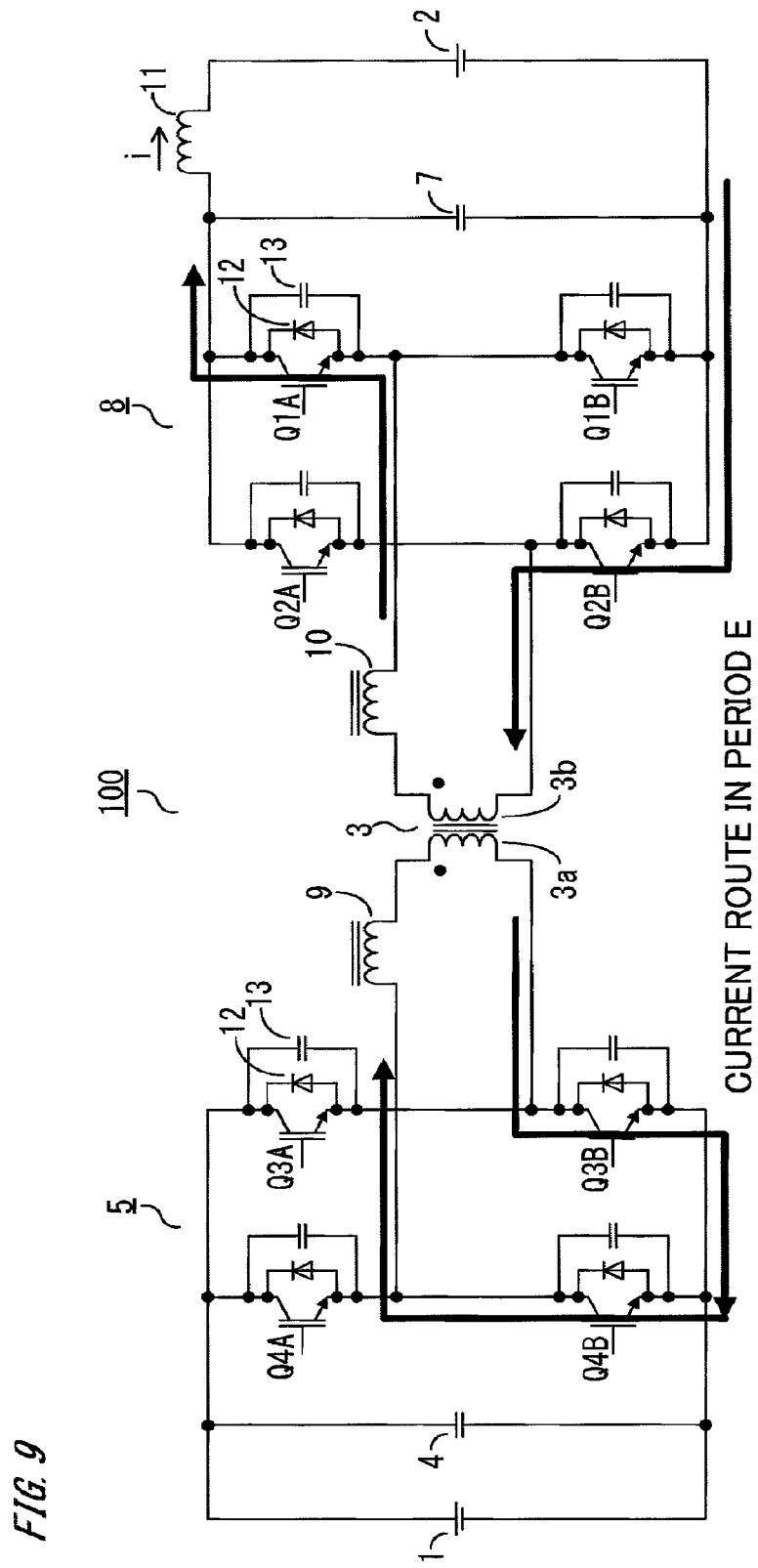
FIG. 9 is a current route diagram illustrating charging operation of the battery charge/discharge device according to embodiment 1 of the present invention.

During the period E, in the first switching circuit 5, Q4A is turned off and current circulates via the diode of Q4B, and Q3B. In the second switching circuit 8, Q1A is turned off, and the diode of Q1A, and Q2B or the diode of Q2B are ON. Therefore, the circulation current gradually decreases due to voltage of the battery 2. Thus, the period E is a period during which the circulation current decreases (FIG. 9).

Figure 10:
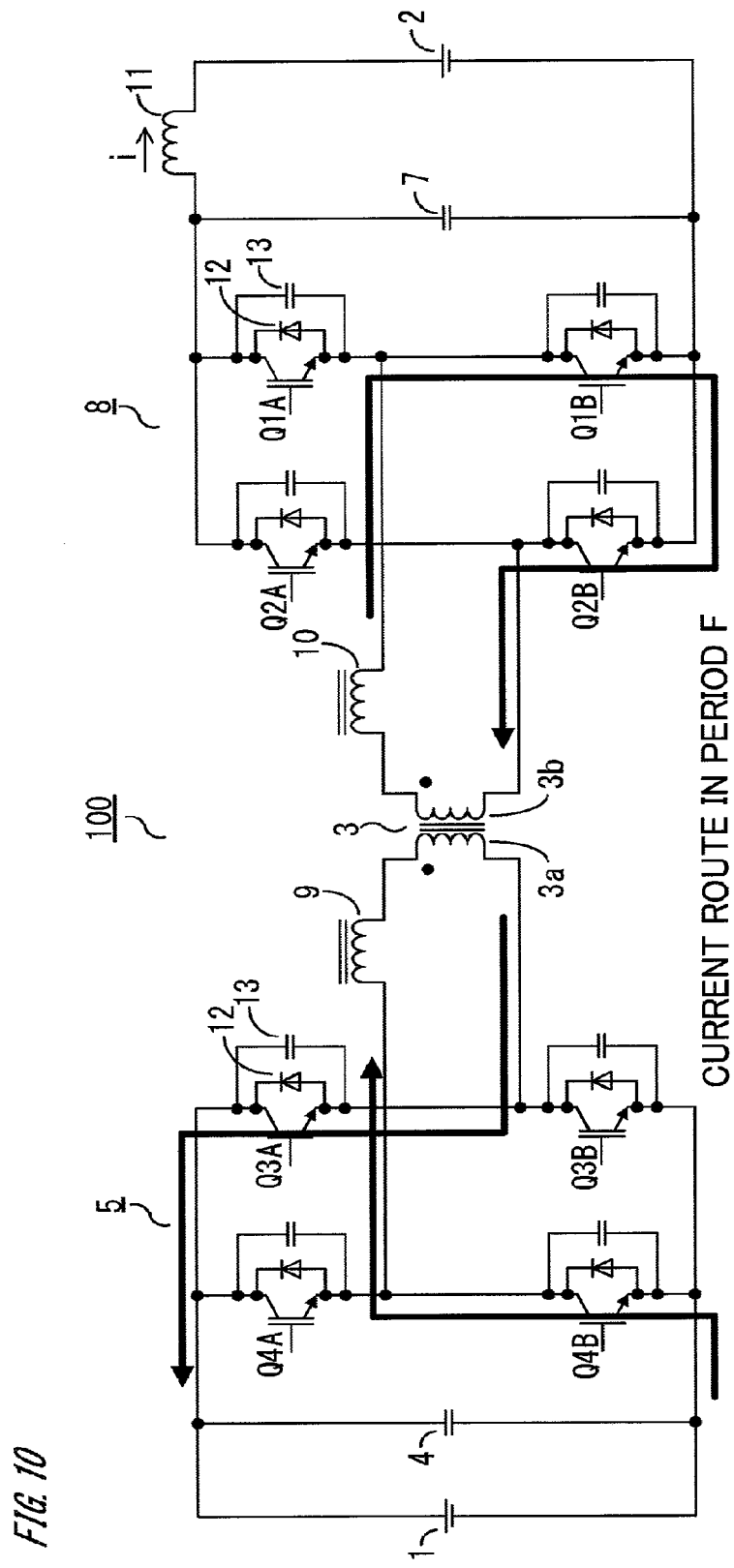
FIG. 10 is a current route diagram illustrating charging operation of the battery charge/discharge device according to embodiment 1 of the present invention.

During the period F, in the first switching circuit 5, Q3B is turned off and Q4B is turned on. Since Q4B is turned on from a diode conductive state, ZVS (zero voltage switching) is achieved. If, in the period E, the circulation current is greater than 0 [A], that is, some current remains, current is regenerated via Q4B or the diode of Q4B, and the diode of Q3A, to the DC power supply 1 side. In the second switching circuit 8, Q1B is turned on and therefore current circulates via Q1B, and Q2B or the diode of Q2B. Thus, the period F is a period during which the circulation current decreases (FIG. 10).

Figure 11:
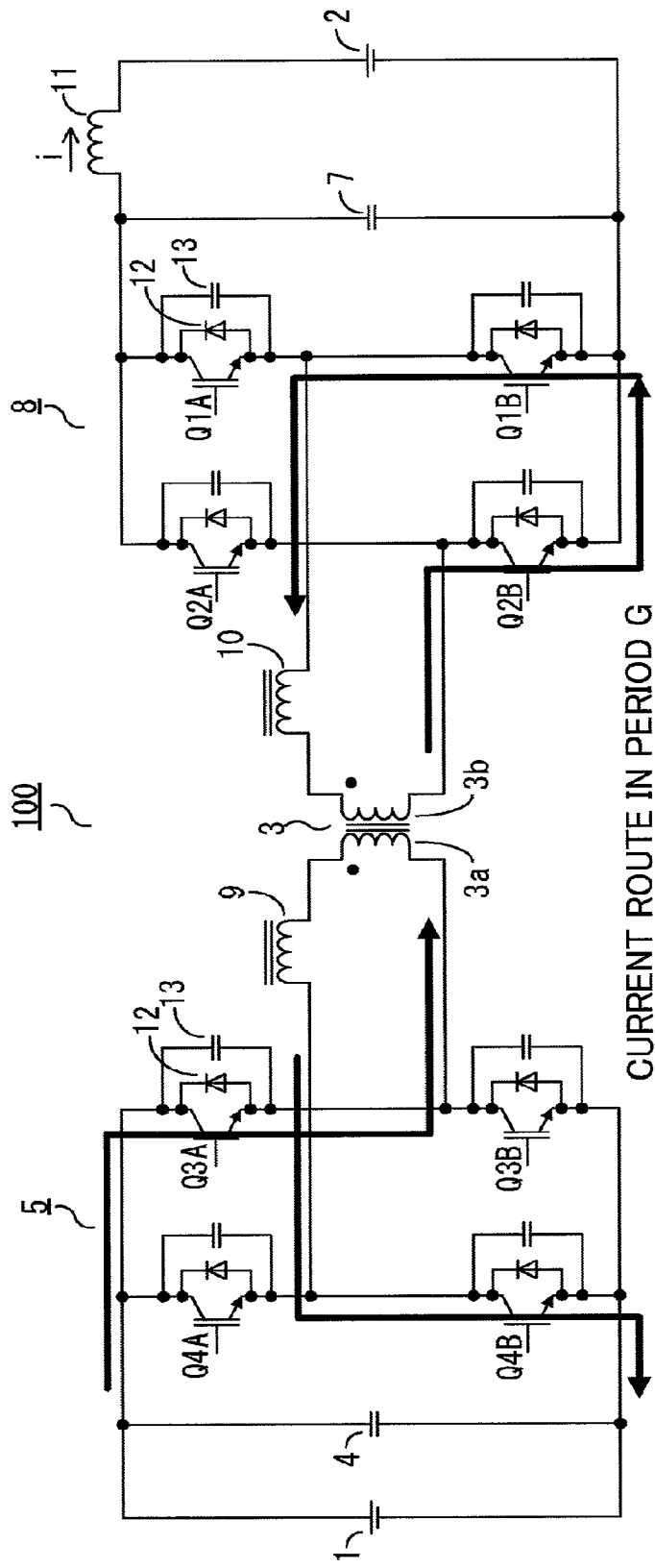
FIG. 11 is a current route diagram illustrating charging operation of the battery charge/discharge device according to embodiment 1 of the present invention.

During the period G, in the first switching circuit 5, Q3A is turned on, so that Q3A and Q4B are ON and thus the diagonal two elements are conductive. Therefore, energy is transmitted from the DC power supply 1. At this time, the polarity of current is opposite to that in the period F. In the second switching circuit, Q1B and Q2B are ON and therefore current circulates via Q1B or the diode of Q1B, and Q2B. Thus, the period G is a period during which the first reactor 9 and the second reactor 10 are excited (FIG. 11).

Figure 12:
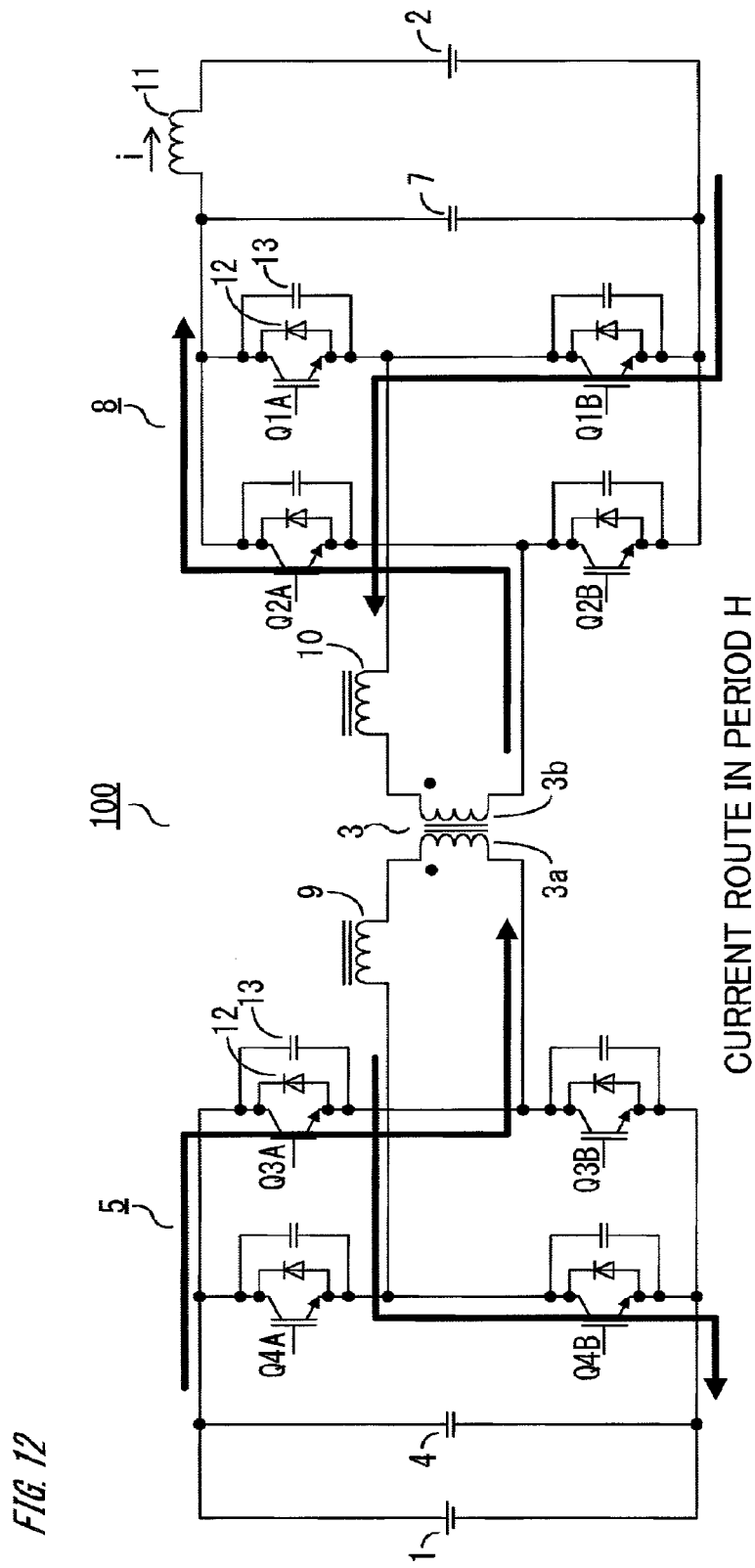
FIG. 12 is a current route diagram illustrating charging operation of the battery charge/discharge device according to embodiment 1 of the present invention.

During the period H, in the first switching circuit 5, Q3A and Q4B are ON and thus the diagonal two elements are conductive. Therefore, energy is transmitted via Q3A and Q4B from the DC power supply 1 side. In the second switching circuit 8, Q2B is turned off, current flows via the diode of Q2A, and Q1B or the diode of Q1B, and power is transmitted to the battery 2 side. Thus, the period H is a period during which the excitation energy of the first reactor 9 and the second reactor 10 is transmitted to the battery 2 side (FIG. 12).

Figure 13:
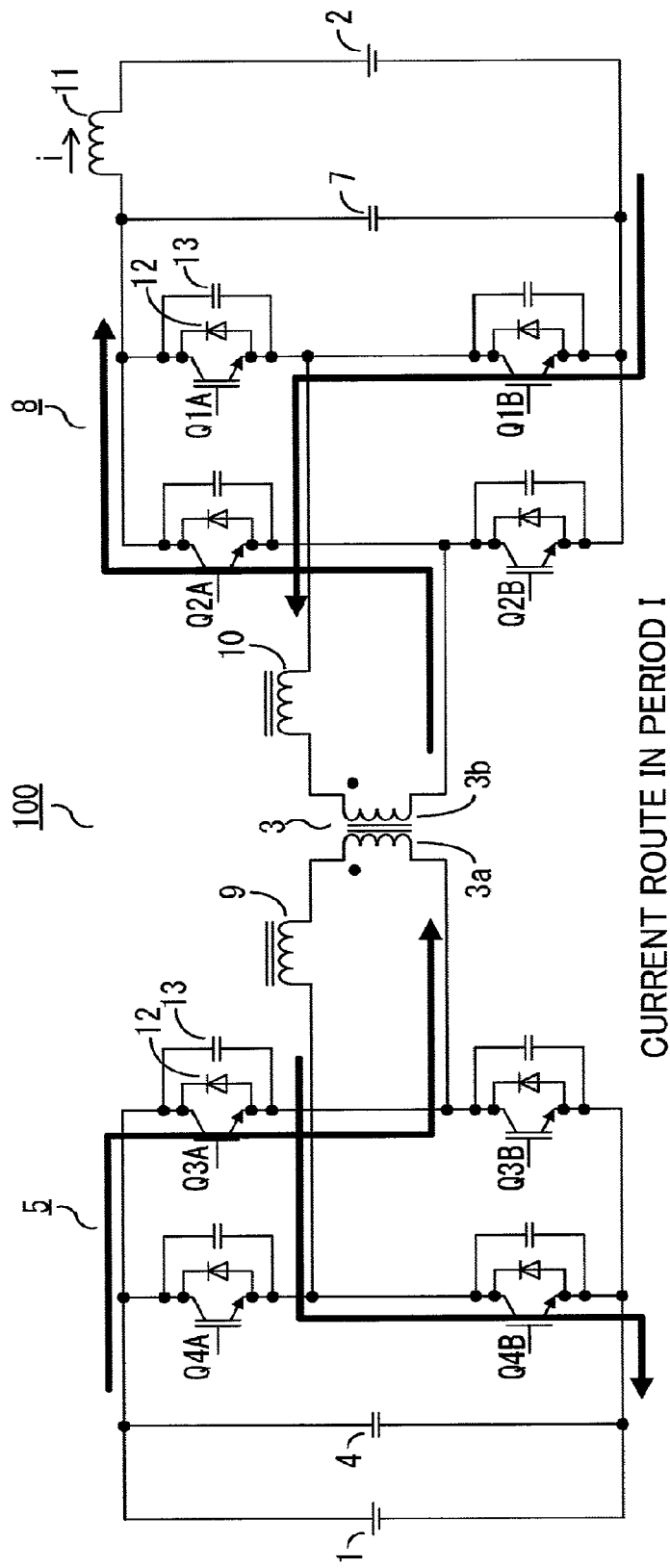
FIG. 13 is a current route diagram illustrating charging operation of the battery charge/discharge device according to embodiment 1 of the present invention.

During the period I, in the first switching circuit 5, Q3A and Q4B are ON and thus the diagonal two elements are conductive. Therefore, energy is transmitted from the DC power supply 1 side. In the second switching circuit 8, Q2A is turned on, current flows via Q2A or the diode of Q2A, and Q1B or the diode of Q1B, and power is transmitted to the battery 2 side. Thus, the period I is a period during which the excitation energy of the first reactor 9 and the second reactor 10 is transmitted to the battery 2 side (FIG. 13).

Figure 14:
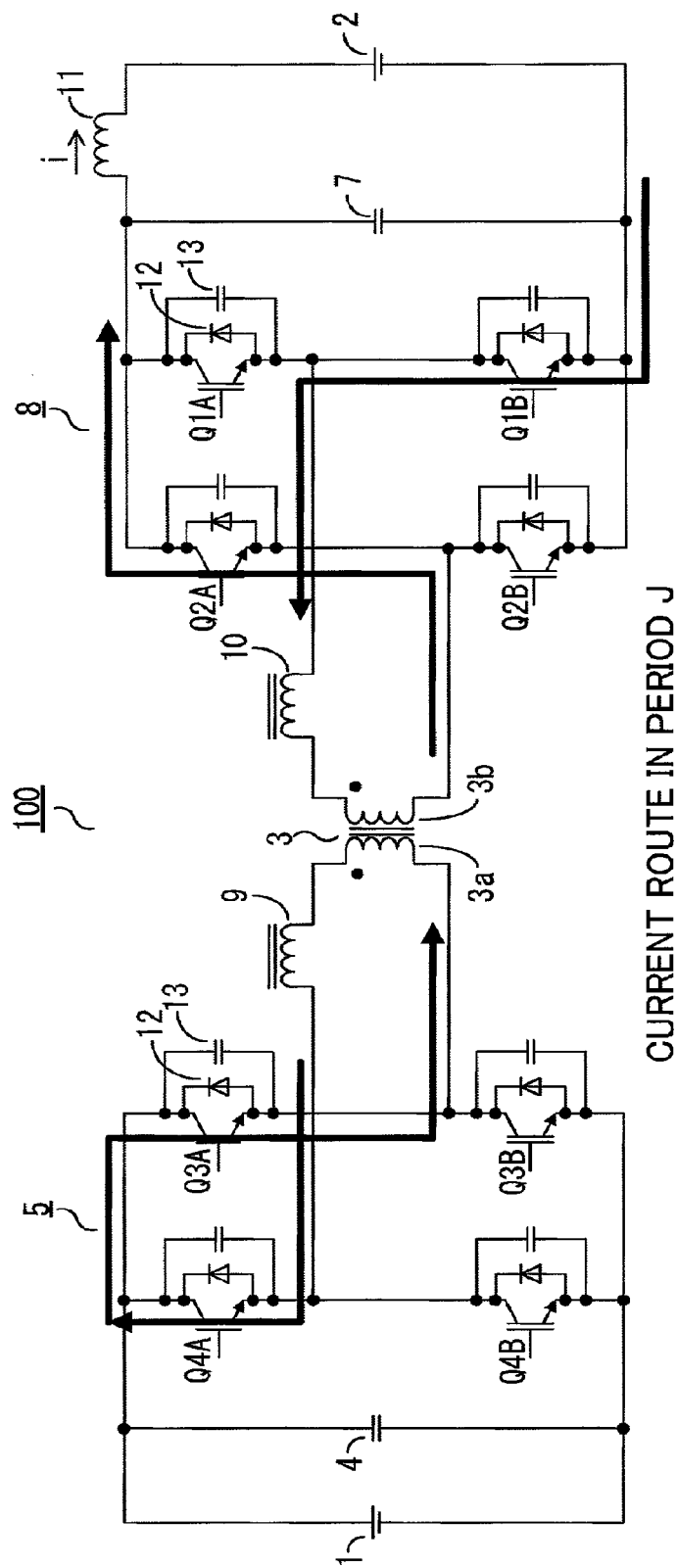
FIG. 14 is a current route diagram illustrating charging operation of the battery charge/discharge device according to embodiment 1 of the present invention.

During the period J, in the first switching circuit 5, Q4B is turned off and current circulates via the diode of Q4A, and Q3A. In the second switching circuit 8, Q1B is turned off, and Q2A or the diode of Q2A, and the diode of Q1B are ON. Therefore, the circulation current gradually decreases due to voltage of the battery 2. Thus, the period J is a period during which the circulation current decreases (FIG. 14).

Figure 15:
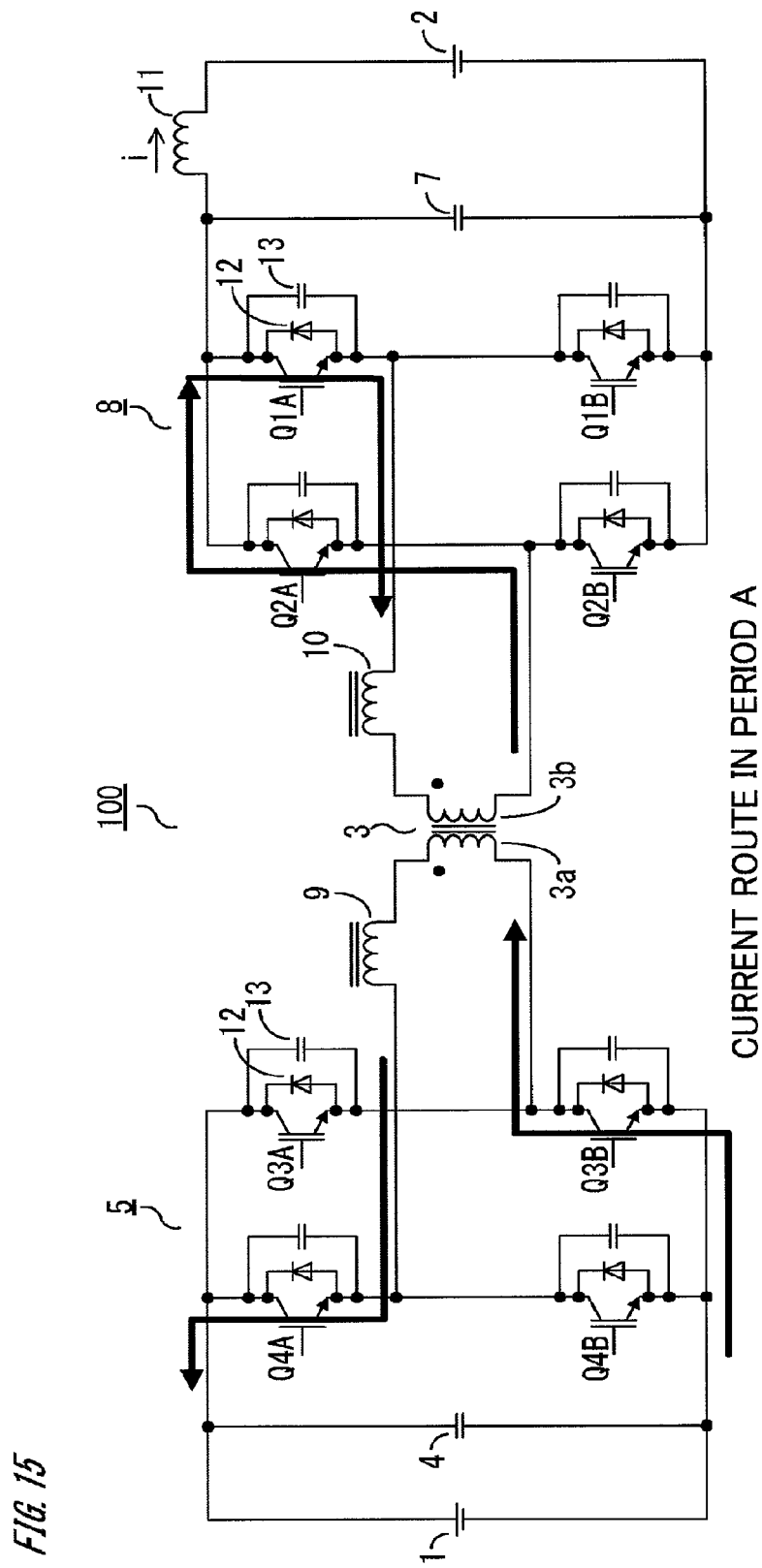
FIG. 15 is a current route diagram illustrating charging operation of the battery charge/discharge device according to embodiment 1 of the present invention.

Next, during the period A, in the first switching circuit 5, Q3A is turned off and Q4A is turned on. Since Q4A is turned on from a diode conductive state, ZVS (zero voltage switching) is achieved. If, in the period J, the circulation current is greater than 0 [A], that is, some current remains, current is regenerated via Q4A or the diode of Q4A, and the diode of Q3B, to the DC power supply 1 side. In the second switching circuit 8, Q1A is turned on and therefore current circulates via Q1A, and Q2A or the diode of Q2A. Thus, the period A is a period during which the circulation current decreases (FIG. 15).

Through repetition of such a series of controls (periods A to J), the battery charge/discharge device 100 steps up voltage generated at the second winding 3b of the transformer 3 and supplies the resultant power to the battery 2.

Figure 16:
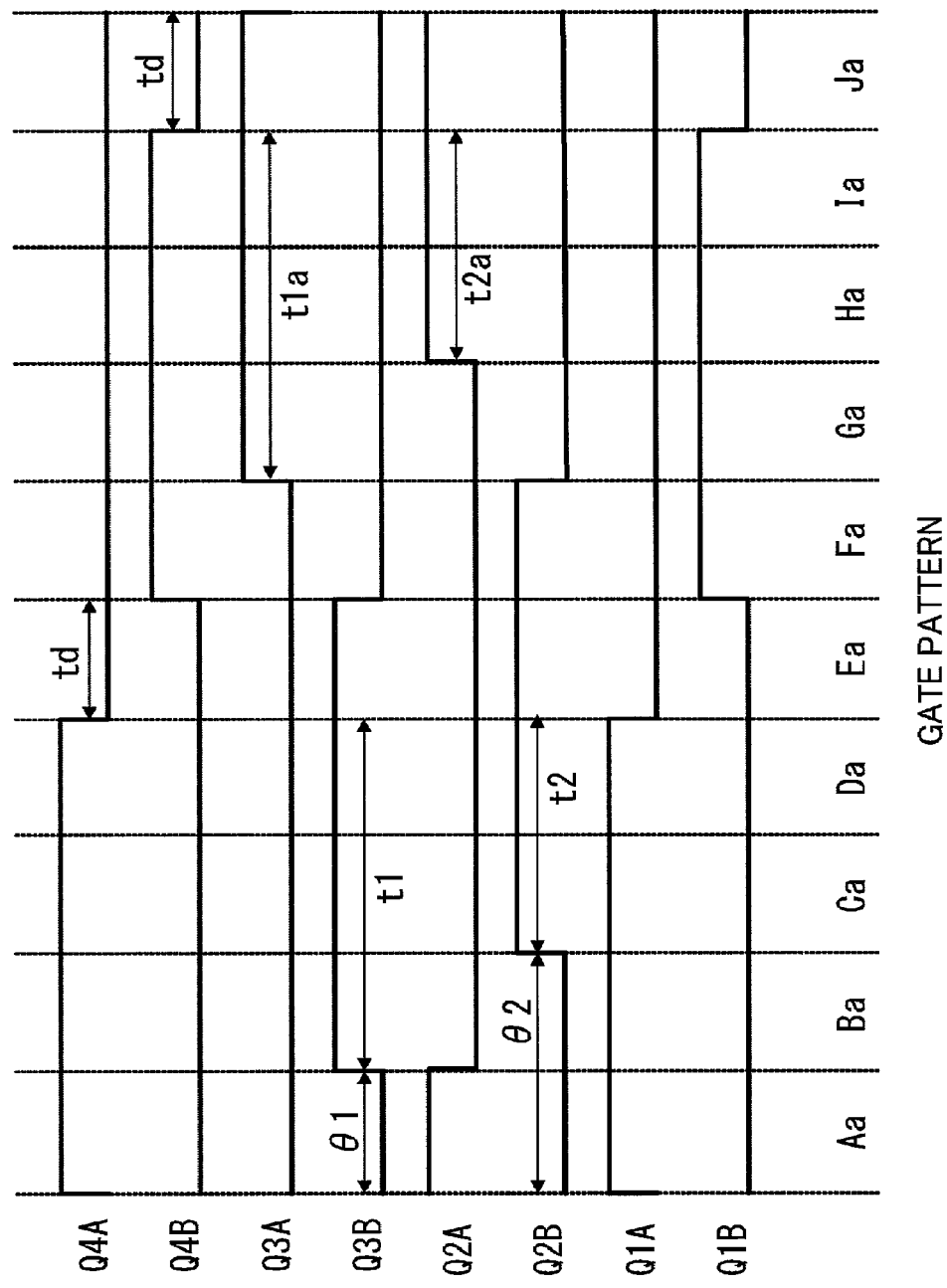
FIG. 16 is a waveform diagram of drive signals in basic control operation by the phase shift method in the battery charge/discharge device according to embodiment 1 of the present invention.

Next, the basic control operation by the phase shift method based on FIG. 4 in the case where the phase shift amounts θ1, θ2 satisfy a relationship of θ2=θ1+td and the diagonal ON times t1, t2 satisfy a relationship of t1=t2+td will be described. FIG. 16 shows waveforms in one cycle of the drive signals 21a, 21b for the semiconductor switching elements Q. In FIG. 16, they are shown with periods Aa to Ja allocated for respective plurality of gate patterns which are combination patterns of the drive signals.

FIG. 17 to FIG. 26 show current routes according to the respective gate patterns shown in FIG. 16. The operation of the battery charge/discharge device 100 in one cycle will be described with reference to FIG. 16 and FIG. 17 to FIG. 26.

Figure 17:
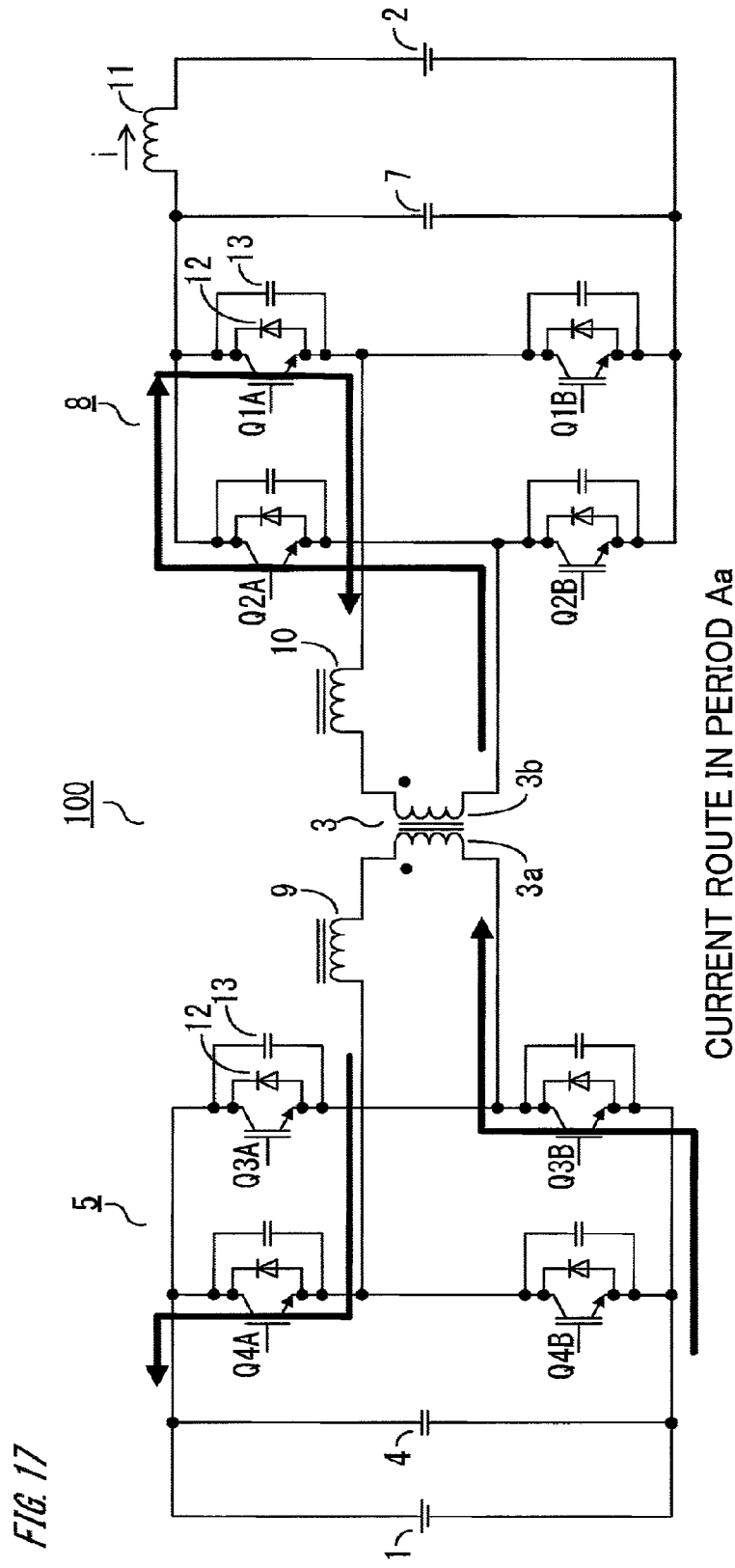
FIG. 17 is a current route diagram illustrating charging operation of the battery charge/discharge device according to embodiment 1 of the present invention.

During the period Aa, in the first switching circuit 5, Q3A is turned off and Q4A is turned on. In the second switching circuit 8, Q1A is turned on and therefore current circulates via Q1A, and Q2A or the diode of Q2A. Thus, the period Aa is a period during which the circulation current decreases (FIG. 17). The details of the period Aa will be described later.

Figure 18:
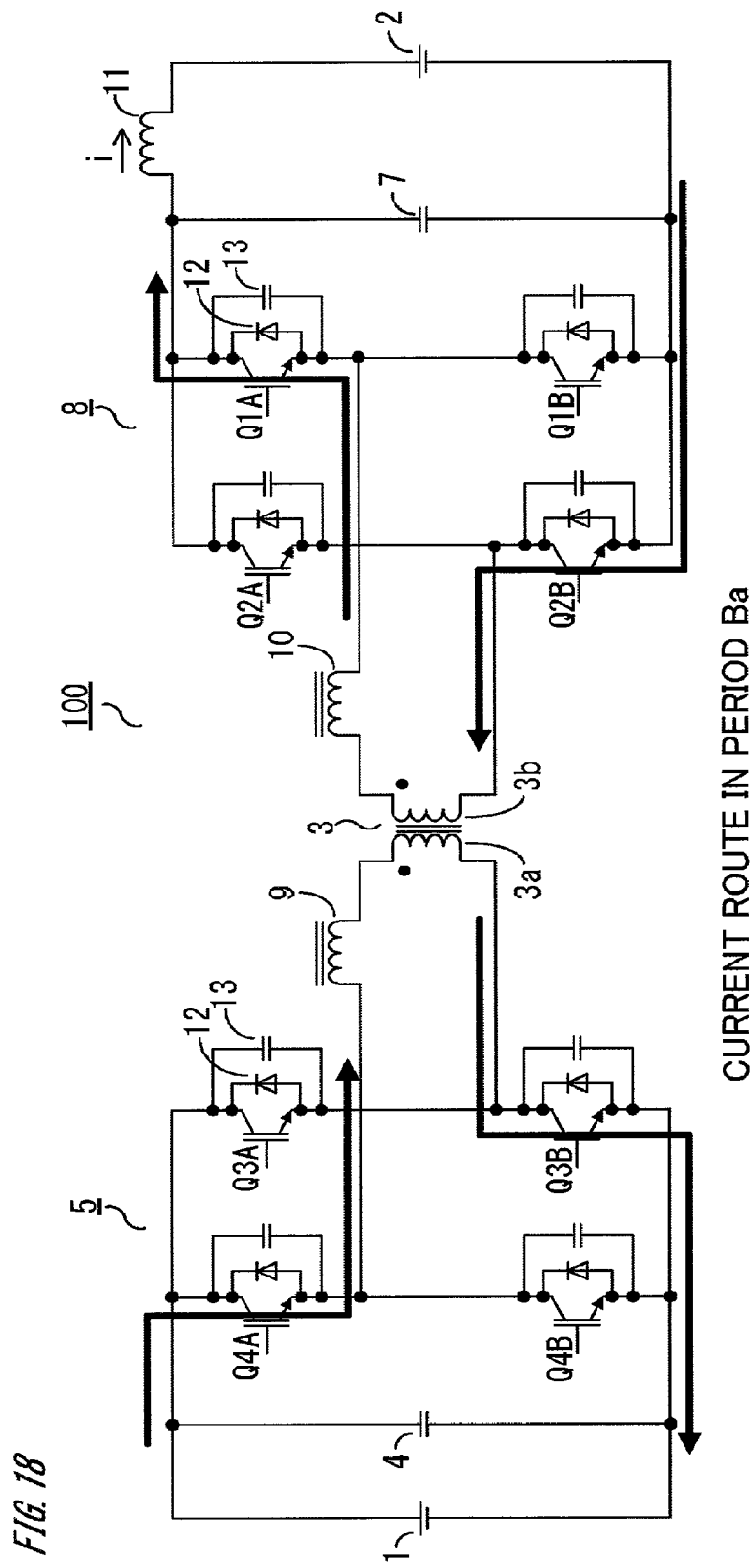
FIG. 18 is a current route diagram illustrating charging operation of the battery charge/discharge device according to embodiment 1 of the present invention.

During the period Ba, in the first switching circuit 5, Q4A and Q3B are ON and thus the diagonal two elements are conductive. Therefore, energy is transmitted via Q4A and Q3B from the DC power supply 1 side. In the second switching circuit 8, Q2A is turned off and Q1A is ON. Therefore, current flows via the diode of Q2B from Q1A or the diode of Q1A, and power is transmitted to the battery 2 side. Thus, the period Ba is a period during which power is transmitted to the battery 2 side (FIG. 18).

Figure 19:
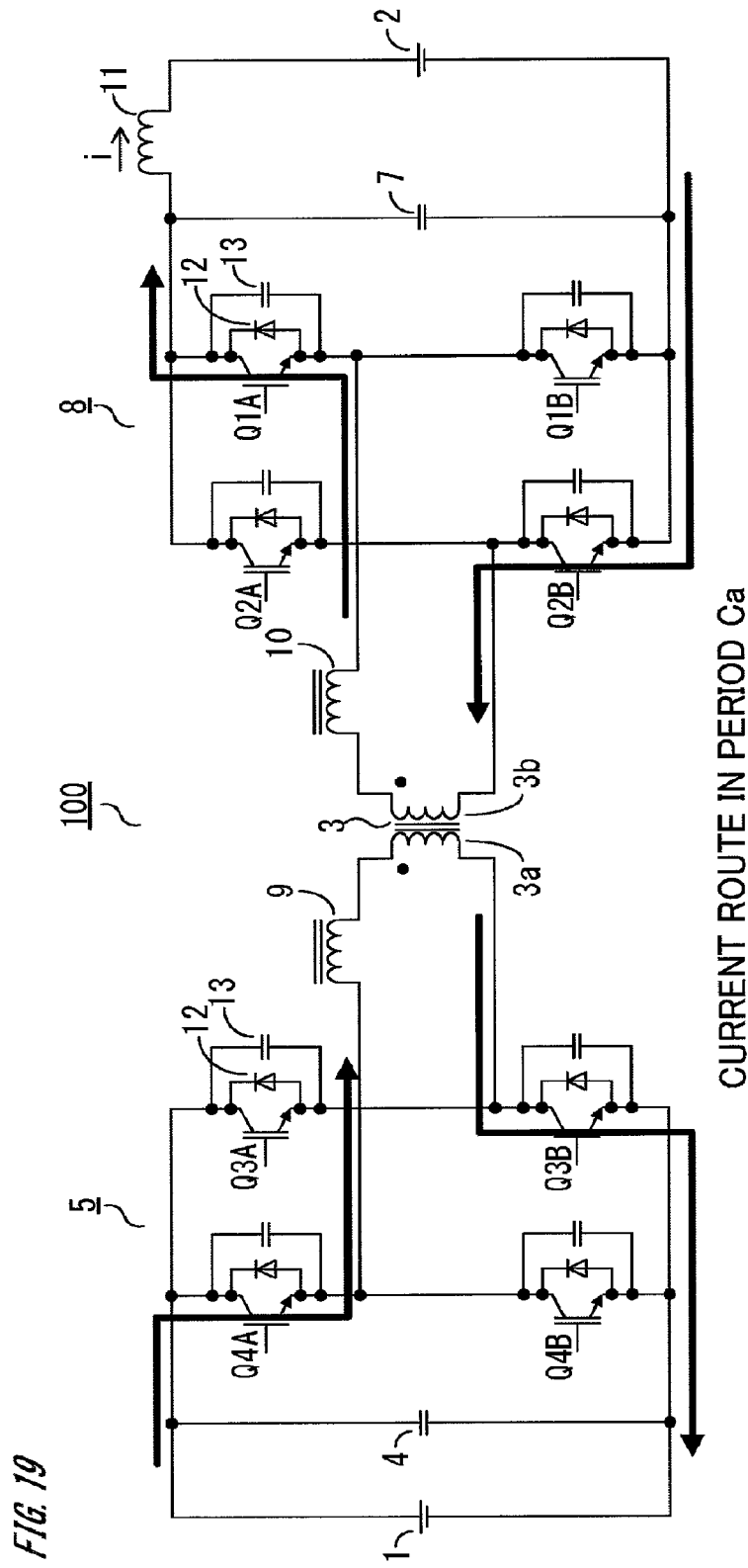
FIG. 19 is a current route diagram illustrating charging operation of the battery charge/discharge device according to embodiment 1 of the present invention.

During the period Ca, in the first switching circuit 5, Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from Q1A or the diode of Q1A, and power is transmitted to the battery 2 side. Thus, the period Ca is a period during which power is transmitted to the battery 2 side (FIG. 19).

Figure 20:
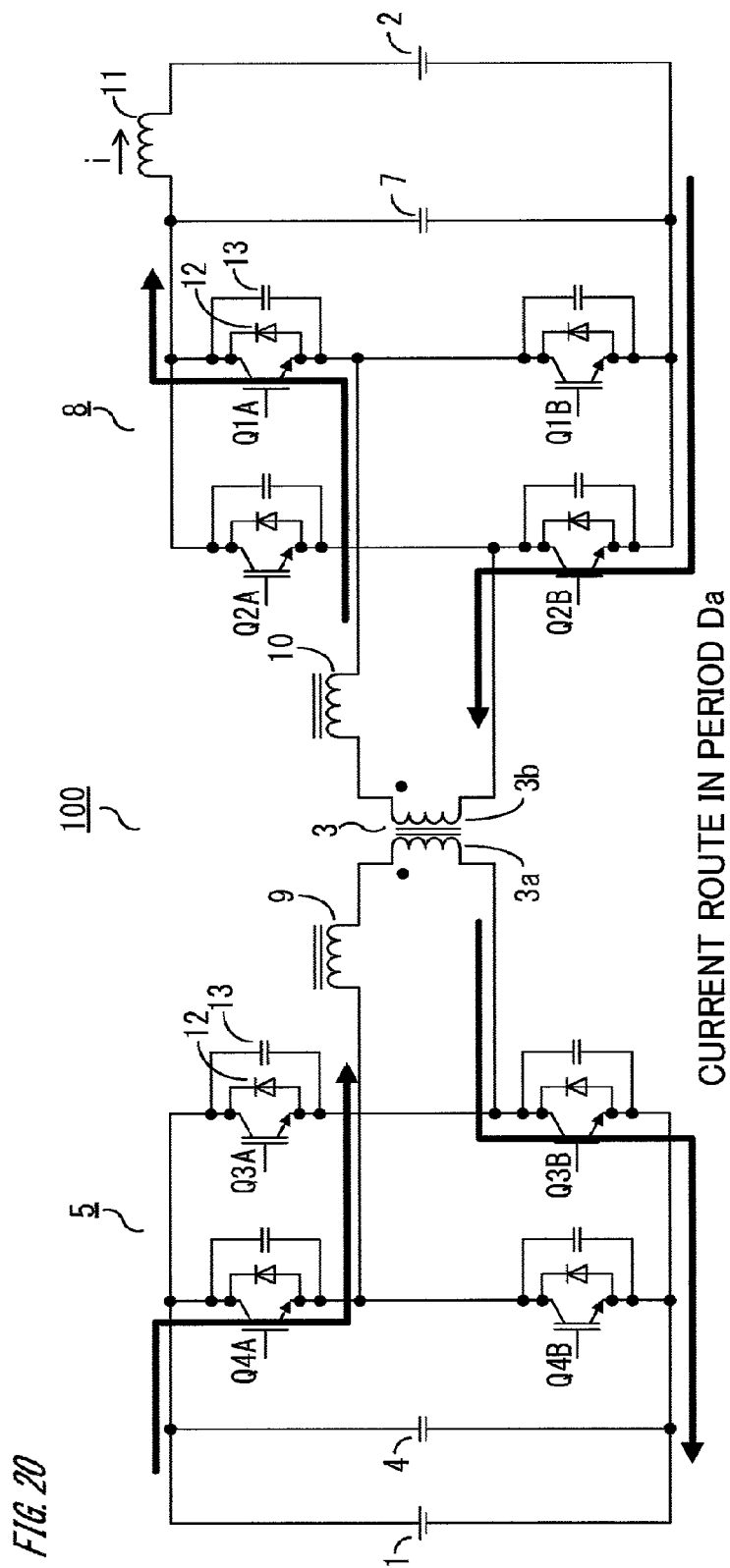
FIG. 20 is a current route diagram illustrating charging operation of the battery charge/discharge device according to embodiment 1 of the present invention.

During the period Da, in the first switching circuit 5, Q4A and Q3B are ON and thus the diagonal two elements are conductive. Therefore, energy is transmitted from the DC power supply 1. In the second switching circuit 8, current flows via Q2B or the diode of Q2B from Q1A or the diode of Q1A, and power is transmitted to the battery 2 side. Thus, the period Da is a period during which power is transmitted to the battery 2 side (FIG. 20).

Figure 21:
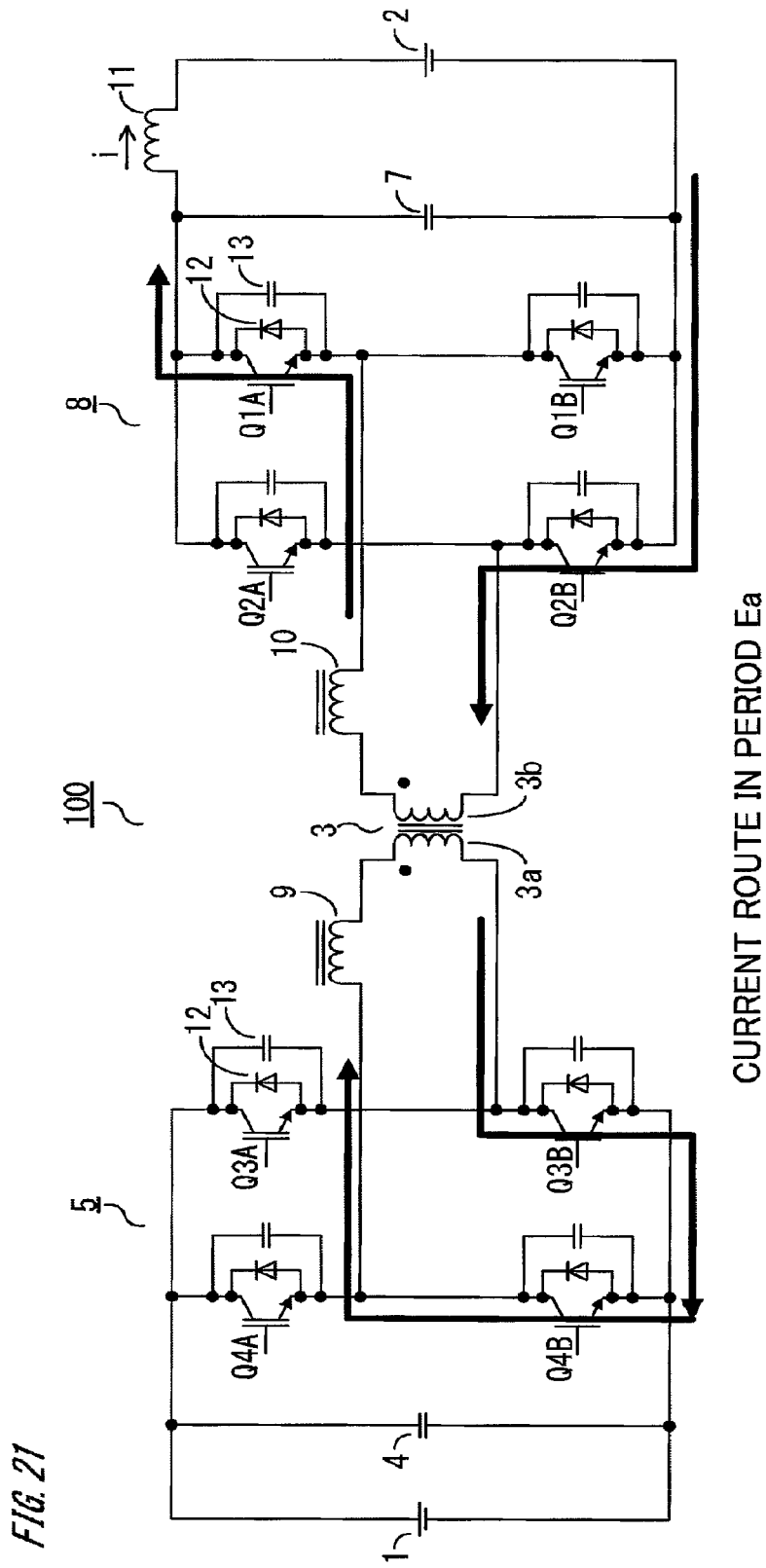
FIG. 21 is a current route diagram illustrating charging operation of the battery charge/discharge device according to embodiment 1 of the present invention.

During the period Ea, in the first switching circuit 5, Q4A is turned off and current circulates via the diode of Q4B, and Q3B. In the second switching circuit 8, Q1A is turned off, and the diode of Q1A, and Q2B or the diode of Q2B are ON. Therefore, the circulation current gradually decreases due to voltage of the battery 2. Thus, the period Ea is a period during which the circulation current decreases (FIG. 21).

Figure 22:
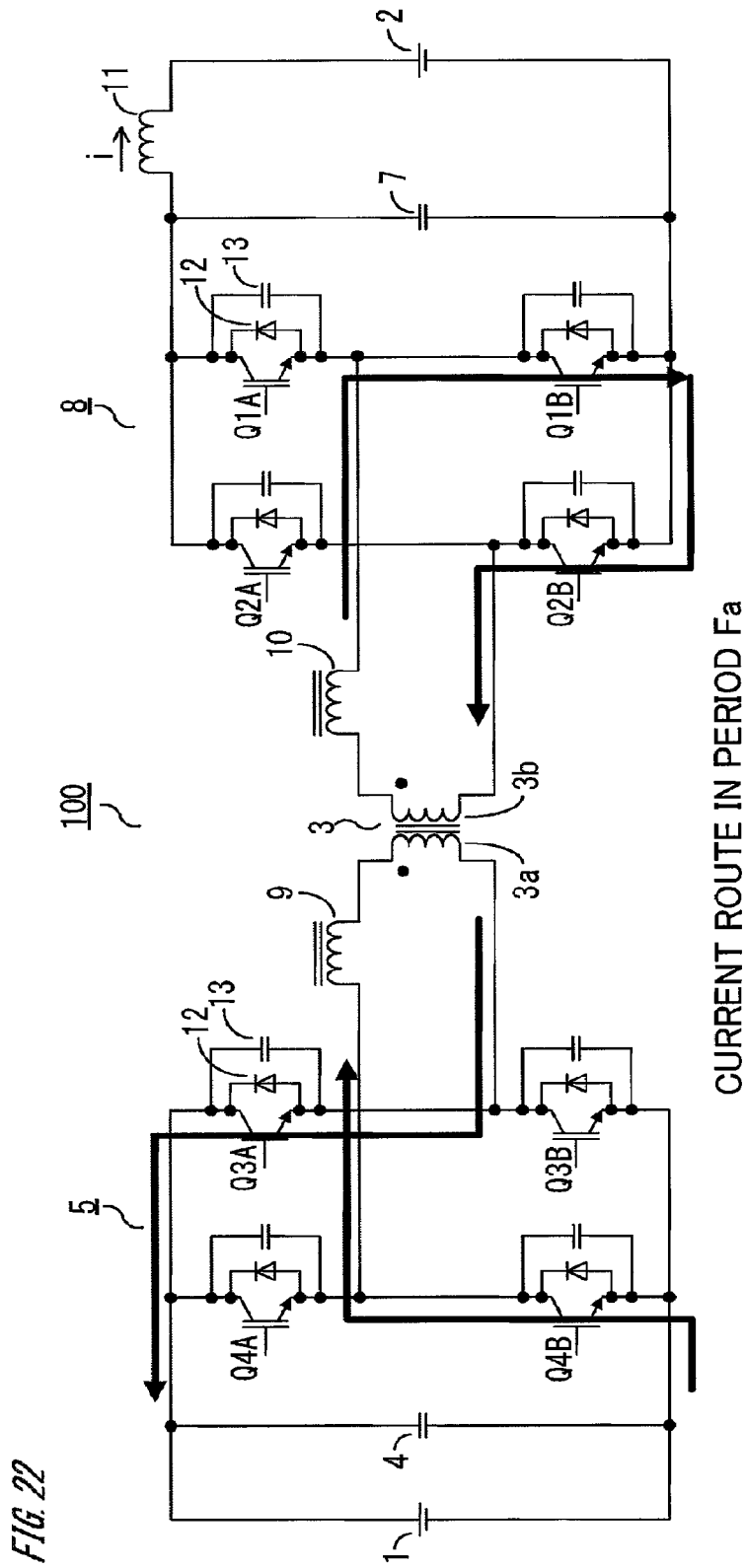
FIG. 22 is a current route diagram illustrating charging operation of the battery charge/discharge device according to embodiment 1 of the present invention.

During the period Fa, in the first switching circuit 5, Q3B is turned off and Q4B is turned on. Since Q4B is turned on from a diode conductive state, ZVS (zero voltage switching) is achieved. If, in the period Ea, the circulation current is greater than 0 [A], that is, some current remains, current is regenerated via Q4B or the diode of Q4B, and the diode of Q3A, to the DC power supply 1 side. In the second switching circuit 8, Q1B is turned on and therefore current circulates via Q1B, and Q2B or the diode of Q2B. Thus, the period Fa is a period during which the circulation current decreases (FIG. 22).

Figure 23:
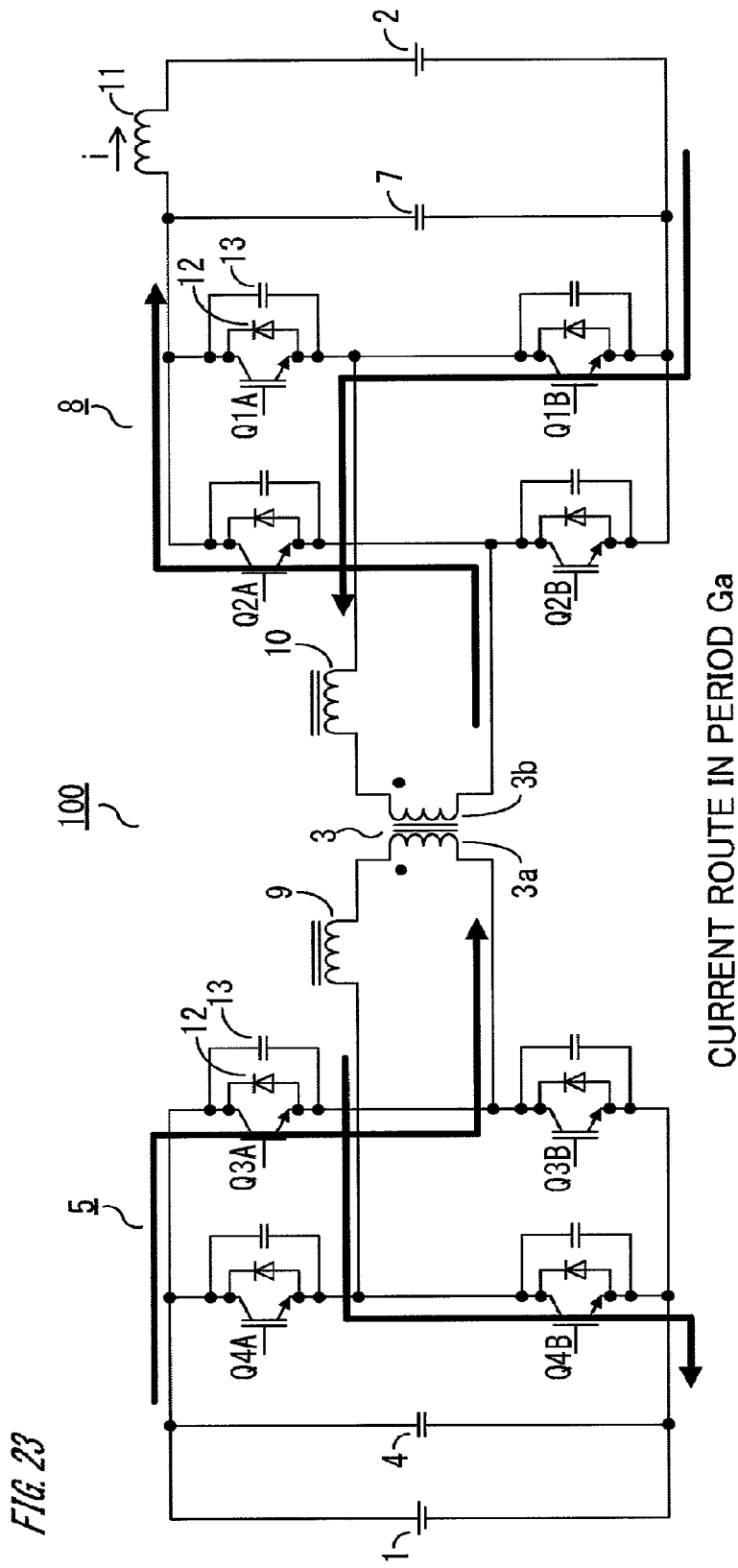
FIG. 23 is a current route diagram illustrating charging operation of the battery charge/discharge device according to embodiment 1 of the present invention.

During the period Ga, in the first switching circuit 5, Q3A is turned on and thus the diagonal two elements are conductive. Therefore, energy is transmitted from the DC power supply 1 side. At this time, the polarity of current is opposite to that in the period Fa. In the second switching circuit, Q2B is turned off and Q1B is ON. Therefore, current flows via the diode of Q2A from Q1B or the diode of Q1B, and power is transmitted to the battery 2 side. Thus, the period Ga is a period during which power is transmitted to the battery 2 side (FIG. 23).

Figure 24:
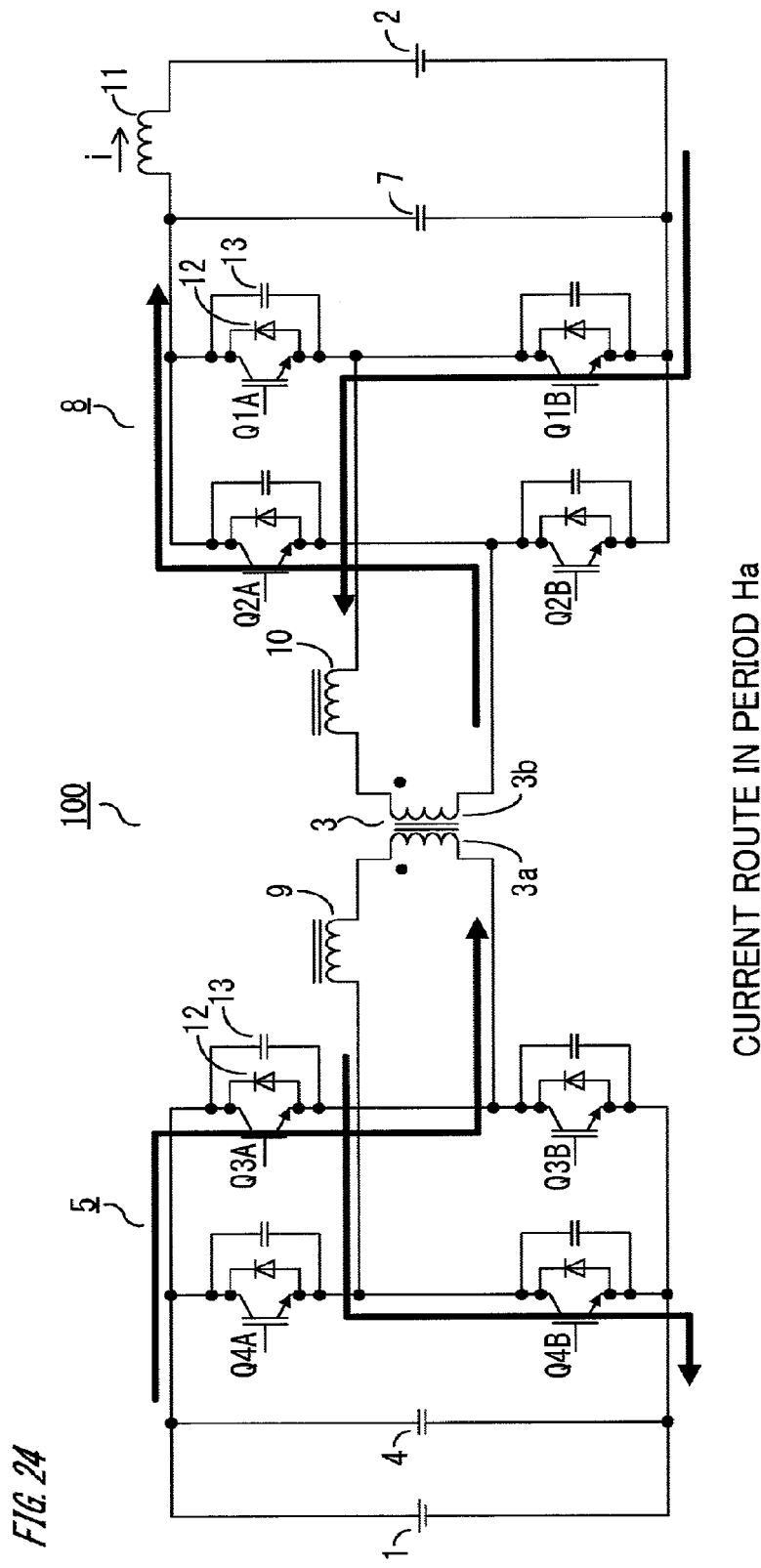
FIG. 24 is a current route diagram illustrating charging operation of the battery charge/discharge device according to embodiment 1 of the present invention.

During the period Ha, in the first switching circuit 5, Q3A and Q4B are ON and thus the diagonal two elements are conductive. Therefore, energy is transmitted via Q3A and Q4B from the DC power supply 1 side. In the second switching circuit 8, Q2A is turned on, current flows via Q2A or the diode of Q2A, and Q1B or the diode of Q1B, and power is transmitted to the battery 2 side. Thus, the period Ha is a period during which power is transmitted to the battery 2 side (FIG. 24).

Figure 25:
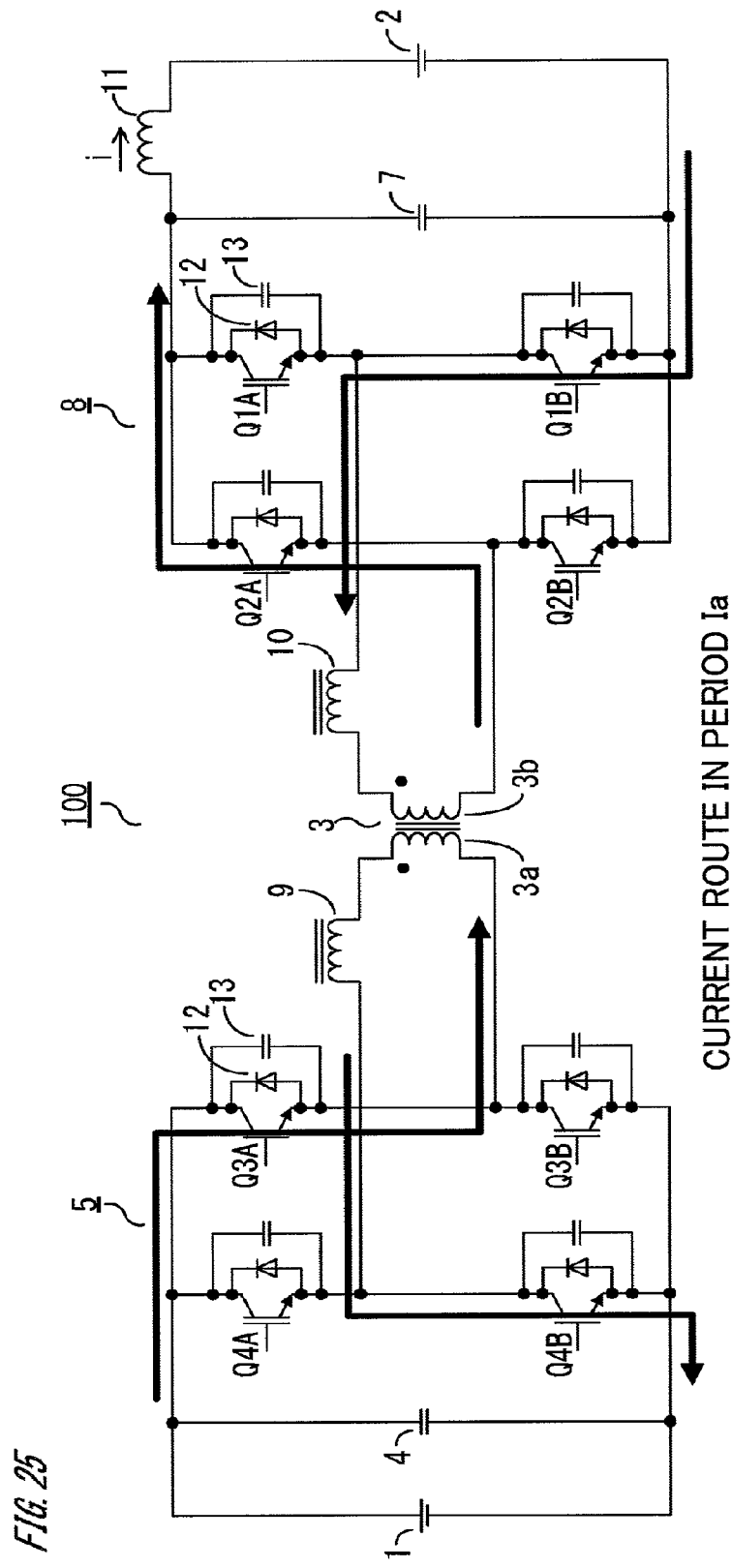
FIG. 25 is a current route diagram illustrating charging operation of the battery charge/discharge device according to embodiment 1 of the present invention.

During the period Ia, in the first switching circuit 5, Q3A and Q4B are ON and thus the diagonal two elements are conductive. Therefore, energy is transmitted from the DC power supply 1 side. In the second switching circuit 8, current flows via Q2A or the diode of Q2A, and Q1B or the diode of Q1B, and power is transmitted to the battery 2 side. Thus, the period Ia is a period during which power is transmitted to the battery 2 side (FIG. 25).

Figure 26:
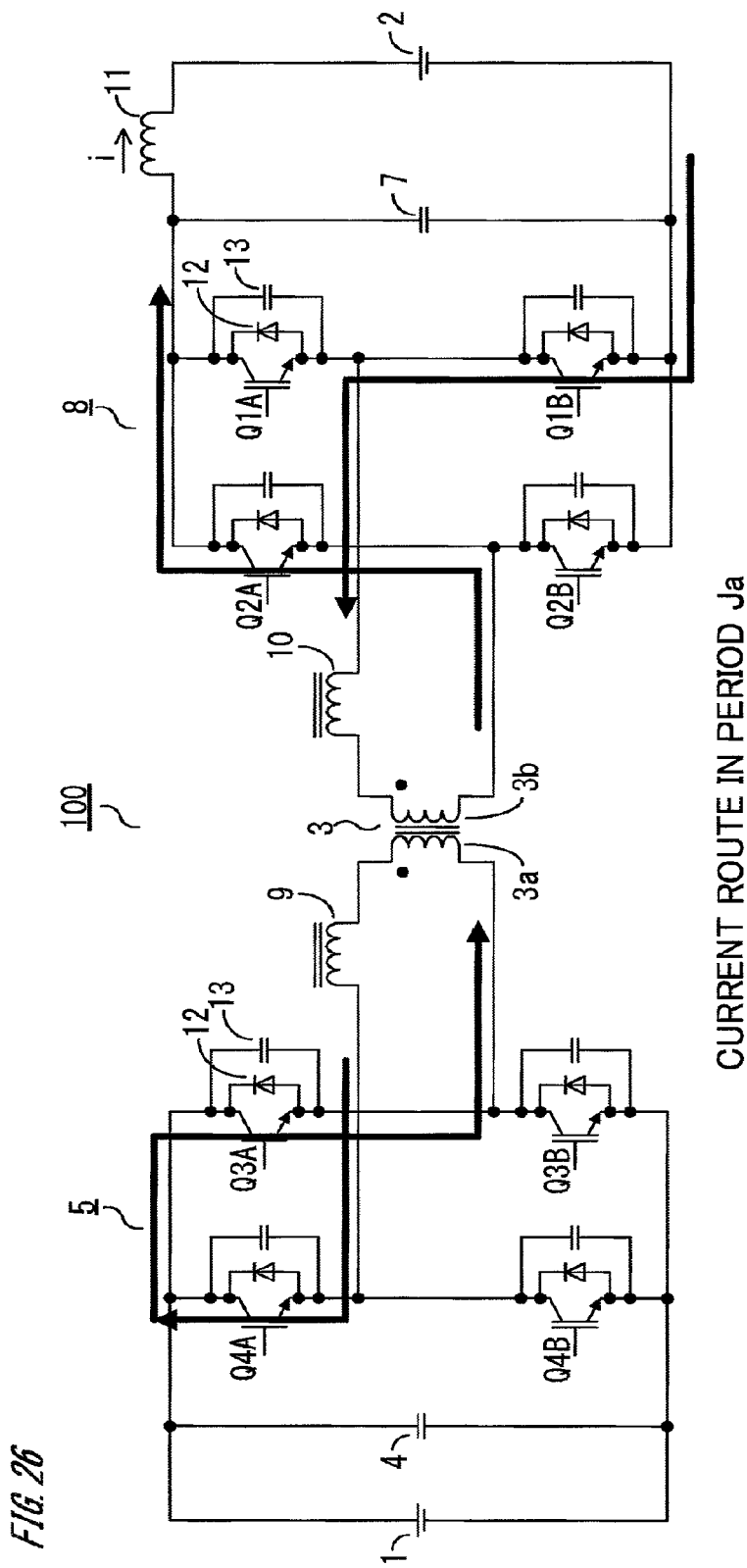
FIG. 26 is a current route diagram illustrating charging operation of the battery charge/discharge device according to embodiment 1 of the present invention.

During the period Ja, in the first switching circuit 5, Q4B is turned off and current circulates via the diode of Q4A, and Q3A. In the second switching circuit 8, Q1B is turned off, and Q2A or the diode of Q2A, and the diode of Q1B are ON. Therefore, the circulation current gradually decreases due to voltage of the battery 2. Thus, the period Ja is a period during which the circulation current decreases (FIG. 26).

Next, returning to the period Aa, in the first switching circuit 5, Q3A is turned off and Q4A is turned on. Since Q4A is turned on from a diode conductive state, ZVS (zero voltage switching) is achieved. If, in the period Ja, the circulation current is greater than 0 [A], that is, some current remains, current is regenerated via Q4A or the diode of Q4A, and the diode of Q3B, to the DC power supply 1 side. In the second switching circuit 8, Q1A is turned on and therefore current circulates via Q1A, and Q2A or the diode of Q2A. Thus, the period Aa is a period during which the circulation current decreases (see FIG. 17).

Through repetition of such a series of controls (periods Aa to Ja), the battery charge/discharge device 100 supplies power to the battery 2 by voltage generated at the second winding 3b of the transformer 3.

During the period B (see FIG. 6) and the period G (see FIG. 11) of the drive signals shown in FIG. 3 described above, the first reactor 9 and the second reactor 10 are excited, whereby voltage generated at the second winding 3b of the transformer 3 is stepped up and the resultant power is supplied to the battery 2. However, in the case of the drive signals shown in FIG. 16, during the period Ba (see FIG. 18) and the period Ga (see FIG. 23), Q2A and Q2B are in the short-circuit prevention time td and therefore are both OFF, so that step-up operation in which the first reactor 9 and the second reactor 10 are excited is not performed. Therefore, in the control (periods Aa to Ja) by the drive signals shown in FIG. 16, if voltage of the battery 2 is higher than voltage generated at the second winding 3b of the transformer 3, power is not transmitted to the battery 2 side.

In order to excite the first reactor 9 and the second reactor 10, as in the drive signals shown in FIG. 3, the phase shift amounts θ1, θ2 need to satisfy a relationship of θ2>θ1+td and the diagonal ON times t1, t2 need to satisfy a relationship of t1>t2+td.

Figure 27:
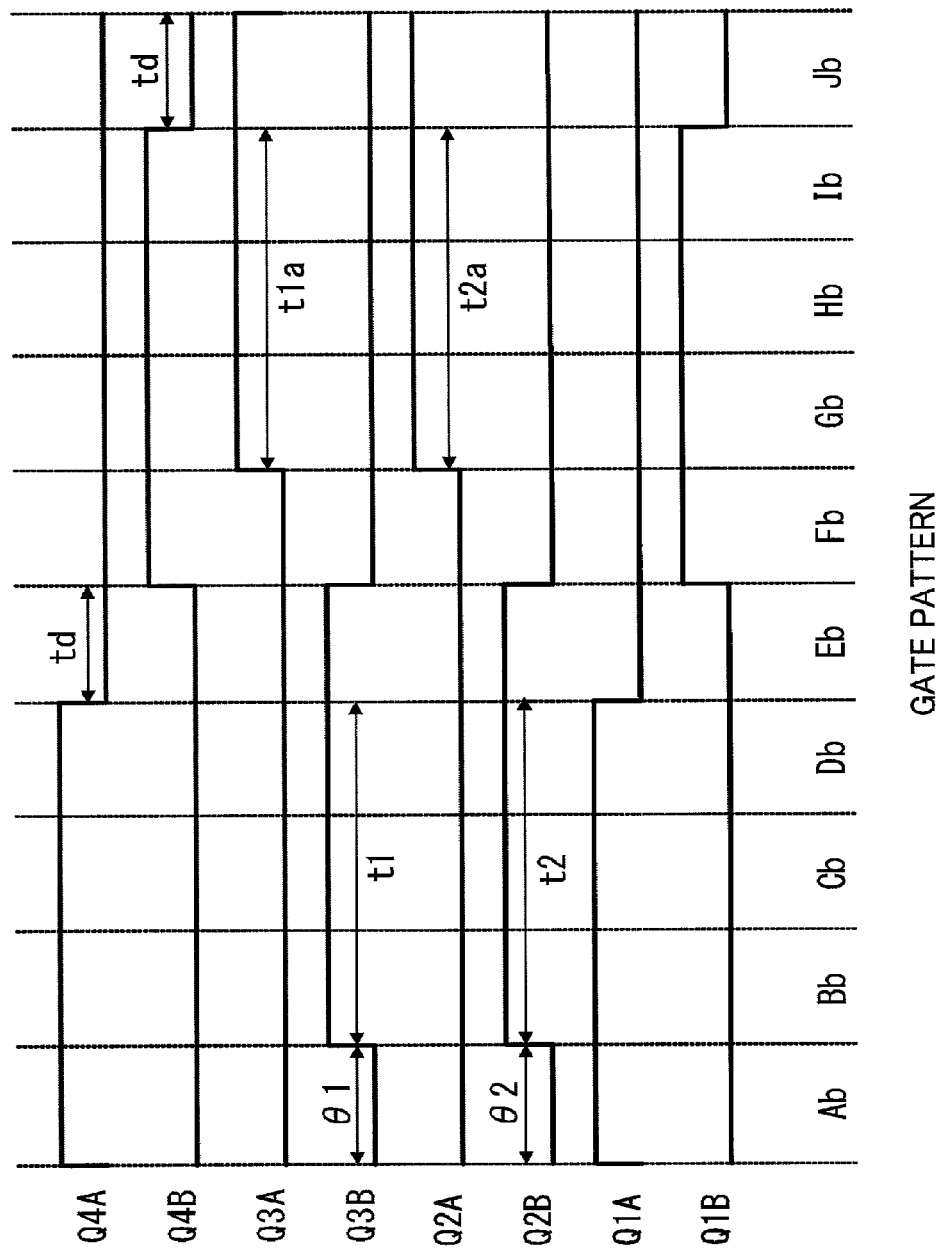
FIG. 27 is a waveform diagram of drive signals in basic control operation by the phase shift method in the battery charge/discharge device according to embodiment 1 of the present invention.

Subsequently, the basic control operation by the phase shift method based on FIG. 4 in the case where the phase shift amounts θ1, θ2 are set as θ2=θ1 and the diagonal ON times t1, t2 are set as t2=t1, will be described. FIG. 27 shows waveforms in one cycle of the drive signals 21a, 21b for the semiconductor switching elements Q. In FIG. 27, they are shown with periods Ab to Jb allocated for respective plurality of gate patterns which are combination patterns of the drive signals.

During the period Ab, in the first switching circuit 5, Q3A is turned off and Q4A is turned on. In the second switching circuit 8, Q2A is turned off and Q1A is turned on. Therefore, current circulates via Q1A and the diode of Q2A. Thus, the period Ab is a period during which the circulation current decreases, and is a period equivalent to the period Aa in FIG. 16. The details of the period Ab will be described later.

During the period Bb, in the first switching circuit 5, Q4A and Q3B are ON and thus the diagonal two elements are conductive. Therefore, energy is transmitted via Q4A and Q3B from the DC power supply 1 side. In the second switching circuit 8, Q2B is turned on and Q1A is ON. Therefore, current flows via Q2B or the diode of Q2B from Q1A or the diode of Q1A, and power is transmitted to the battery 2 side. Thus, the period Bb is a period during which power is transmitted to the battery 2 side, but since step-up operation in which the first reactor 9 and the second reactor 10 are excited is not performed, if voltage of the battery 2 is higher than voltage generated at the second winding 3b of the transformer 3, power is not transmitted to the battery 2 side. The period Bb is a period equivalent to the period Ba in FIG. 16.

During the period Cb, in the first switching circuit 5, Q4A and Q3B are ON and thus the diagonal two elements are conductive. Therefore, energy is transmitted from the DC power supply 1 side. In the second switching circuit 8, Q1A and Q2B are ON. Therefore, current flows via Q2B or the diode of Q2B from Q1A or the diode of Q1A, and power is transmitted to the battery 2 side. Thus, the period Cb is a period during which power is transmitted to the battery 2 side, and is a period equivalent to the period Ca in FIG. 16.

During the period Db, in the first switching circuit 5, Q4A and Q3B are ON and thus the diagonal two elements are conductive. Therefore, energy is transmitted from the DC power supply 1 side. In the second switching circuit 8, current flows via Q2B or the diode of Q2B from Q1A or the diode of Q1A, and power is transmitted to the battery 2 side. Thus, the period Db is a period during which power is transmitted to the battery 2 side, and is a period equivalent to the period Da in FIG. 16.

During the period Eb, in the first switching circuit 5, Q4A is turned off and current circulates via the diode of Q4B, and Q3B. In the second switching circuit 8, Q1A is turned off, and the diode of Q1A, and Q2B or the diode of Q2B are ON. Therefore, the circulation current gradually decreases due to voltage of the battery 2. Thus, the period Eb is a period during which the circulation current decreases, and is a period equivalent to the period Ea in FIG. 16.

During the period Fb, in the first switching circuit 5, Q3B is turned off and Q4B is turned on. Since Q4B is turned on from a diode conductive state, ZVS (zero voltage switching) is achieved. If, in the period Eb, the circulation current is greater than 0 [A], that is, some current remains, current is regenerated via Q4B or the diode of Q4B, and the diode of Q3A, to the DC power supply 1 side. In the second switching circuit 8, Q2B is turned off and Q1B is turned on. Therefore, current circulates via Q1B and the diode of Q2B. Thus, the period Fb is a period during which the circulation current decreases, and is a period equivalent to the period Fa in FIG. 16.

During the period Gb, in the first switching circuit 5, Q3A is turned on and thus the diagonal two elements are conductive. Therefore, energy is transmitted from the DC power supply 1 side. At this time, the polarity of current is opposite to that in the period Fb. In the second switching circuit, Q2A is turned on and Q1B is ON. Therefore, current flows via Q2A or the diode of Q2A from Q1B or the diode of Q1B, and power is transmitted to the battery 2 side. Thus, the period Gb is a period during which power is transmitted to the battery 2 side, but since step-up operation in which the first reactor 9 and the second reactor 10 are excited is not performed, if voltage of the battery 2 is higher than voltage generated at the second winding 3b of the transformer 3, power is not transmitted to the battery 2 side. The period Gb is a period equivalent to the period Ga in FIG. 16.

During the period Hb, in the first switching circuit 5, Q3A and Q4B are ON and thus the diagonal two elements are conductive. Therefore, energy is transmitted via Q3A and Q4B from the DC power supply 1 side. In the second switching circuit 8, Q1B and Q2A are ON. Therefore, current flows via Q2A or the diode of Q2A, and Q1B or the diode of Q1B, and power is transmitted to the battery 2 side. Thus, the period Hb is a period during which power is transmitted to the battery 2 side, and is a period equivalent to the period Ha in FIG. 16.

During the period Ib, in the first switching circuit 5, Q3A and Q4B are ON and thus the diagonal two elements are conductive. Therefore, energy is transmitted from the DC power supply 1. In the second switching circuit 8, current flows via Q2A or the diode of Q2A, and Q1B or the diode of Q1B, and power is transmitted to the battery 2 side. Thus, the period Ib is a period during which power is transmitted to the battery 2 side, and is a period equivalent to the period Ia in FIG. 16.

During the period Jb, in the first switching circuit 5, Q4B is turned off and current circulates via the diode of Q4A, and Q3A. In the second switching circuit 8, Q1B is turned off, and Q2A or the diode of Q2A, and the diode of Q1B are ON. Therefore, the circulation current gradually decreases due to voltage of the battery 2. Thus, the period Jb is a period during which the circulation current decreases, and is a period equivalent to the period Ja in FIG. 16.

Next, returning to the period Ab, in the first switching circuit 5, Q3A is turned off and Q4A is turned on. Since Q4A is turned on from a diode conductive state, ZVS (zero voltage switching) is achieved. If, in the period Jb, the circulation current is greater than 0 [A], that is, some current remains, current is regenerated via Q4A or the diode of Q4A, and the diode of Q3B, to the DC power supply 1 side. In the second switching circuit 8, Q1A is turned on and therefore current circulates via Q1A and the diode of Q2A. Thus, the period Ab is a period during which the circulation current decreases, and is a period equivalent to the period Aa in FIG. 16.

Through repetition of such a series of controls (periods Ab to Jb), the battery charge/discharge device 100 supplies power to the battery 2 by voltage generated at the second winding 3b of the transformer 3. The series of controls (periods Ab to Jb) shown in FIG. 27 and the series of controls (periods Aa to Ja) shown in FIG. 16 are different only in whether the route through which current flows in each period passes through the semiconductor switching element Q or the diode of the semiconductor switching element Q, but both have equivalent functions, that is, cause the battery charge/discharge device 100 to operate in an equal manner. That is, in the case of $\theta2=\theta1+td$ (t1=t2+td) and in the case of $\theta2=\theta1$ (t1=t2), equal transmission power is obtained.

The above description is for the case of performing step-up operation when power is transmitted from the DC power supply 1 to the battery 2, that is, the battery 2 is charged, in the basic control operation by the phase shift method based on FIG. 4. In the case of performing step-up operation when power is transmitted from the battery 2 to the DC power supply 1, that is, the battery 2 is discharged, in other words, when the charge current i is negative, since the DC/DC conversion circuit of the battery charge/discharge device 100 has a configuration in which the first and second reactors 9 and 10 and the first and second switching circuits 5 and 8 are arranged symmetrically at the left and the right with respect to the transformer 3, and the control by the phase shift method has symmetry, the magnitude relationship between the phase shift amounts $\theta1$, $\theta2$ and the magnitude relationship between the diagonal ON times t1, t2 are each reversed, and as for the current route, the direction of current is merely reversed so that the first switching circuit 5 and the second switching circuit 8 are replaced with each other.

Thus, in the basic control operation based on FIG. 4, when the difference between the two phase shift amounts $\theta1$ and $\theta2$ is equal to or smaller than the short-circuit prevention time td, step-up operation cannot be appropriately performed due to the short-circuit prevention time td, and the transmission power does not change. Therefore, as shown in FIG. 5, in a range of $t1 \geq t2$ and $t1 \leq t2+td$, the charge current i remains at a constant value (in this case, zero), and in a range of $t1 < t2$ and $t2 \leq t1+td$, the charge current i remains at a constant value (in this case, zero).

Figure 28:
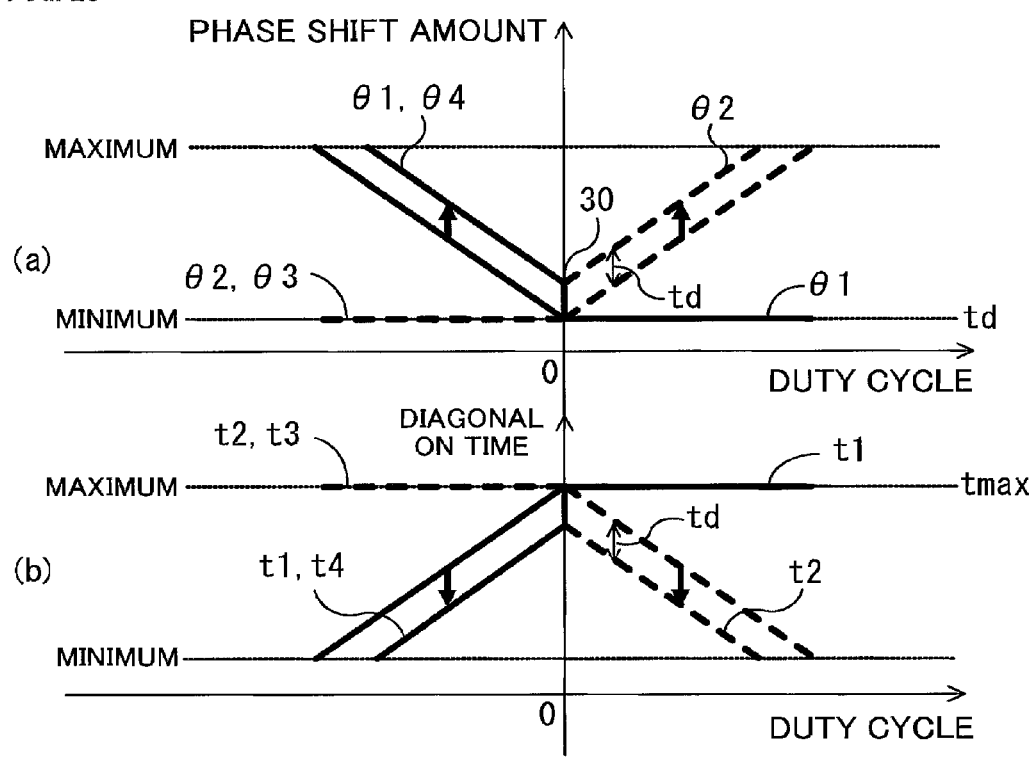
FIG. 28 is a waveform diagram illustrating control operation of the battery charge/discharge device according to embodiment 1 of the present invention.

In the present embodiment, in the case where, when the duty cycle is zero at which the control switches between charge control and discharge control as described above, the charge current i is zero, that is, the transmission power is zero, as shown in FIG. 28, if the duty cycle is positive or zero, an offset phase is added to the phase shift amount $\theta2$, and if the duty cycle is negative, an offset phase is added to the phase shift amount $\theta4$ (=$\theta1$). The added offset phase is a phase corresponding to the short-circuit prevention time td.

That is, in charge control in which the duty cycle is positive or zero, the control circuit 20 keeps the phase shift amount $\theta1$ minimum and adds the offset phase to the value of the phase shift amount $\theta2$ calculated on the basis of the duty cycle. At this time, the diagonal ON time t1 is kept maximum, and the short-circuit prevention time td is subtracted from the calculated value of the diagonal ON time t2.

Thus, in charge control in which the duty cycle is positive or zero, in the case where transmission power to the battery 2 is positive or zero and step-up control is performed in which output voltage to the battery 2 is higher than voltage generated at the second winding 3b of the transformer 3, the phase shift amount $\theta2$ is controlled to be greater than the phase shift amount $\theta1$ by an amount exceeding the short-circuit prevention time, irrespective of the duty cycle.

In discharge control in which the duty cycle is negative, the control circuit 20 keeps the phase shift amount $\theta3$ (=$\theta2$) minimum and adds the offset phase to the value of the phase shift amount $\theta4$ (=$\theta1$) calculated on the basis of the duty cycle. At this time, a diagonal ON time t3 (=t2) is kept maximum, and the short-circuit prevention time td is subtracted from the calculated value of a diagonal ON time t4 (=t1).

Thus, in discharge control in which the duty cycle is negative, in the case where transmission power to the battery 2 is negative or zero and step-up control is performed in which output voltage to the first DC power supply 1 is higher than voltage generated at the first winding 3a of the transformer 3, the phase shift amount $\theta4$ is controlled to be greater than the phase shift amount $\theta3$ by an amount exceeding the short-circuit prevention time, irrespective of the duty cycle.

Figure 29:
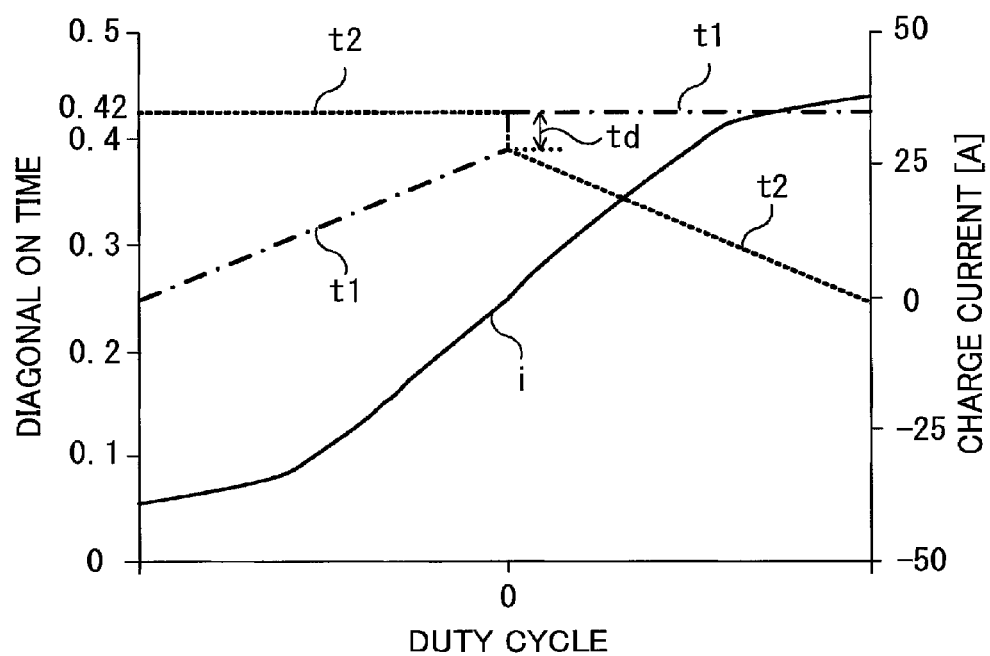
FIG. 29 is a waveform diagram showing charge current in the battery charge/discharge device according to embodiment 1 of the present invention.

FIG. 29 shows transition of the charge current i when the diagonal ON times t1, t2 are changed as shown in FIG. 28. In this case, the same condition as in the case shown in FIG. 5 is set, that is, the voltage values of the DC power supply 1 and the battery 2 are set to be equal to each other, the turns ratio of the transformer 3 is set at 1:1, and the short-circuit prevention time td is set at 4% of the switching cycle. Here, the diagonal ON time t3 is shown as t2, and the diagonal ON time t4 is shown as t1.

As shown in FIG. 29, one of the diagonal ON times t1, t2 is set at the maximum ON time tmax (0.42), and the other one is decreased to be smaller than (tmax−td). Thus, it is possible to ensure a period during which only one of the positive-side and negative-side semiconductor switching elements is turned on to generate a route (circulation route) through which current circulates so that the first reactor 9 or the second reactor 10 is excited, whereby the battery charge/discharge device 100 reliably performs step-up operation to perform bidirectional power transmission. In this case, there is no period in which the charge current i remains constant as shown in FIG. 5, and the transmission power can be reliably controlled.

As described above, in the case where the charge current i is zero when the duty cycle is zero, the offset phase is added to the phase shift amount $\theta 2$ in a region in which the duty cycle is positive or zero, and is added to the phase shift amount $\theta 4$ ($=\theta 1$) in a region in which the duty cycle is negative, whereby deterioration in controllability due to the short-circuit prevention time can be prevented and the transmission power can be reliably controlled by reliable step-up operation.

The above description is for the case where the voltage values of the DC power supply 1 and the battery 2 are equal to each other. Hereinafter, the case where the voltage value of the battery 2 is greater than the voltage value of the DC power supply 1 will be described. In the case where the voltage value of the battery 2 is smaller than the voltage value of the DC power supply 1, the operation is merely reversed between charging and discharging, and therefore the description thereof is omitted.

Figure 30:
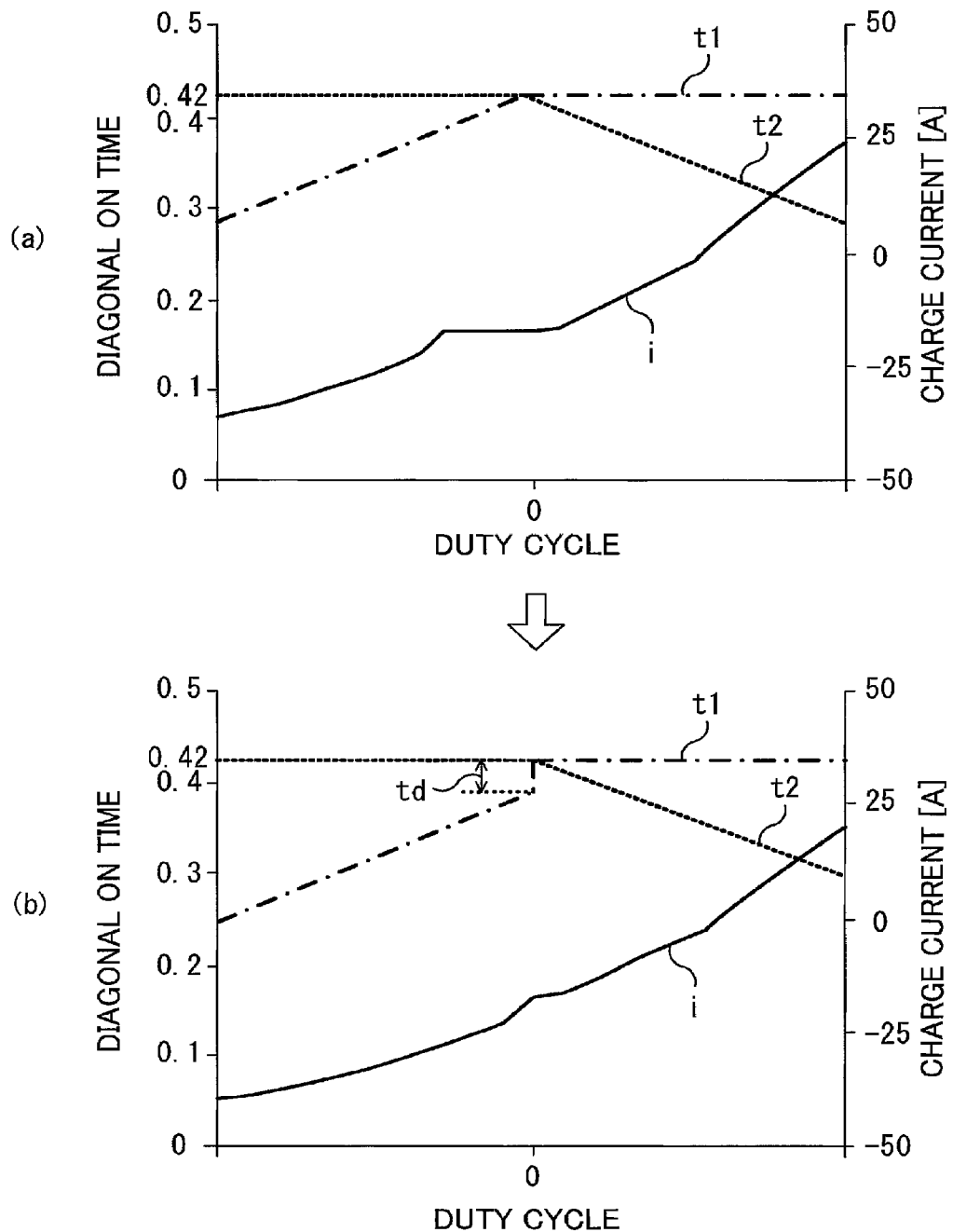
FIG. 30 is a waveform diagram showing charge current in another example of the battery charge/discharge device according to embodiment 1 of the present invention.

FIG. 30($a$) and FIG. 30($b$) show transition of the charge current i, where the voltage value of the battery 2 is set to be greater than the voltage value of the DC power supply 1, the turns ratio of the transformer 3 is set at 1:1, and the short-circuit prevention time td is set at 4% of the switching cycle. FIG. 30($a$) shows transition of the charge current i in the basic control operation shown in FIG. 4, and FIG. 30($b$) shows transition of the charge current i in the control operation in which the offset phase is added in the present embodiment. Here, the diagonal ON time t3 is shown as t2, and the diagonal ON time t4 is shown as t1.

In this case, current discharged from the battery 2 can be supplied without step-up operation, and therefore, when the duty cycle is zero, the charge current i is negative, that is, the transmission power is negative.

In the basic control operation, as shown in FIG. 30($a$), when the difference between the two diagonal ON times t1, t2 is greater than the short-circuit prevention time td, the charge current i changes in accordance with the duty cycle by reliable step-up operation. In a range of t1≥t2 and t1≤t2+td, charge control is performed in which the diagonal ON time t1 is kept maximum and the diagonal ON time t2 is decreased, but the charge current i has a negative value so that, actually, discharging is performed, and the charge current i changes in accordance with the duty cycle.

In discharge control in which the diagonal ON time t2 is kept maximum and the diagonal ON time t1 is decreased, in a range of t1<t2 and t2≤t1+td, the charge current i remains at a constant value (in this case, negative value).

In this case, when the duty cycle is zero at which the control switches between charge control and discharge control, the charge current i is negative, that is, the transmission power is negative, and as shown in FIG. 30($b$), in a region in which the duty cycle is negative, the offset phase is added to the phase shift amount $\theta 4$ ($=\theta 1$). The added offset phase is a phase corresponding to the short-circuit prevention time td.

That is, in charge control in which the duty cycle is positive or zero, the control circuit 20 uses the phase shift amounts $\theta 1$, $\theta 2$ calculated on the basis of the duty cycle, and the diagonal ON time t1 is kept maximum and the diagonal ON time t2 which is the calculated value decreases when the duty cycle increases.

In this charge control, in the case where the charge current i is positive or zero, that is, the transmission power to the battery 2 is positive or zero, and step-up control is performed in which output voltage to the battery 2 is higher than voltage generated at the second winding 3$b$ of the transformer 3, the phase shift amount $\theta 2$ is controlled to be greater than the phase shift amount $\theta 1$ by an amount exceeding the short-circuit prevention time, irrespective of the duty cycle.

In discharge control in which the duty cycle is negative, the control circuit 20 keeps the phase shift amount $\theta 3$ ($=\theta 2$) minimum and adds the offset phase to the value of the phase shift amount $\theta 4$ ($=\theta 1$) calculated on the basis of the duty cycle. At this time, the diagonal ON time t3 ($=t2$) is kept maximum, and the short-circuit prevention time td is subtracted from the calculated value of the diagonal ON time t4 ($=t1$).

Thus, in discharge control in which the duty cycle is negative, in the case where transmission power to the battery 2 is negative and step-up control is performed in which output voltage to the first DC power supply 1 is higher than voltage generated at the first winding 3$a$ of the transformer 3, the phase shift amount $\theta 4$ is controlled to be greater than the phase shift amount $\theta 3$ by an amount exceeding the short-circuit prevention time, irrespective of the duty cycle.

Thus, in discharge control, the difference between the two diagonal ON times t4 (t1) and t3 (t2) is set to be greater than the short-circuit prevention time td, to ensure a period during which only one of the positive-side and negative-side semiconductor switching elements is turned on to generate a route (circulation route) through which current circulates so that the first reactor 9 is excited, whereby the battery charge/discharge device 100 reliably performs step-up operation to perform power transmission. Therefore, both in charge control and discharge control, there is no period in which the charge current i remains constant, and the transmission power can be reliably controlled.

In the case where, when the duty cycle is zero at which the control switches between charge control and discharge control, the charge current i is positive, that is, the transmission power is positive, in a charge control region in which the duty cycle is positive or zero, the offset phase corresponding to the short-circuit prevention time td is added to the phase shift amount $\theta 2$. Thus, in the charge control, a period in which the charge current i remains constant can be eliminated, and the transmission power can be reliably controlled.

As described above, in the present embodiment, the control circuit 20 performs control such that: in the case where the transmission power is positive when the duty cycle is zero, the offset phase is added to the phase shift amount $\theta 2$ in the charge control period; in the case where the transmission power is negative when the duty cycle is zero, the offset phase is added to the phase shift amount $\theta 4$ ($=\theta 1$) in the discharge control period; and in the case where the transmission power is zero when the duty cycle is zero, the offset phase is added to both the phase shift amount $\theta 2$ in the charge control period and the phase shift amount $\theta 4$ ($=\theta 1$) in the discharge control period.

The polarity of the charge current i, i.e., the polarity of the transmission power, in the short-circuit prevention time td, can be predicted from the voltage relationship between the battery 2 and the DC power supply 1. Therefore, addition of the offset phase may be determined in accordance with the voltage relationship between the battery 2 and the DC power supply 1.

In the case where the turns ratio between the first winding 3a and the second winding 3b of the transformer 3 is set at NL:NB, if the voltage value of the DC power supply 1 is greater than NL/NB times of the voltage value of the battery 2, the transmission power is positive when the duty cycle is zero, and the offset phase is added to the phase shift amount θ2 in the charge control period. If the voltage value of the DC power supply 1 is smaller than NL/NB times of the voltage value of the battery 2, the transmission power is negative when the duty cycle is zero, and the offset phase is added to the phase shift amount θ4 (=θ1) in the discharge control period. If the voltage value of the DC power supply 1 is equal to NL/NB times of the voltage value of the battery 2, the transmission power is zero when the duty cycle is zero, and the offset phase is added to both the phase shift amount θ2 in the charge control period and the phase shift amount θ4 (=θ1) in the discharge control period.

Such control can prevent controllability from being deteriorated because step-up operation cannot be performed due to the short-circuit prevention time, and thus the transmission power can be reliably controlled.

Embodiment 2

Next, embodiment 2 of the present invention will be described.

In the above embodiment 1, the control circuit 20 performs charge/discharge control involving step-up operation, as basic control. In the present embodiment, the case where step-down control is also performed will be described.

In the present embodiment, the circuit configuration of the battery charge/discharge device 100 is the same as that shown in FIG. 1 in the above embodiment 1, and the operation of the control circuit 20 shown in FIG. 2 is also the same as in the above embodiment 1.

Figure 31:
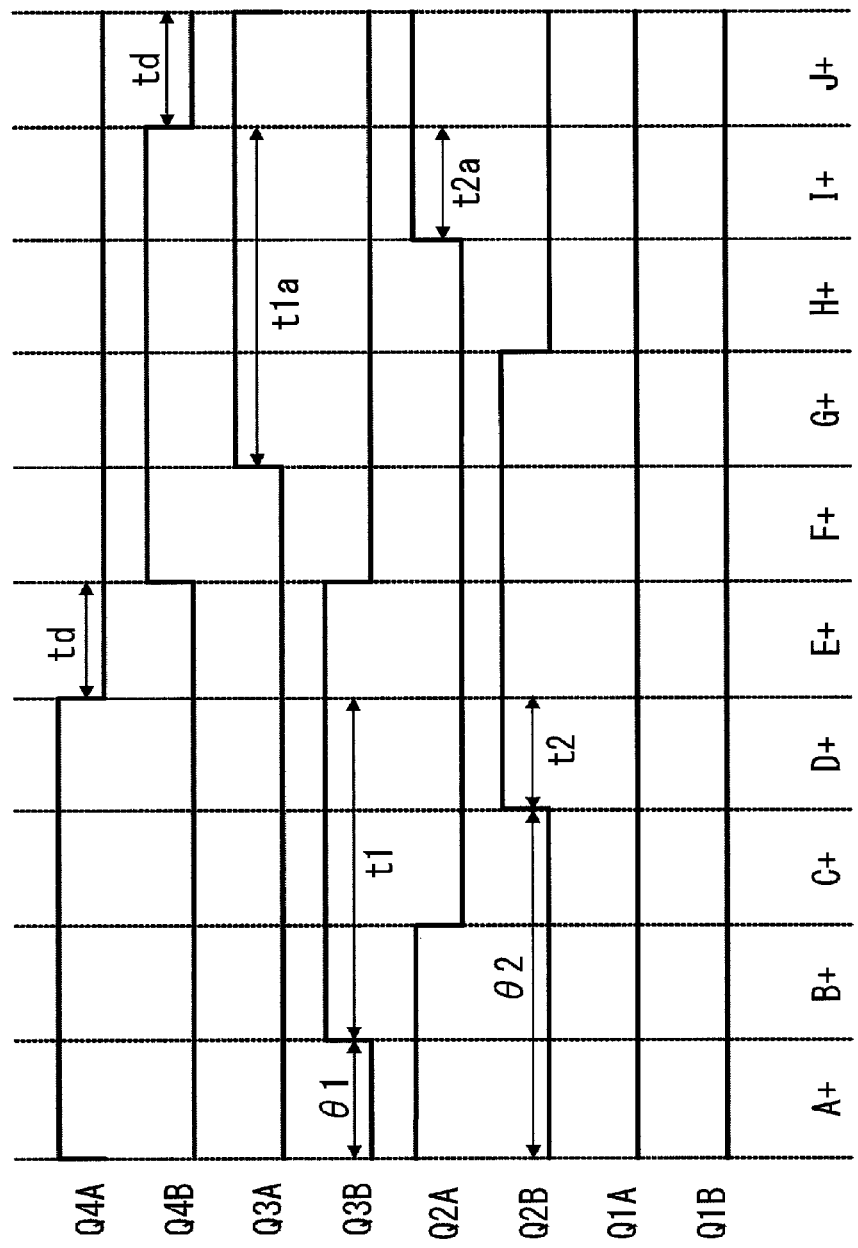
FIG. 31 is a waveform diagram of drive signals in step-up charging by the phase shift method in a battery charge/discharge device according to embodiment 2 of the present invention.

FIG. 31 is a diagram showing waveforms of the drive signals 21a, 21b for the semiconductor switching elements Q of the first switching circuit 5 and the second switching circuit 8 in step-up charging of the battery charge/discharge device 100 according to the present embodiment 2. In this case, they are shown with periods A+ to J+ allocated for respective plurality of gate patterns which are combination patterns of the drive signals. Also in the present embodiment, in FIG. 31, for convenience sake, the drive signals for Q4A, Q4B, Q3A, Q3B, Q2A, Q2B, Q1A, Q1B are denoted by the reference characters of these elements.

In this case, the entire drive signals are generated using, as a reference, a first bridge circuit (Q4A, Q4B) which is one of the bridge circuits in the first switching circuit 5. Q1A and Q1B of a second bridge circuit (Q1A, Q1B) which is one of the bridge circuits in the second switching circuit 8 are kept in an OFF state.

In the three bridge circuits other than the second bridge circuit (Q1A, Q1B), the positive-side (high-voltage-side) Q4A, Q3A, Q2A and the negative-side (low-voltage-side) Q4B, Q3B, Q2B composing the bridge circuits are each controlled at an ON time ratio of 50% excluding a short-circuit prevention time td. The short-circuit prevention time td is set for preventing the positive-side semiconductor switching element and the negative-side semiconductor switching element from being turned on at the same time, and when the set short-circuit prevention time td has elapsed since one of the semiconductor switching elements was turned off, the other one is turned on. In this case, the setting is made such that, in order that the semiconductor switching elements Q of the first switching circuit 5 on the power transmitting side perform zero voltage switching, voltage of the capacitor 13 connected in parallel to each semiconductor switching element Q increases to be voltage of the first smoothing capacitor 4 or decreases to be close to zero voltage, during the short-circuit prevention time td.

Q4A in the first bridge circuit (Q4A, Q4B) is set as a first reference element, Q1A in the second bridge circuit (Q1A, Q1B) is set as a second reference element, Q3B diagonal to the first reference element Q4A is set as a first diagonal element, and Q2B diagonal to the second reference element Q1A is set as a second diagonal element.

A phase shift amount θ1 (first phase shift amount) of the drive signal for the first diagonal element Q3B relative to the phase of the drive signal for the first reference element Q4A, and a phase shift amount θ2 (second phase shift amount) of the drive signal for the second diagonal element Q2B relative to the phase of the drive signal for the first reference element Q4A are determined in accordance with the duty cycle which is a control command. That is, the phase shift amounts θ1, θ2 are controlled in accordance with the duty cycle. In this case, the phase shift amount θ1 is kept minimum, and the phase shift amount θ2 is changed in accordance with the duty cycle.

As shown in FIG. 31, the period during which the first reference element Q4A and the first diagonal element Q3B are both ON is defined as a diagonal ON time t1, and the diagonal ON time t1 is determined by the phase shift amount θ1. A diagonal ON time t1a during which Q4B and Q3A are both ON is also equal to the diagonal ON time t1.

For the second bridge circuit (Q1A, Q1B), drive signals equal to those for the first bridge circuit (Q4A, Q4B) are assumed as virtual drive signals, and the period during which the virtual ON period of Q1A based on the virtual drive signal for the second reference element Q1A overlaps the ON period of the second diagonal element Q2B, is defined as a virtual diagonal ON time t2. The virtual diagonal ON time t2 is determined by the phase shift amount θ2 of the drive signal for the second diagonal element Q2B relative to the phase of the drive signal for the first reference element Q4A. The virtual diagonal ON time t2a during which the virtual ON period of Q1B based on the virtual drive signal for Q1B overlaps the ON period of Q2A is also equal to the virtual diagonal ON time t2.

FIG. 32 to FIG. 41 show current routes according to the respective gate patterns in FIG. 31. FIG. 32 to FIG. 41 respectively correspond to the periods B+ to J+ and then the period A+ in FIG. 31, in this order.

Hereinafter, operation of the battery charge/discharge device 100 in one cycle will be described with reference to FIG. 31 and FIG. 32 to FIG. 41. Here, voltage of the battery 2 is higher than voltage generated at the second winding 3b, and power is transmitted from the DC power supply 1 to the battery 2.

For convenience sake, the description will be started from the period B+.

Figure 32:
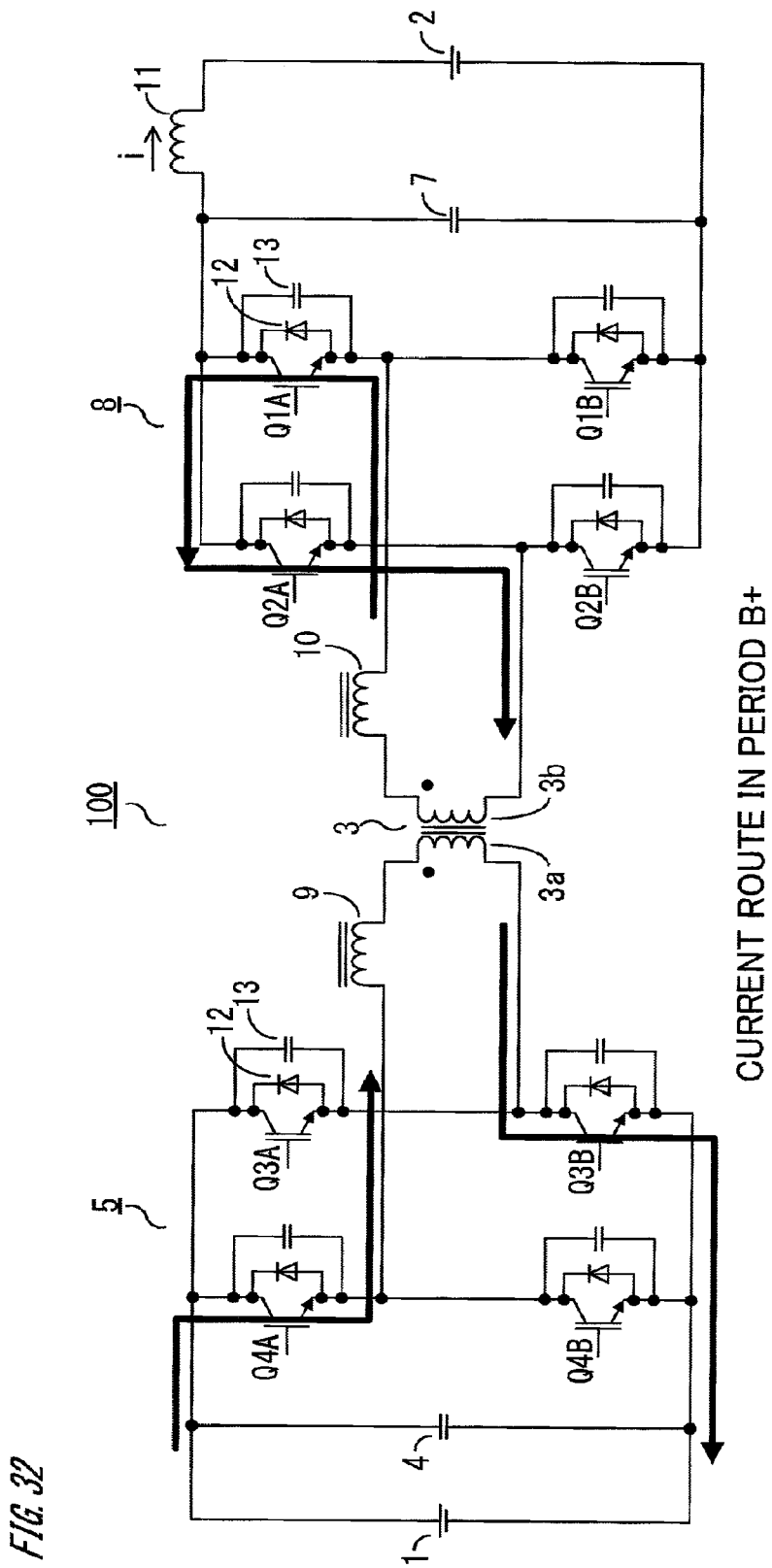
FIG. 32 is a current route diagram illustrating step-up charging operation of the battery charge/discharge device according to embodiment 2 of the present invention.

During the period B+, in the first switching circuit 5, Q4A and Q3B are ON and thus the diagonal two elements are conductive. Therefore, energy is transmitted via Q4A and Q3B from the DC power supply 1 side. The polarity of current is opposite to those in the period J+ and the period A+ described later. In the second switching circuit 8, Q2A is turned on, and therefore current circulates via the diode of Q1A, and Q2A. Thus, the period B+ is a period during which the first reactor 9 and the second reactor 10 are excited (FIG. 32).

Figure 33:
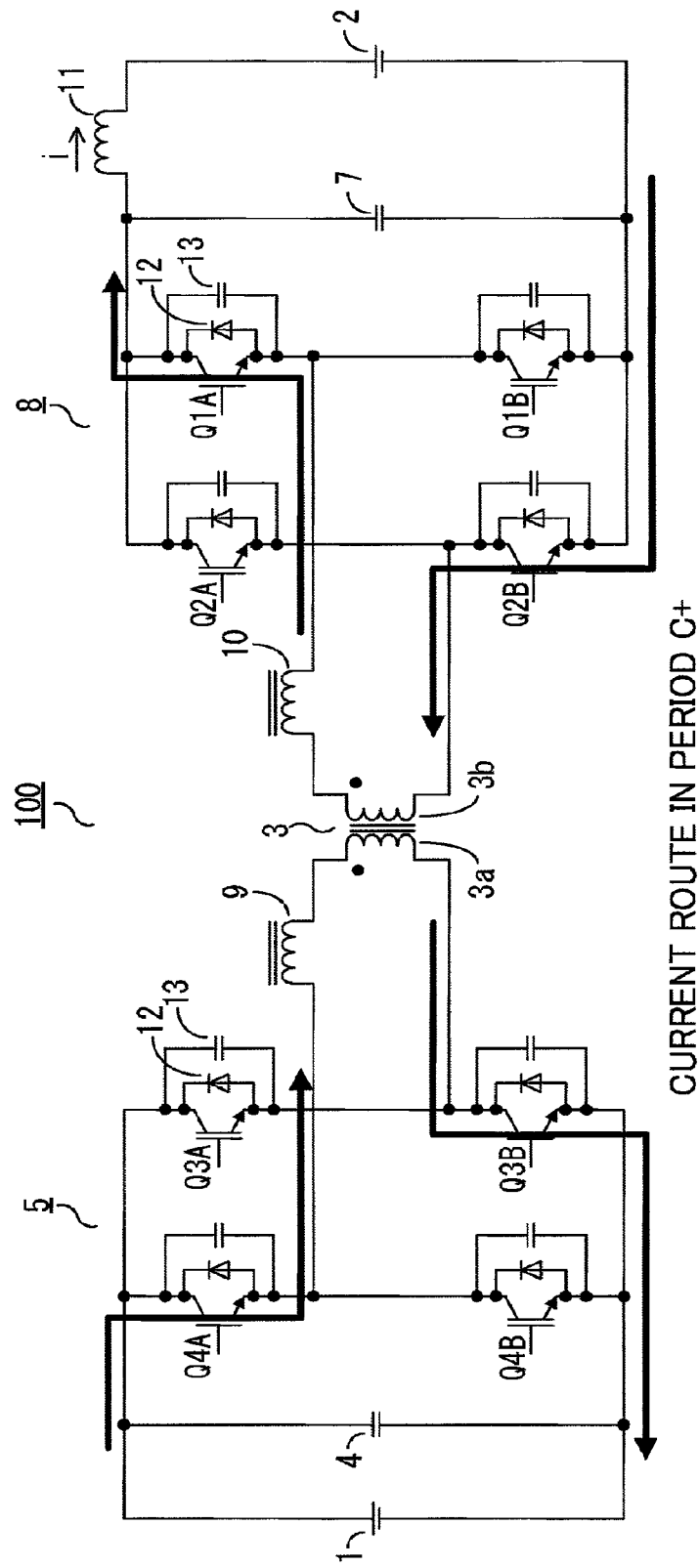
FIG. 33 is a current route diagram illustrating step-up charging operation of the battery charge/discharge device according to embodiment 2 of the present invention.

During the period C+, in the first switching circuit 5, Q4A and Q3B are ON and thus the diagonal two elements are conductive. Therefore, energy is transmitted from the DC power supply 1 side. In the second switching circuit 8, Q2A is turned off, current flows via the diode of Q2B from the diode of Q1A, and power is transmitted to the battery 2 side. Thus, the period C+ is a period during which the excitation energy of the first reactor 9 and the second reactor 10 is transmitted to the battery 2 side (FIG. 33).

Figure 34:
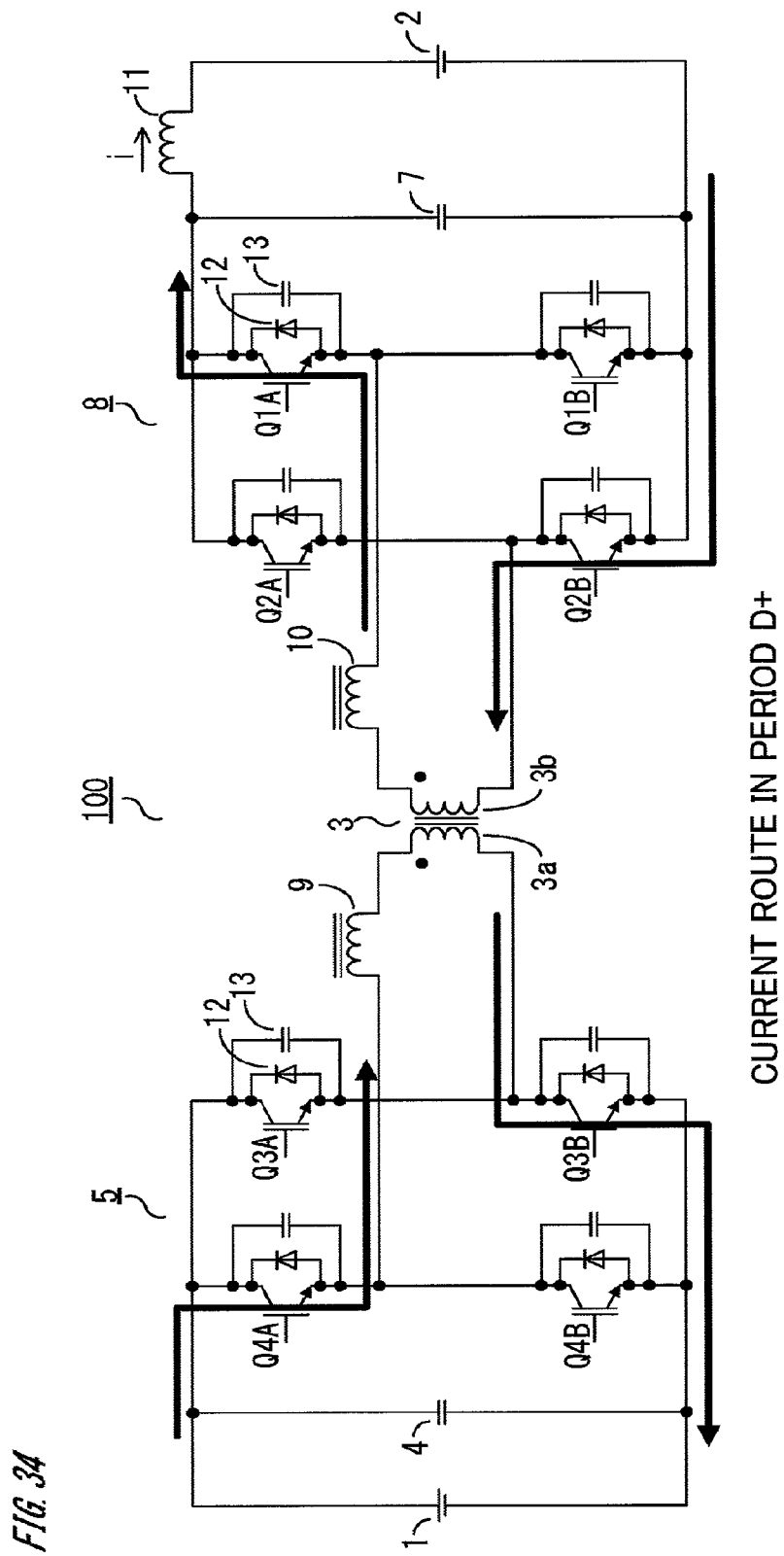
FIG. 34 is a current route diagram illustrating step-up charging operation of the battery charge/discharge device according to embodiment 2 of the present invention.

During the period D+, in the first switching circuit 5, Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from the diode of Q1A, and power is transmitted to the battery 2 side. Thus, the period D+ is a period during which the excitation energy of the first reactor 9 and the second reactor 10 is transmitted to the battery 2 side (FIG. 34).

Figure 35:
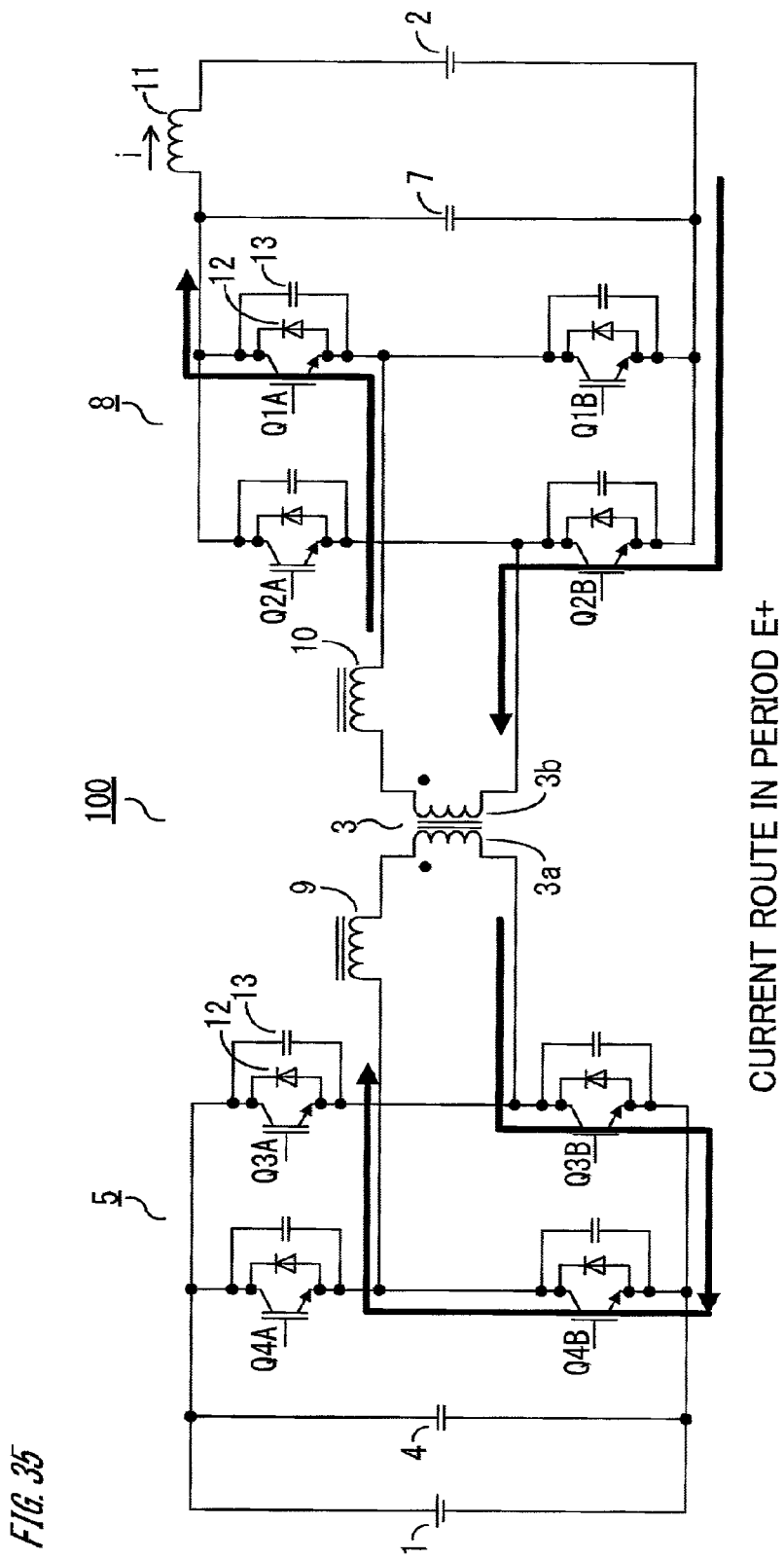
FIG. 35 is a current route diagram illustrating step-up charging operation of the battery charge/discharge device according to embodiment 2 of the present invention.

During the period E+, in the first switching circuit 5, Q4A is turned off and current circulates via the diode of Q4B, and Q3B. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the period E+ is a period during which the circulation current decreases (FIG. 35).

Figure 36:
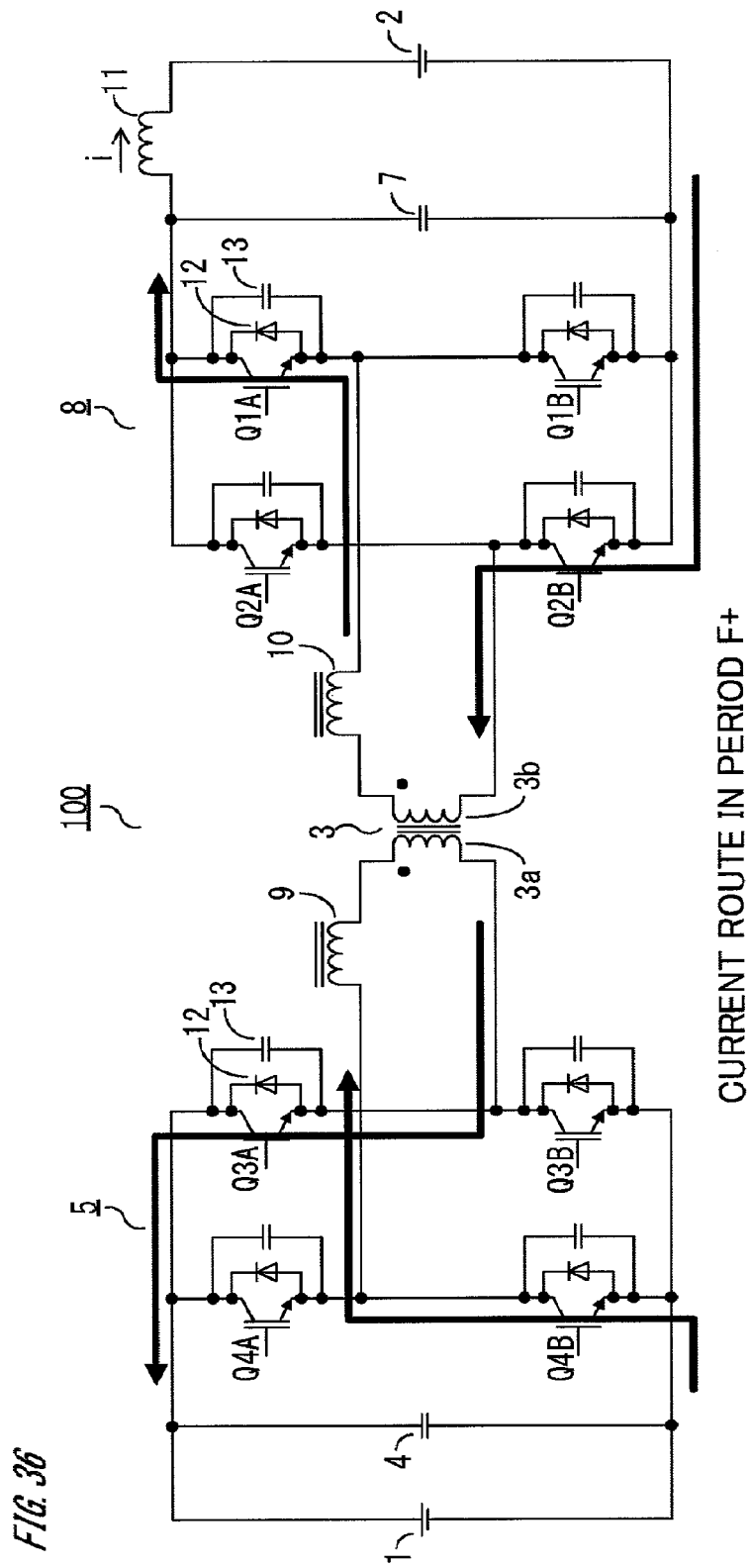
FIG. 36 is a current route diagram illustrating step-up charging operation of the battery charge/discharge device according to embodiment 2 of the present invention.

During the period F+, in the first switching circuit 5, Q3B is turned off and Q4B is turned on. Since Q4B is turned on from a diode conductive state, ZVS (zero voltage switching) is achieved. If, in the period E+, the circulation current is greater than 0 [A], that is, some current remains, current is regenerated via Q4B or the diode of Q4B, and the diode of Q3A, to the DC power supply 1 side. In the second switching circuit 8, the diode of Q1A, and Q2B or the diode of Q2B are ON, and therefore the circulation current gradually decreases due to (voltage of DC power supply 1–voltage of battery 2). When the circulation current becomes 0 [A], the diode of Q1A is turned off and the current keeps 0 [A]. Thus, the period F is a period during which the circulation current decreases (FIG. 36).

Figure 37:
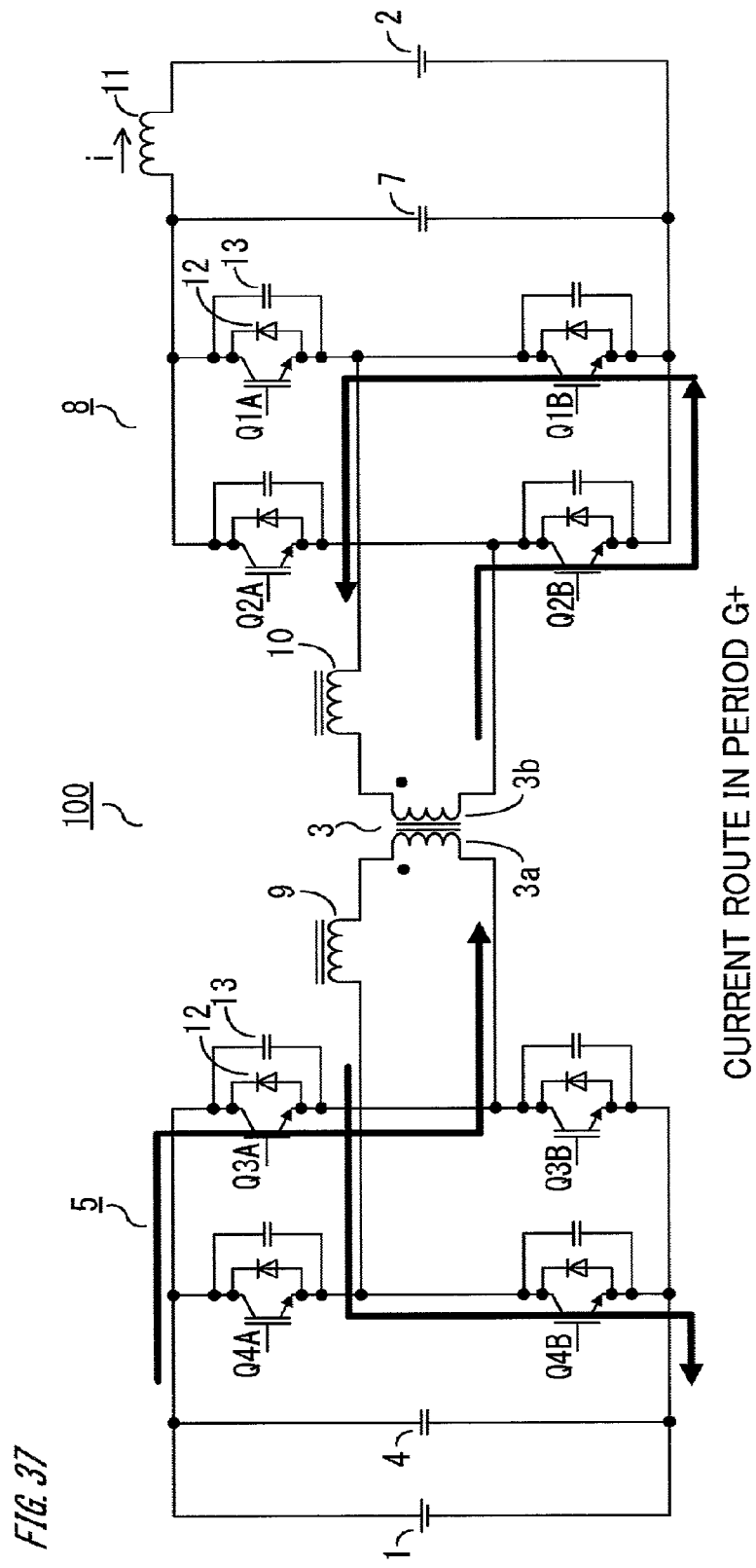
FIG. 37 is a current route diagram illustrating step-up charging operation of the battery charge/discharge device according to embodiment 2 of the present invention.

During the period G+, in the first switching circuit 5, Q3A is turned on, so that Q3A and Q4B are ON and thus the diagonal two elements are conductive. Therefore, energy is transmitted via Q3A and Q4B from the DC power supply 1 side. At this time, the polarity of current is opposite to that in the period F+. In the second switching circuit 8, Q2B is ON and therefore current circulates via the diode of Q1B, and Q2B. Thus, the period G+ is a period during which the first reactor 9 and the second reactor 10 are excited (FIG. 37).

Figure 38:
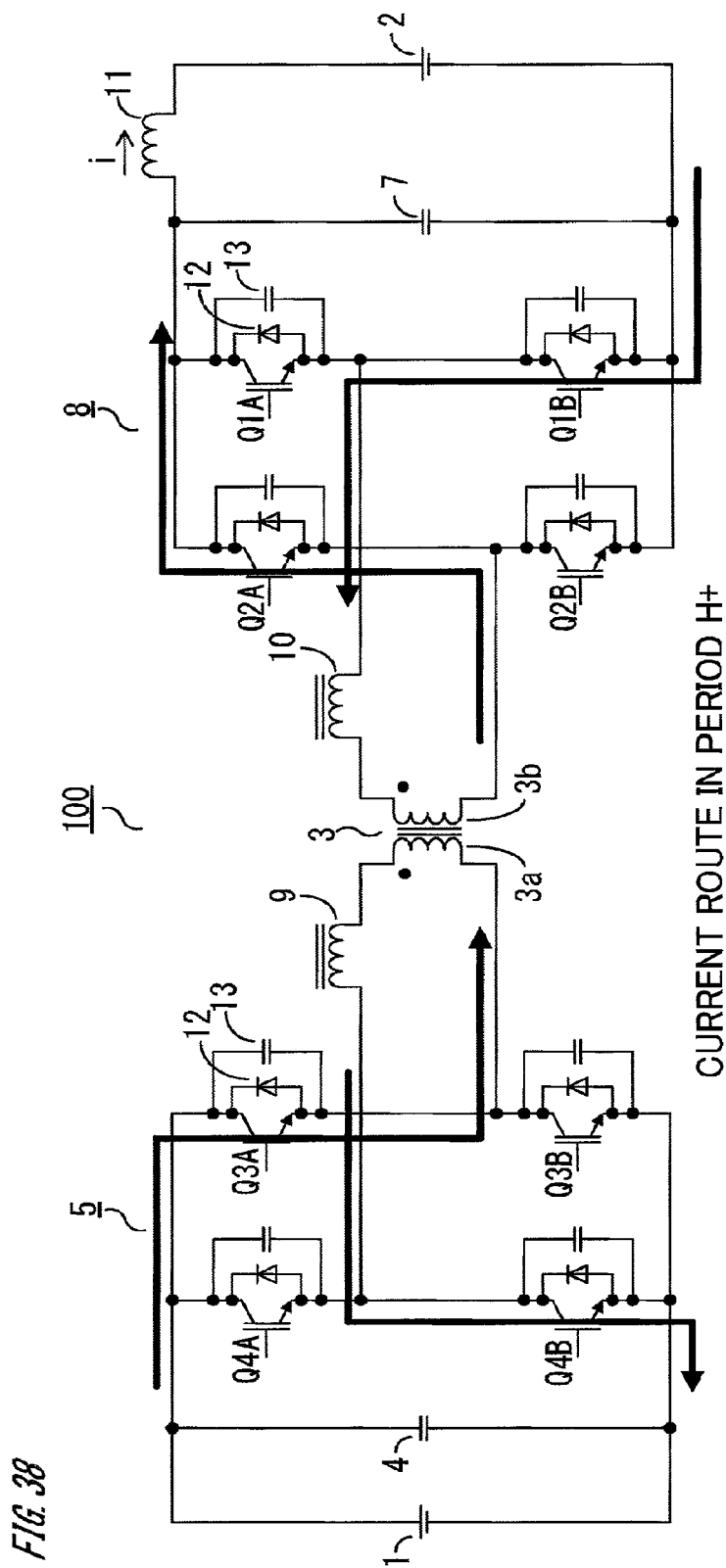
FIG. 38 is a current route diagram illustrating step-up charging operation of the battery charge/discharge device according to embodiment 2 of the present invention.

During the period H+, in the first switching circuit 5, Q3A and Q4B are ON and thus the diagonal two elements are conductive. Therefore, energy is transmitted via Q3A and Q4B from the DC power supply 1 side. In the second switching circuit 8, Q2B is turned off, current flows via the diode of Q2A and the diode of Q1B, and power is transmitted to the battery 2 side. Thus, the period H+ is a period during which the excitation energy of the first reactor 9 and the second reactor 10 is transmitted to the battery 2 side (FIG. 38).

Figure 39:
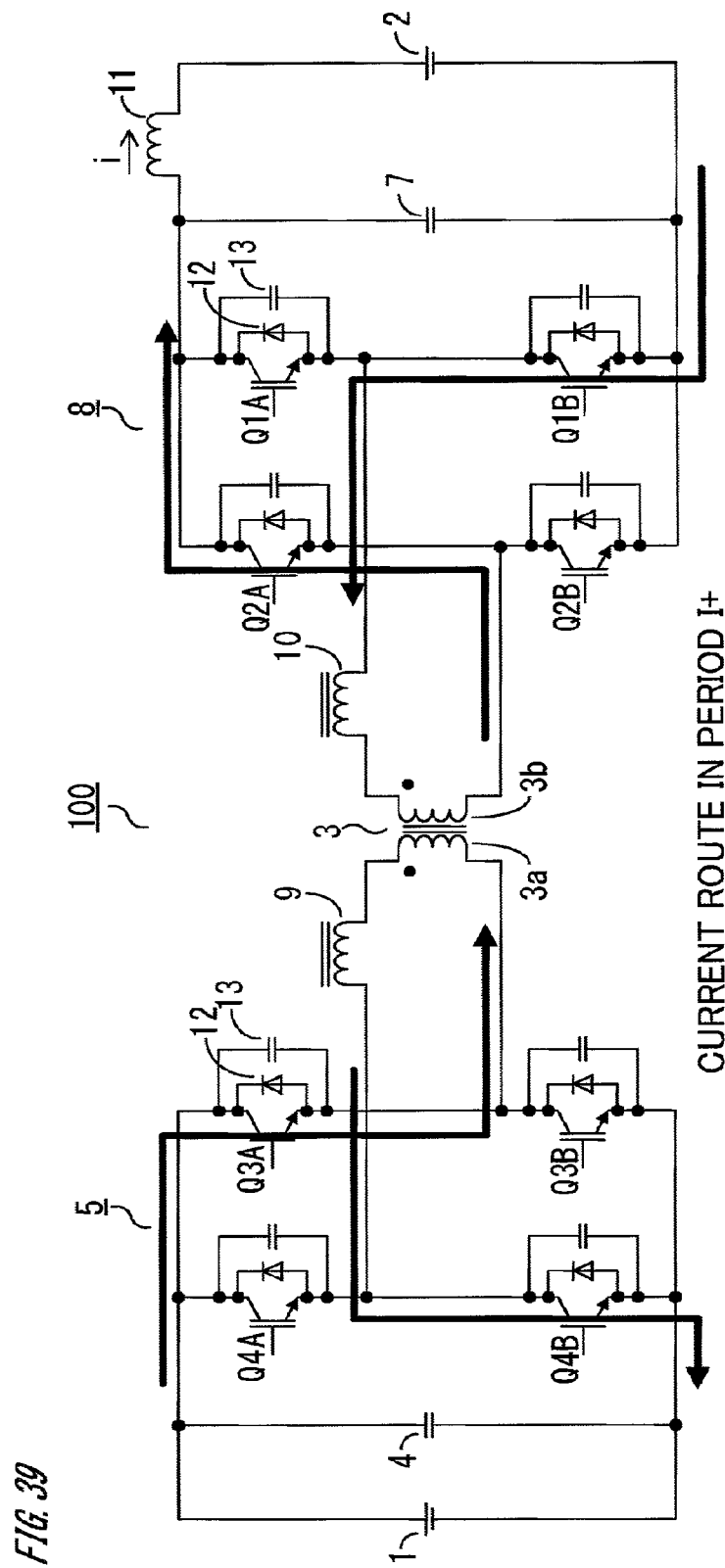
FIG. 39 is a current route diagram illustrating step-up charging operation of the battery charge/discharge device according to embodiment 2 of the present invention.

During the period I+, in the first switching circuit 5, Q3A and Q4B are ON and thus the diagonal two elements are conductive. Therefore, energy is transmitted from the DC power supply 1 side. In the second switching circuit 8, Q2A is turned on, current flows via Q2A or the diode of Q2A, and the diode of Q1B, and power is transmitted to the battery 2 side. Thus, the period I+ is a period during which the excitation energy of the first reactor 9 and the second reactor 10 is transmitted to the battery 2 side (FIG. 39).

Figure 40:
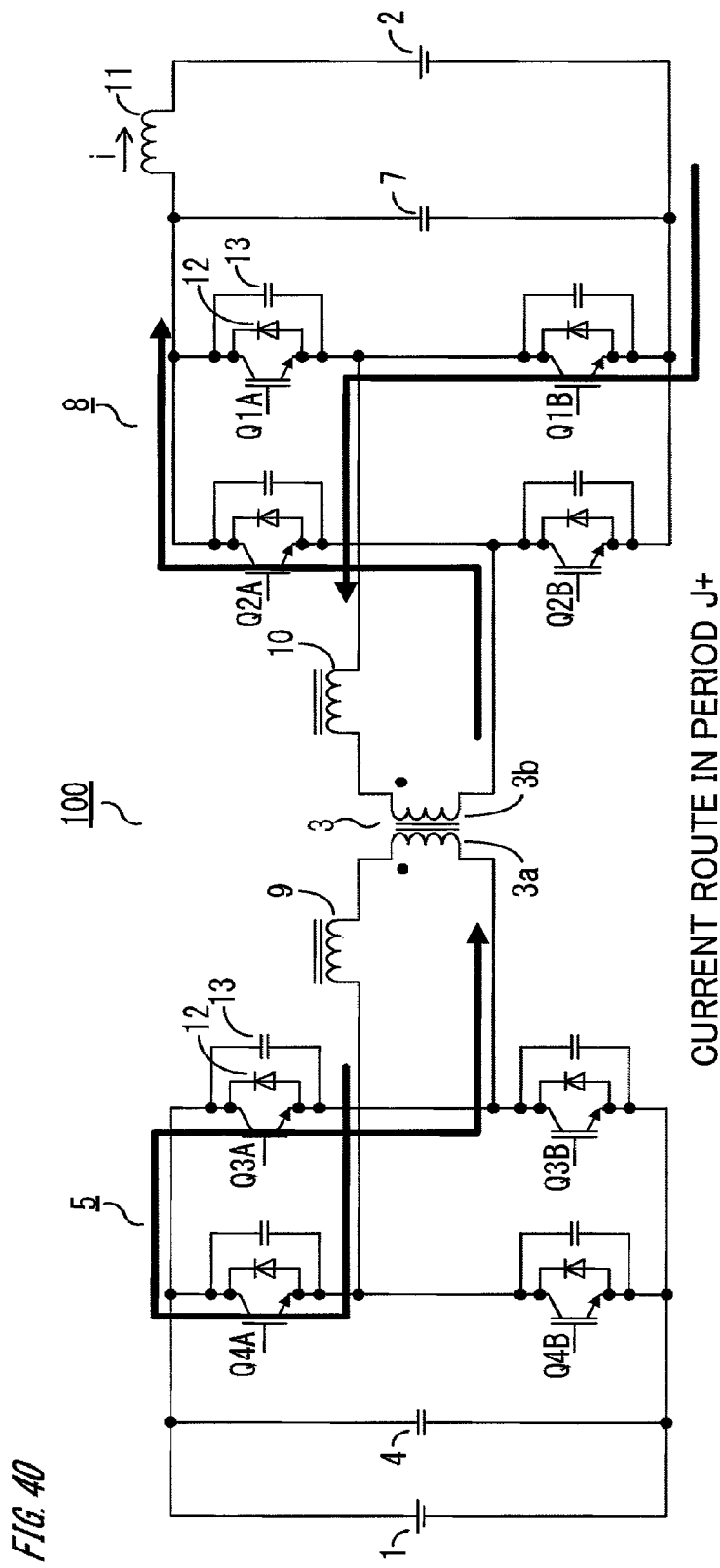
FIG. 40 is a current route diagram illustrating step-up charging operation of the battery charge/discharge device according to embodiment 2 of the present invention.

During the period J+, in the first switching circuit 5, Q4B is turned off and current circulates via the diode of Q4A, and Q3A. In the second switching circuit 8, Q2A or the diode of Q2A, and the diode of Q1B are ON, and therefore the circulation current gradually decreases due to voltage of the battery 2. When the circulation current becomes 0 [A], the diode of Q1B is turned off and the current keeps 0 [A]. Thus, the period J+ is a period during which the circulation current decreases (FIG. 40).

Figure 41:
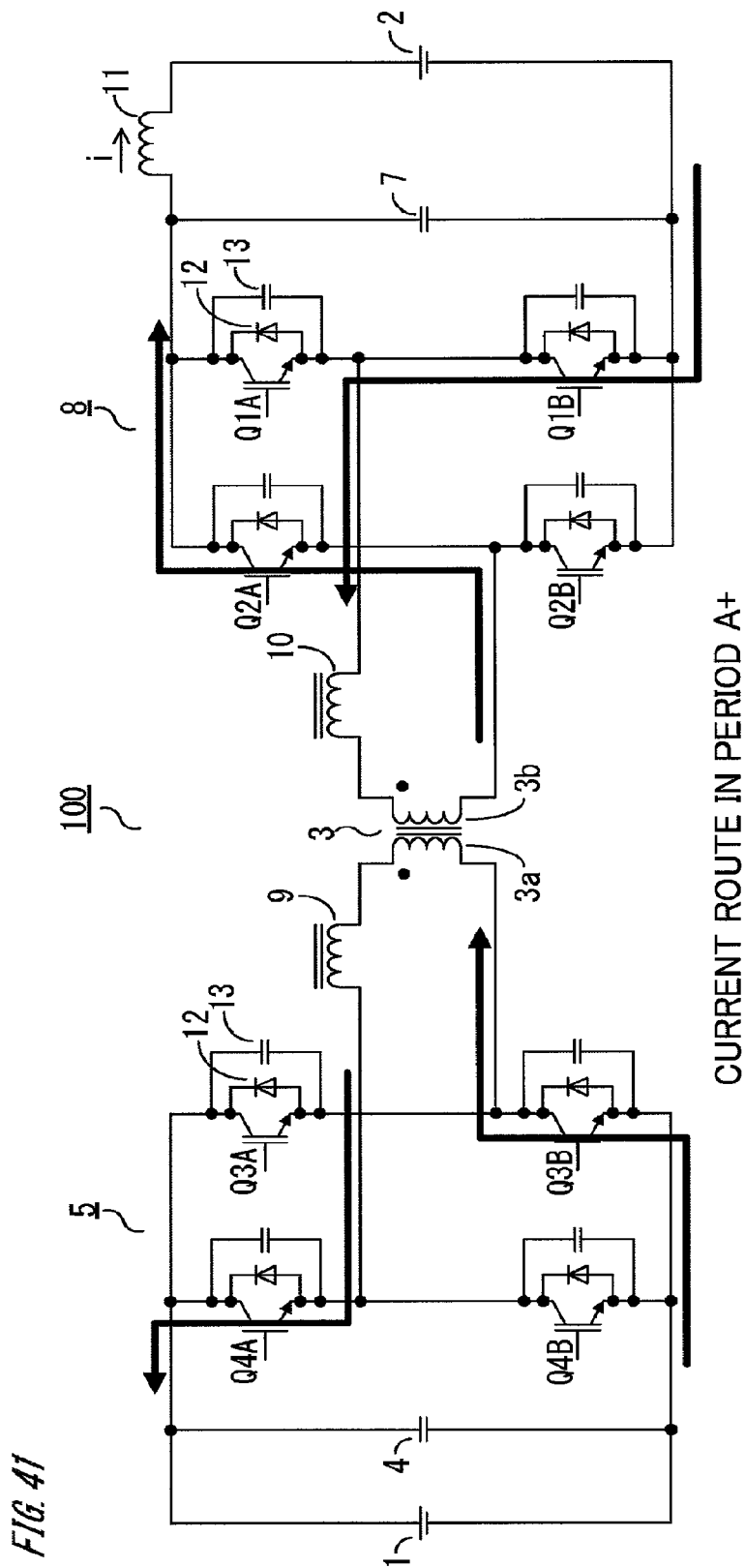
FIG. 41 is a current route diagram illustrating step-up charging operation of the battery charge/discharge device according to embodiment 2 of the present invention.

Next, during the period A+, in the first switching circuit 5, Q3A is turned off and Q4A is turned on. Since Q4A is turned on from a diode conductive state, ZVS (zero voltage switching) is achieved. If, in the period J+, the circulation current is greater than 0 [A], that is, some current remains, current is regenerated via Q4A or the diode of Q4A, and the diode of Q3B, to the DC power supply 1 side. In the second switching circuit 8, Q2A or the diode of Q2A, and the diode of Q1B are ON, and therefore the circulation current gradually decreases due to (voltage of DC power supply 1–voltage of battery 2). When the circulation current becomes 0 [A], the diode of Q1B is turned off and the current keeps 0 [A]. Thus, the period A+ is a period during which the circulation current decreases (FIG. 41).

Through repetition of such a series of controls (periods A+ to J+), the battery charge/discharge device 100 steps up voltage generated at the second winding 3b of the transformer 3 and supplies the resultant power to the battery 2.

If voltage of the DC power supply 1 is denoted by VL, the first switching circuit 5 outputs a positive pulse of voltage VL during the diagonal ON time t1 in which Q4A and Q3B are both ON, and outputs a negative pulse of voltage (−VL) during the diagonal ON time t1a in which Q4B and Q3A are both ON, to apply these pulses to the first winding 3a of the transformer 3. If the turns ratio between the first winding 3a and the second winding 3b of the transformer 3 is NL:NB, at this time, voltage of (±VL)×NB/NL is applied to the second winding 3b of the transformer 3.

In the second switching circuit 8, in the diagonal ON time (t1, t1a) during which voltage is applied to the transformer 3, a period (B+, G+) during which the second reactor 10 is excited is provided, that is, step-up operation is performed using the second reactor 10 as a step-up reactor.

All the switching operations of the semiconductor switching elements Q in the first switching circuit 5 on the primary side of the transformer 3 are zero voltage switching, owing to the effect of the capacitor 13 and the first reactor 9. As for the switching operations in the second switching circuit 8 on the secondary side, some of them are zero voltage switching.

Q1A and Q1B in the second bridge circuit (Q1A, Q1B) are kept in an OFF state. Therefore, in the periods E+ and F+, when the circulation current decreases to be 0 [A], the diode of Q1A is turned off and the current keeps 0 [A], so that reverse current does not flow. Also in the periods J+ and A+, when the circulation current decreases to be 0 [A], the diode of Q1B is turned off and the current keeps 0 [A], so that reverse current does not flow. Therefore, in the battery charge/discharge device 100, reactive power which does not contribute to power transmission is suppressed.

Figure 42:
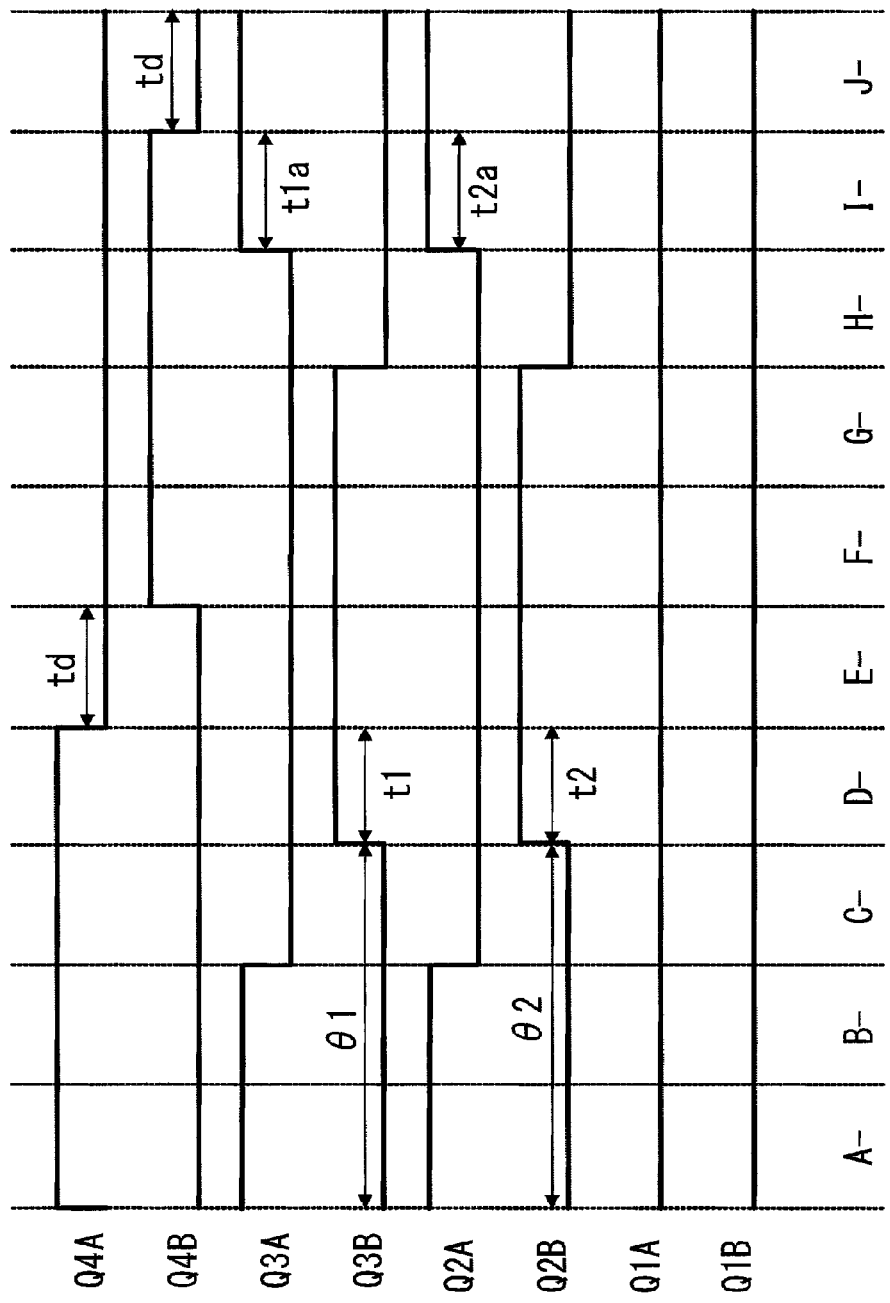
FIG. 42 is a waveform diagram of drive signals in step-down charging by the phase shift method in the battery charge/discharge device according to embodiment 2 of the present invention.

Next, FIG. 42 is a diagram showing waveforms of the drive signals 21a, 21b for the semiconductor switching elements Q of the first switching circuit 5 and the second switching circuit 8 in step-down charging of the battery charge/discharge device 100. Also in this case, they are shown with periods A− to J− allocated for respective plurality of gate patterns which are combination patterns of the drive signals, and for convenience sake, the drive signals for Q4A, Q4B, Q3A, Q3B, Q2A, Q2B, Q1A, Q1B are denoted by the reference characters of these elements.

As in the case of step-up charging shown in FIG. 31, the entire drive signals are generated using, as a reference, a first bridge circuit (Q4A, Q4B) in the first switching circuit 5, and Q1A and Q1B of a second bridge circuit (Q1A, Q1B) in the second switching circuit 8 are kept in an OFF state. In the three bridge circuits other than the second bridge circuit (Q1A, Q1B), the positive-side (high-voltage-side) Q4A, Q3A, Q2A and the negative-side (low-voltage-side) Q4B, Q3B, Q2B composing the bridge circuits are each controlled at an ON time ratio of 50% excluding the short-circuit prevention time td.

A phase shift amount $\theta 1$ (first phase shift amount) of the drive signal for the first diagonal element Q3B relative to the phase of the drive signal for the first reference element Q4A, and a phase shift amount $\theta 2$ (second phase shift amount) of the drive signal for the second diagonal element Q2B relative to the phase of the drive signal for the first reference element Q4A are determined in accordance with the duty cycle which is a control command. In this case, the phase shift amount $\theta 1$ is equal to the phase shift amount $\theta 2$, and both phase shift amounts $\theta 1$, $\theta 2$ are changed in accordance with the duty cycle.

Also in this case, the diagonal ON times t1, t1$a$ are determined by the phase shift amount $\theta 1$. In addition, if drive signals equal to those for the first bridge circuit (Q4A, Q4B) are assumed as virtual drive signals for the second bridge circuit (Q1A, Q1B), virtual diagonal ON times t2, t2$a$ as described above are determined by the phase shift amount $\theta 2$. In this case, the diagonal ON times t1, t1$a$ are equal to the virtual diagonal ON times t2, t2$a$.

FIG. 43 to FIG. 52 show current routes according to the respective gate patterns in FIG. 42. FIG. 43 to FIG. 52 respectively correspond to the periods D− to J− and then the periods A− to C− in FIG. 42, in this order.

Hereinafter, operation of the battery charge/discharge device 100 in one cycle will be described with reference to FIG. 42 and FIG. 43 to FIG. 52. Here, voltage of the battery 2 is lower than voltage generated at the second winding 3$b$, and power is transmitted from the DC power supply 1 to the battery 2.

For convenience sake, the description will be started from the period D−.

Figure 43:
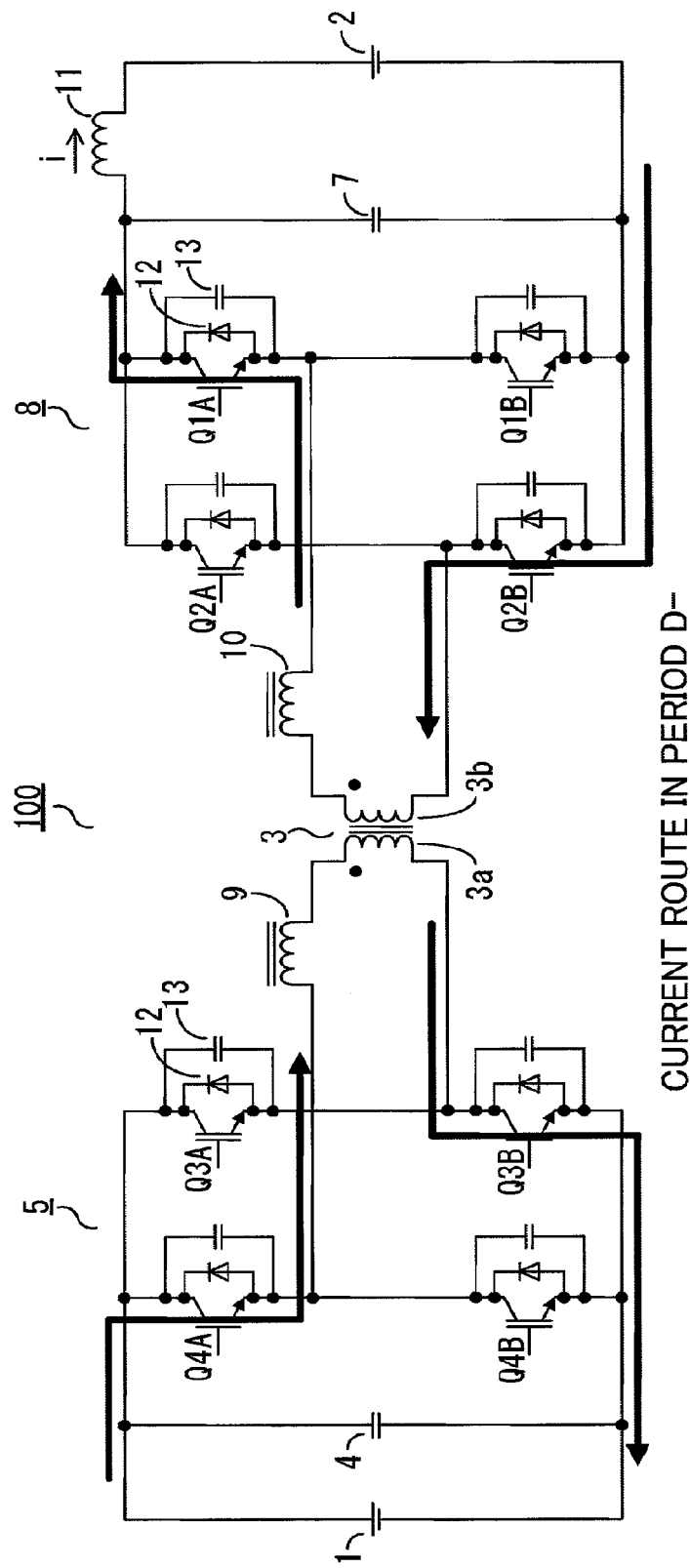
FIG. 43 is a current route diagram illustrating step-down charging operation of the battery charge/discharge device according to embodiment 2 of the present invention.

During the period D−, in the first switching circuit 5, Q3B is turned on, so that Q4A and Q3B are ON and thus the diagonal two elements are conductive. Therefore, energy is transmitted from the DC power supply 1 side. In the second switching circuit 8, Q2B is turned on, current flows via Q2B or the diode of Q2B from the diode of Q1A, and power is transmitted to the battery 2 side. Thus, the period D− is a period during which power is transmitted to the battery 2 side (FIG. 43).

Figure 44:
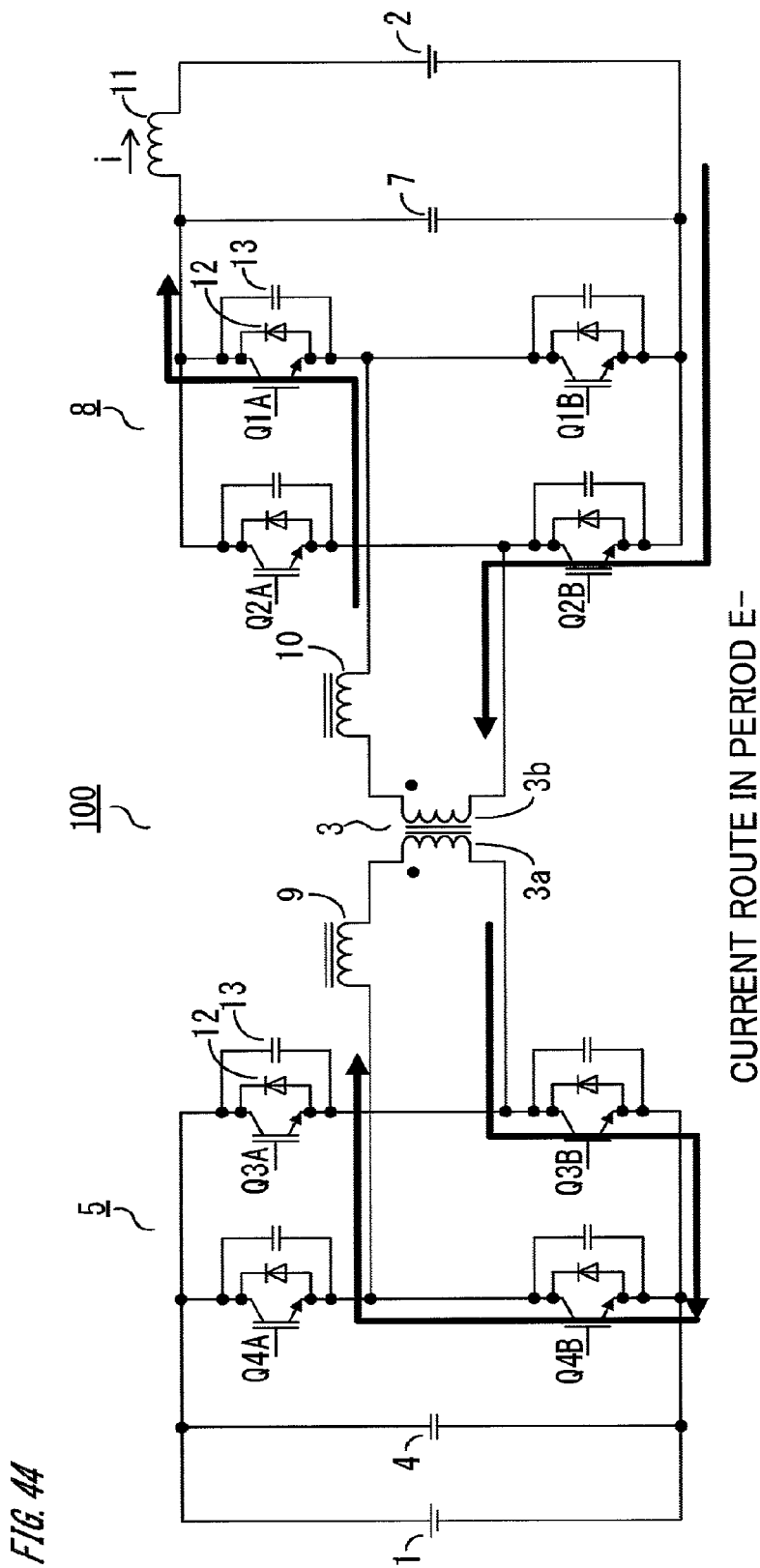
FIG. 44 is a current route diagram illustrating step-down charging operation of the battery charge/discharge device according to embodiment 2 of the present invention.

During the period E−, in the first switching circuit 5, Q4A is turned off and current circulates via the diode of Q4B, and Q3B. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the period E− is a period during which the circulation current decreases (FIG. 44).

Figure 45:
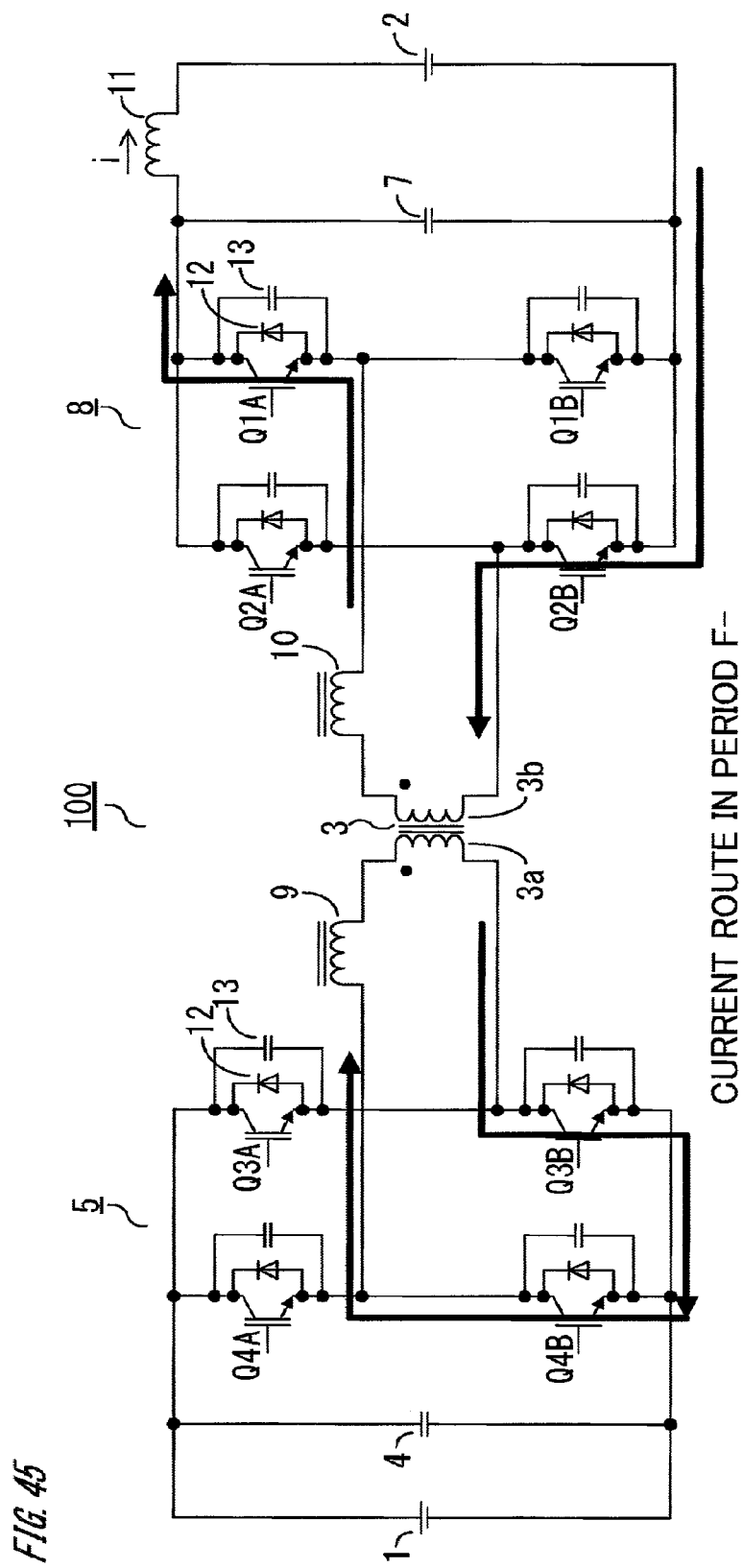
FIG. 45 is a current route diagram illustrating step-down charging operation of the battery charge/discharge device according to embodiment 2 of the present invention.
Figure 46:
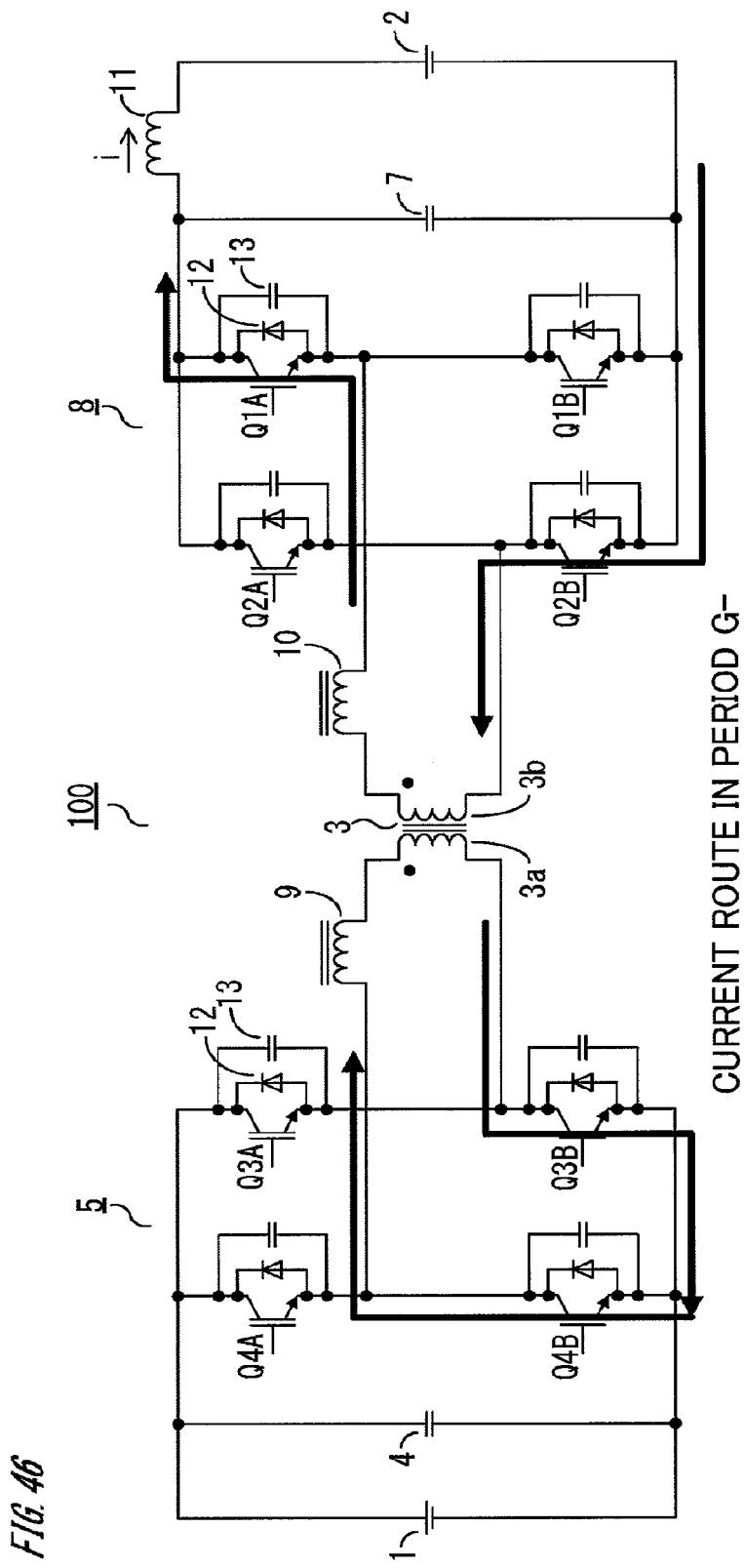
FIG. 46 is a current route diagram illustrating step-down charging operation of the battery charge/discharge device according to embodiment 2 of the present invention.

During the periods F−, G−, in the first switching circuit 5, Q4B is turned on and current circulates via Q4B or the diode of Q4B, and Q3B. Since Q4B is turned on from a diode conductive state, ZVS (zero voltage switching) is achieved. In the second switching circuit 8, the diode of Q1A, and Q2B or the diode of Q2B are ON, and therefore the circulation current gradually decreases due to voltage of the battery 2. When the circulation current becomes 0 [A], the diode of Q1A is turned off and the current keeps 0 [A]. Thus, the periods F−, G− are periods during which the circulation current decreases (FIG. 45, FIG. 46).

Figure 47:
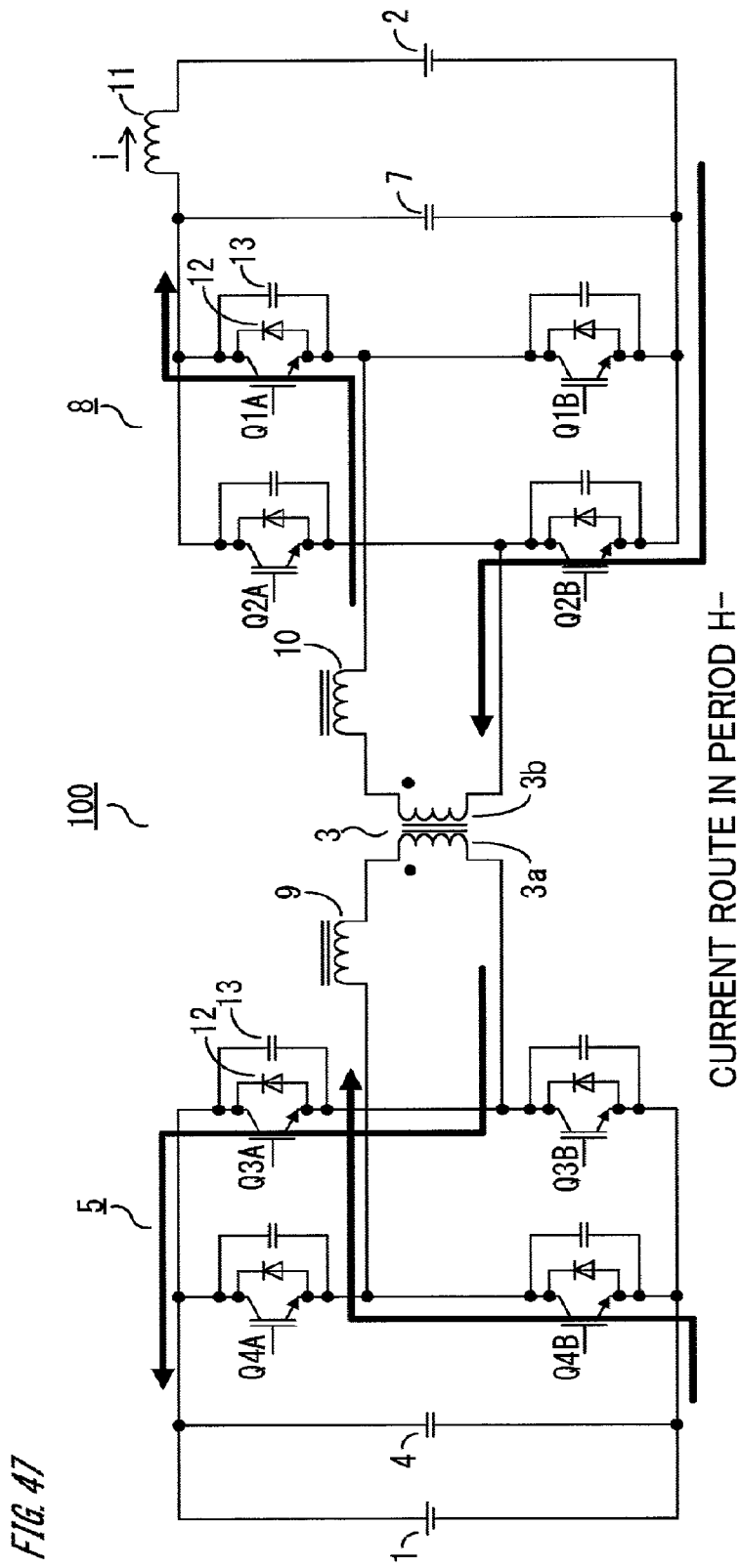
FIG. 47 is a current route diagram illustrating step-down charging operation of the battery charge/discharge device according to embodiment 2 of the present invention.

During the period H−, in the first switching circuit 5, Q3B is turned off, and if the circulation current is greater than 0 [A], that is, some current remains, current is regenerated via Q4B or the diode of Q4B, and the diode of Q3A, to the DC power supply 1 side. In the second switching circuit 8, Q2B is turned off, but since the diode of Q1A and the diode of Q2B are ON, the circulation current gradually decreases due to (voltage of DC power supply 1−voltage of battery 2). When the circulation current becomes 0 [A], the diode of Q1A is turned off and the current keeps 0 [A]. Thus, the period H− is a period during which the circulation current decreases (FIG. 47).

Figure 48:
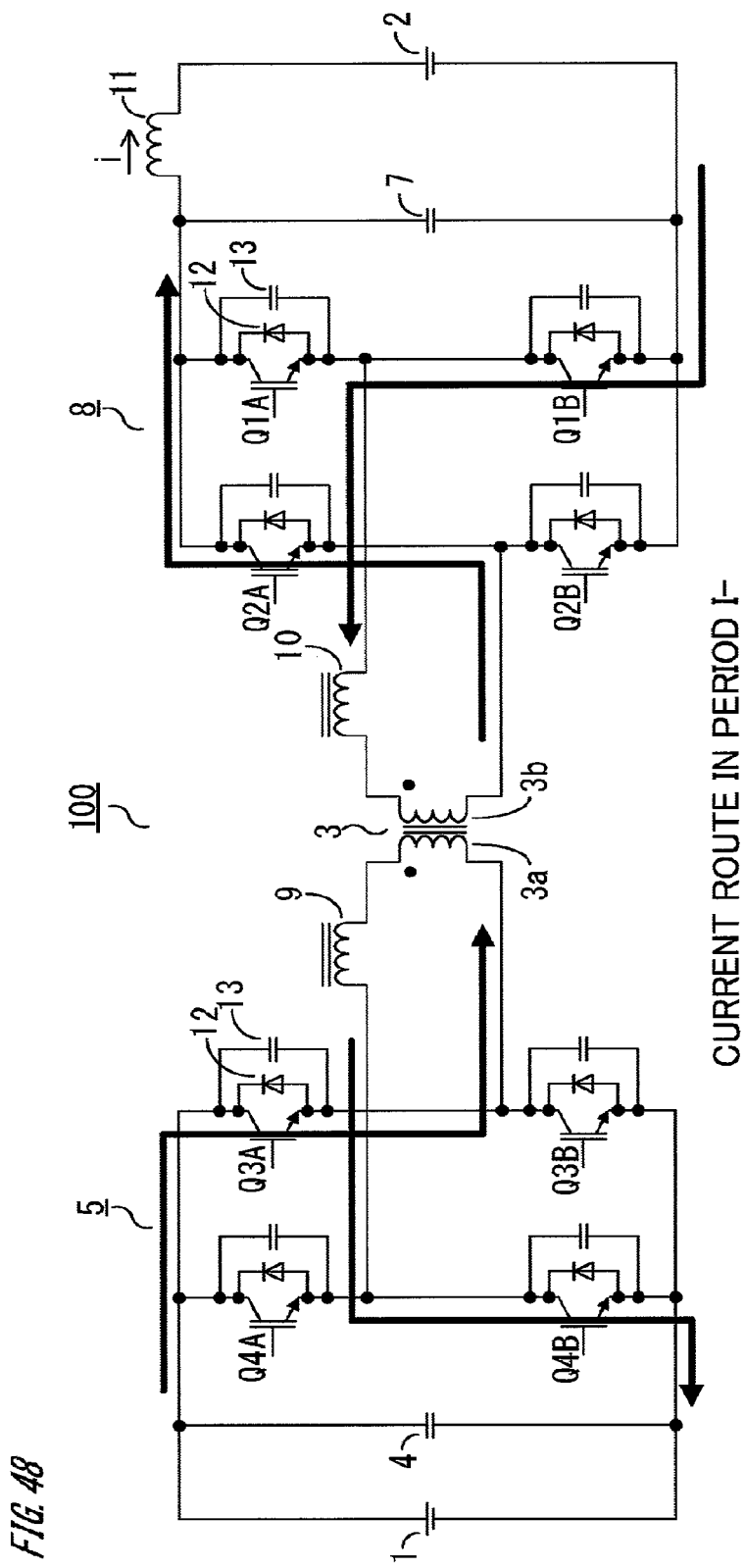
FIG. 48 is a current route diagram illustrating step-down charging operation of the battery charge/discharge device according to embodiment 2 of the present invention.

During the period I−, in the first switching circuit 5, Q3A is turned on, so that Q3A and Q4B are ON and thus the diagonal two elements are conductive. Therefore, energy is transmitted via Q3A and Q4B from the DC power supply 1 side. At this time, the polarity of current is opposite to that in the period H−. In the second switching circuit 8, Q2A is turned on, current flows via Q2A or the diode of Q2A, and the diode of Q1B, and power is transmitted to the battery 2 side. Thus, the period I− is a period during which power is transmitted to the battery 2 side (FIG. 48).

Figure 49:
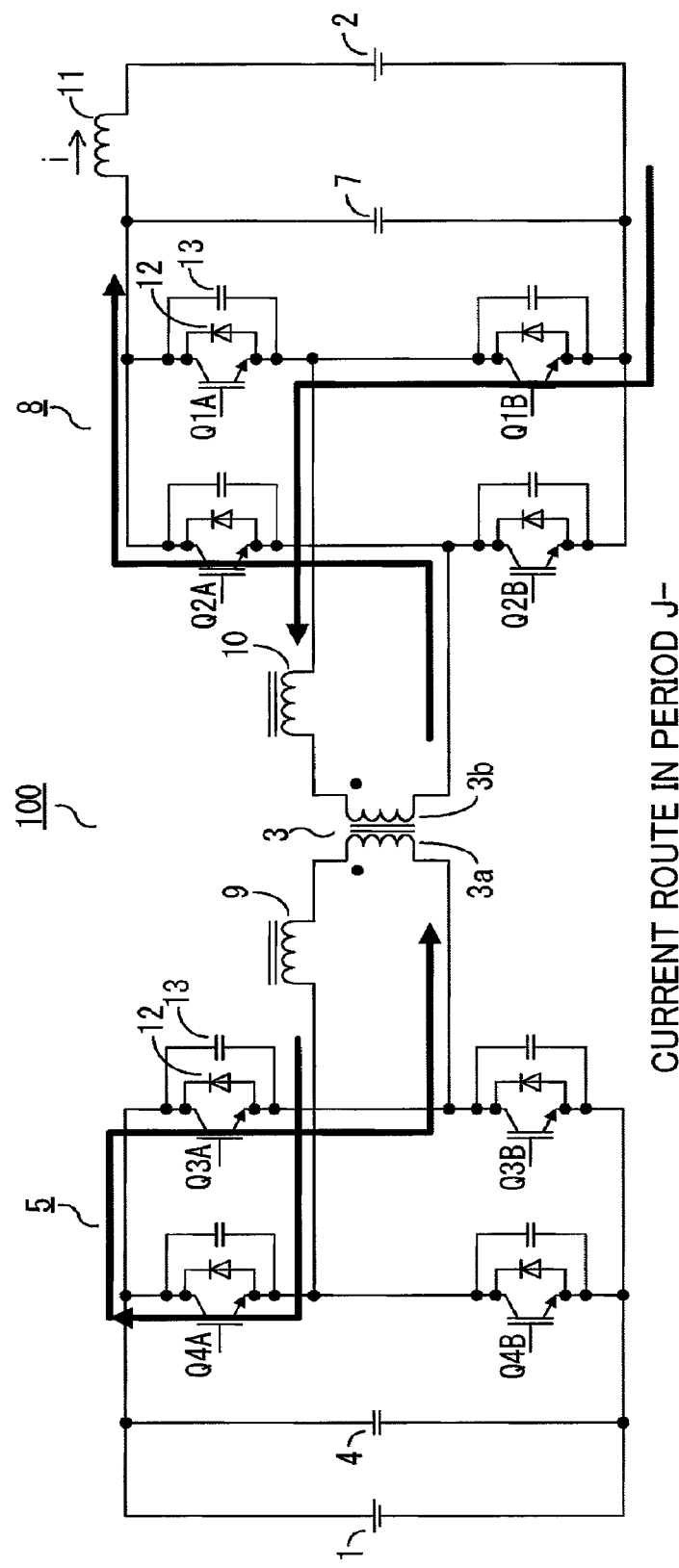
FIG. 49 is a current route diagram illustrating step-down charging operation of the battery charge/discharge device according to embodiment 2 of the present invention.

During the period J−, in the first switching circuit 5, Q4B is turned off and current circulates via the diode of Q4A, and Q3A. In the second switching circuit 8, the diode of Q1B, and Q2A or the diode of Q2A are ON, and therefore the circulation current gradually decreases due to voltage of the battery 2. When the circulation current becomes 0 [A], the diode of Q1B is turned off and the current keeps 0 [A]. Thus, the period J− is a period during which the circulation current decreases (FIG. 49).

Figure 50:
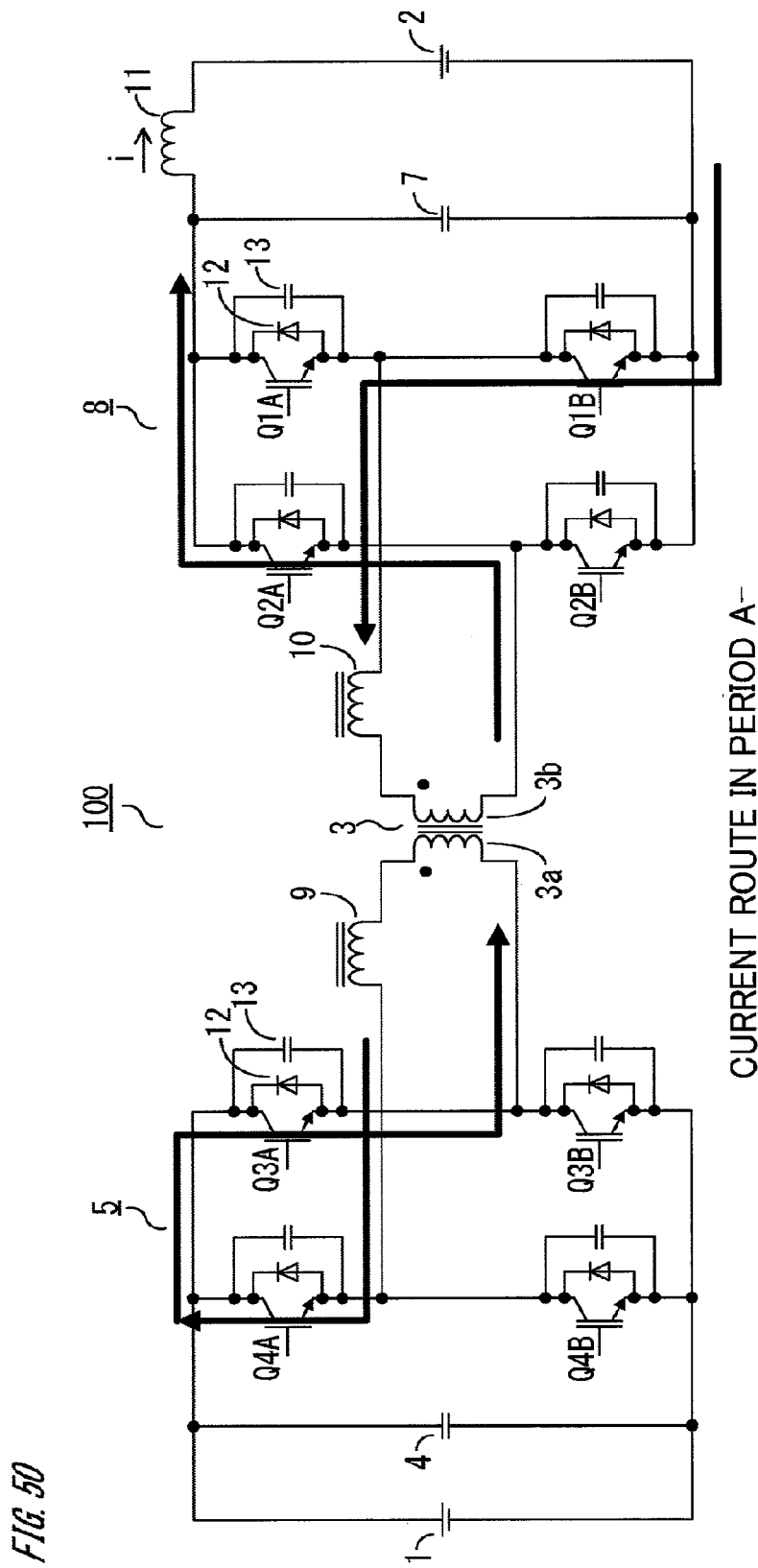
FIG. 50 is a current route diagram illustrating step-down charging operation of the battery charge/discharge device according to embodiment 2 of the present invention.
Figure 51:
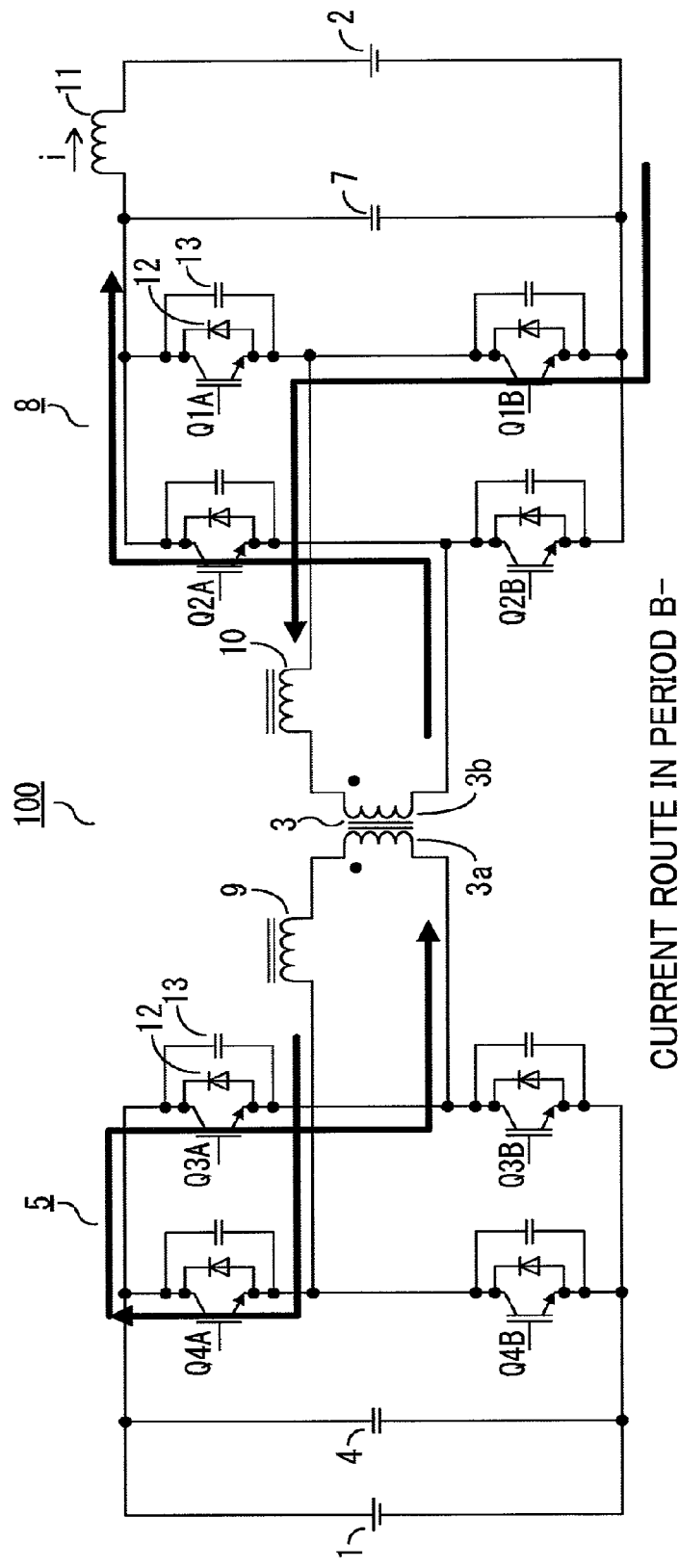
FIG. 51 is a current route diagram illustrating step-down charging operation of the battery charge/discharge device according to embodiment 2 of the present invention.

Next, during the periods A−, B−, in the first switching circuit 5, Q4A is turned on and current circulates via Q4A or the diode of Q4A, and Q3A. Since Q4A is turned on from a diode conductive state, ZVS (zero voltage switching) is achieved. In the second switching circuit 8, the diode of Q1B, and Q2A or the diode of Q2A are ON, and therefore the circulation current gradually decreases due to voltage of the battery 2. When the circulation current becomes 0 [A], the diode of Q1B is turned off and the current keeps 0 [A]. Thus, the period J− is a period during which the circulation current decreases (FIG. 50, FIG. 51).

Figure 52:
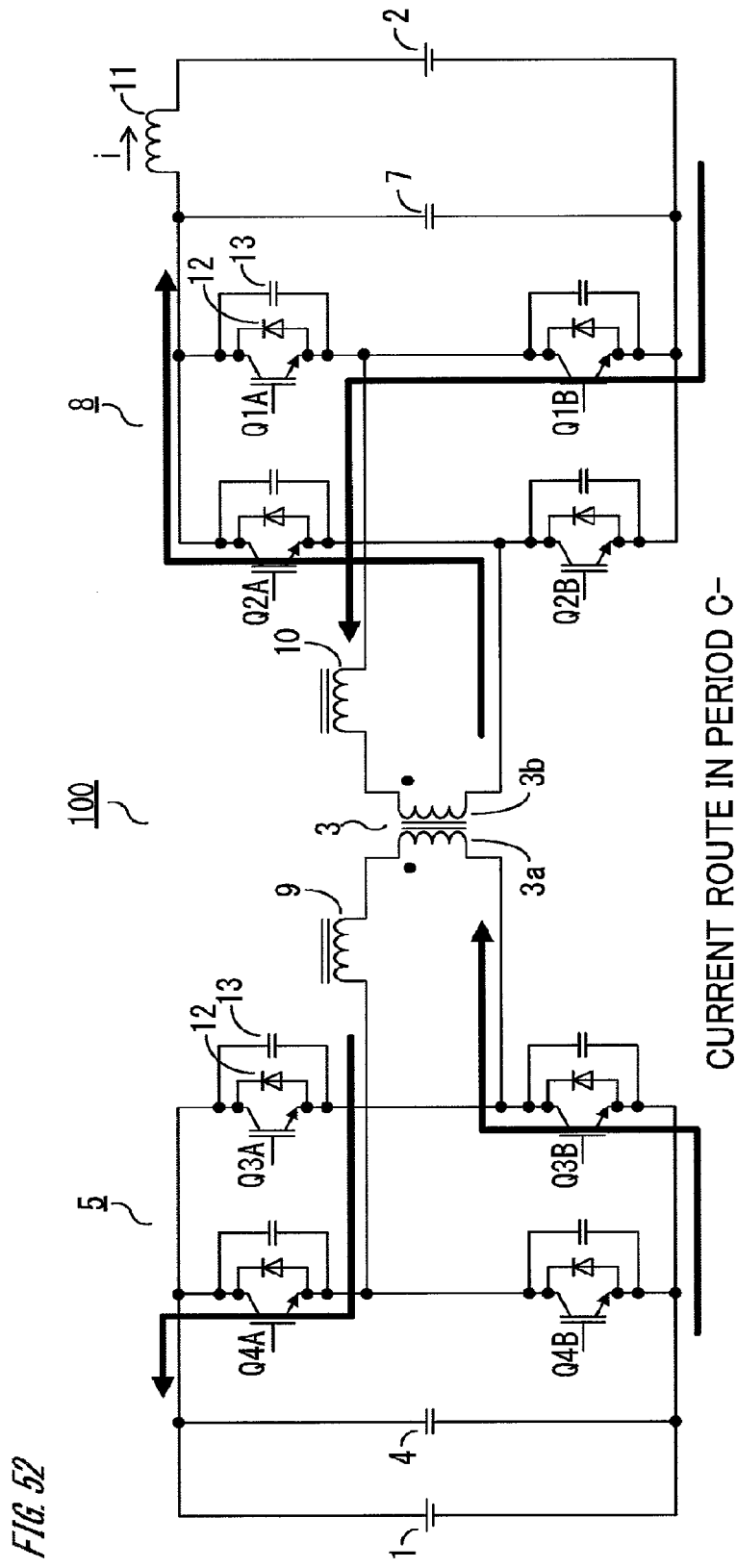
FIG. 52 is a current route diagram illustrating step-down charging operation of the battery charge/discharge device according to embodiment 2 of the present invention.

During the period C−, in the first switching circuit 5, Q3A is turned off, and if the circulation current is greater than 0 [A], that is, some current remains, the current is regenerated via Q4A or the diode of Q4A, and the diode of Q3B, to the DC power supply 1 side. In the second switching circuit 8, Q2A is turned off, but since the diode of Q2A and the diode of Q1B are ON, the circulation current gradually decreases due to (voltage of DC power supply 1−voltage of battery 2). When the circulation current becomes 0 [A], the diode of Q1B is turned off and the current keeps 0 [A]. Thus, the period C− is a period during which the circulation current decreases (FIG. 52).

Through repetition of such a series of controls (periods A− to J−), the battery charge/discharge device 100 steps down voltage generated at the second winding 3$b$ of the transformer 3 and supplies the resultant power to the battery 2.

All the switching operations of the semiconductor switching elements Q in the first switching circuit 5 on the primary side of the transformer 3 are zero voltage switching, owing to the effect of the capacitor 13 and the first reactor 9. As for the switching operations in the second switching circuit 8 on the secondary side, some of them are zero voltage switching.

Q1A and Q1B in the second bridge circuit (Q1A, Q1B) are kept in an OFF state. Therefore, in the periods E– to H–, when the circulation current decreases to be 0 [A], the diode of Q1A is turned off and the current keeps 0 [A], so that reverse current does not flow. Also in the periods J– and A– to C–, when the circulation current decreases to be 0 [A], the diode of Q1B is turned off and the current keeps 0 [A], so that reverse current does not flow.

Next, the case where the battery charge/discharge device 100 transmits power from the battery 2 to the DC power supply 1 will be described.

Figure 53:
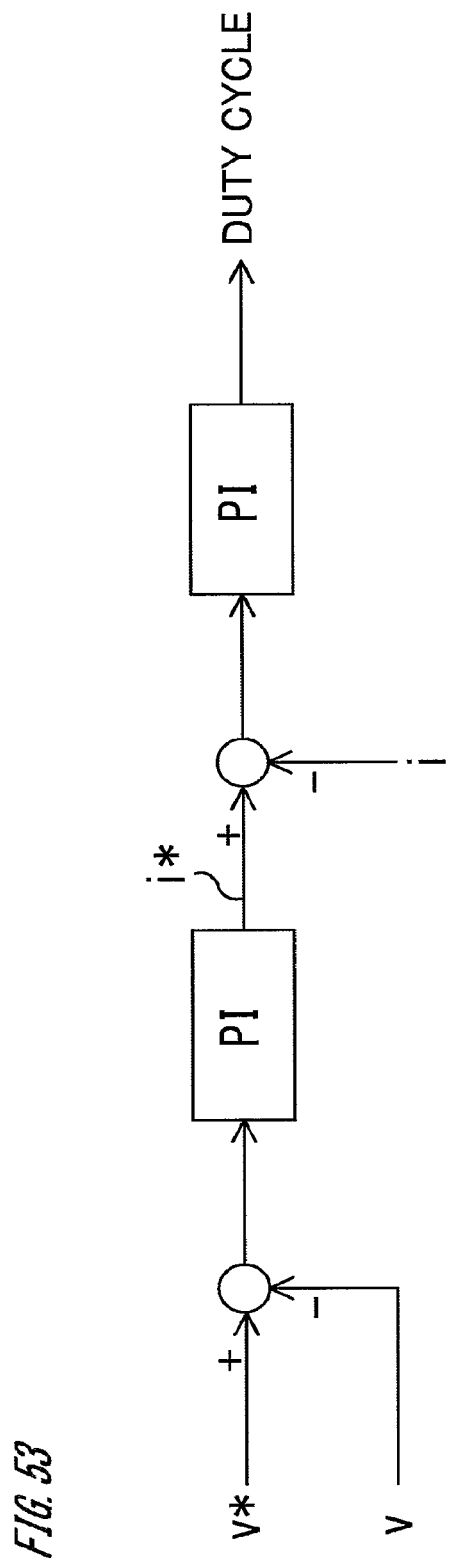
FIG. 53 is a control block diagram in the case where the battery charge/discharge device performs discharging, according to embodiment 2 of the present invention.

FIG. 53 is a control block diagram in the case where the battery charge/discharge device 100 transmits power from the battery 2 to the DC power supply 1, i.e., discharges the battery 2. In this case, the battery charge/discharge device 100 performs output to the DC power supply 1, and voltage v of the first smoothing capacitor 4 is detected as output voltage and then is inputted to the control circuit 20. As shown in FIG. 53, in the control circuit 20, the inputted output voltage v is subtracted from an output voltage command value v* to calculate difference voltage, and then a charge current command value i* is calculated by a PI controller so that the calculated difference voltage approaches zero. Then, the inputted charge current i is subtracted from the charge current command value i* to calculate the difference therebetween, and feedback control is performed by a PI controller so that the difference approaches zero, thereby determining a duty cycle for the first switching circuit 5 and the second switching circuit 8. Then, the drive signals 21*a*, 21*b* for the semiconductor switching elements Q are generated on the basis of the duty cycle.

The operation in the case where power is supplied from the battery 2 is reverse to that in the case where power is supplied from the DC power supply 1. Therefore, the polarities of the charge current i and the charge current command value i* are negative. The second smoothing capacitor 7 connected in parallel to the battery 2 has the same DC voltage as voltage of the battery 2.

Figure 54:
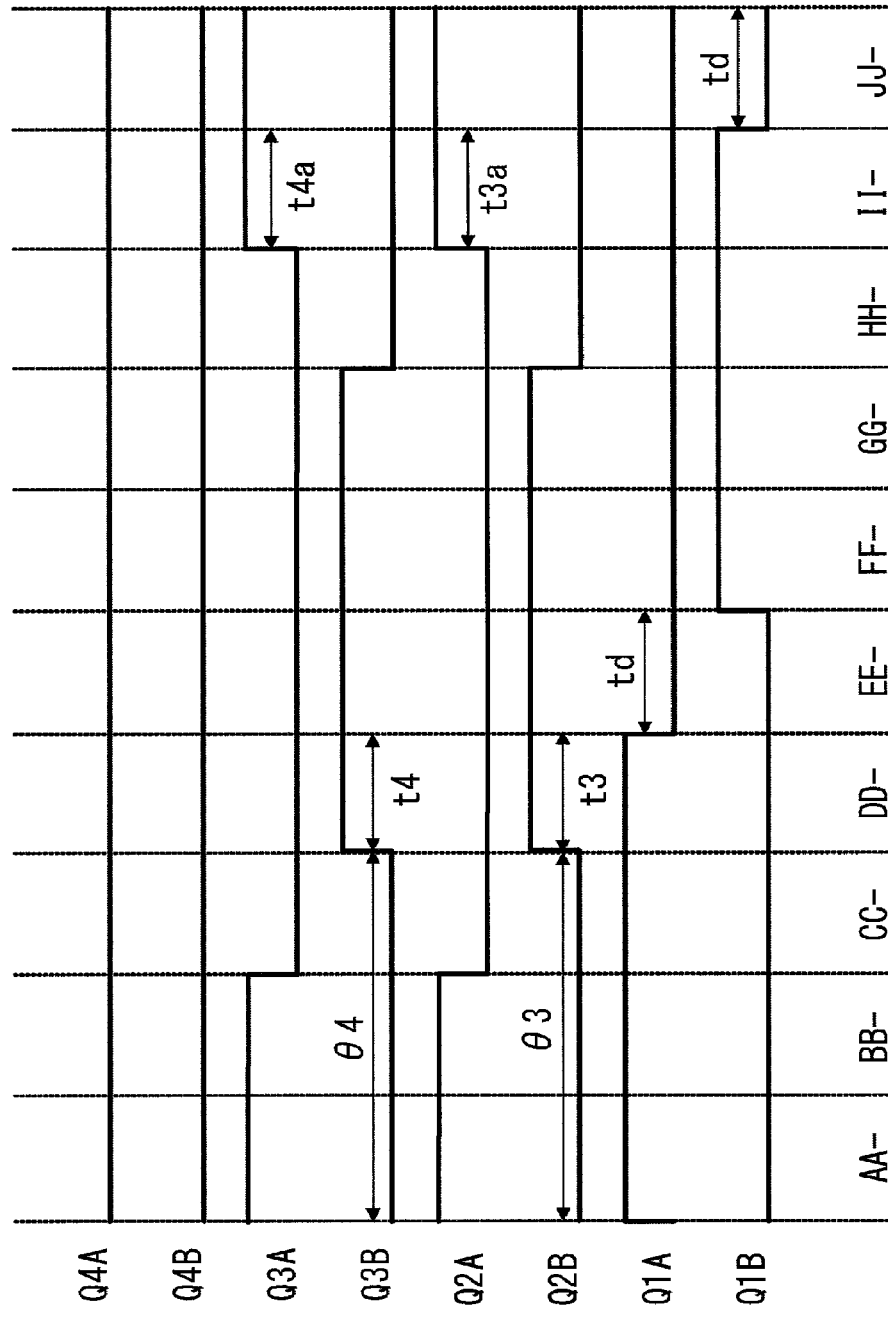
FIG. 54 is a waveform diagram of drive signals in step-down discharging by the phase shift method in the battery charge/discharge device according to embodiment 2 of the present invention.
Figure 55:
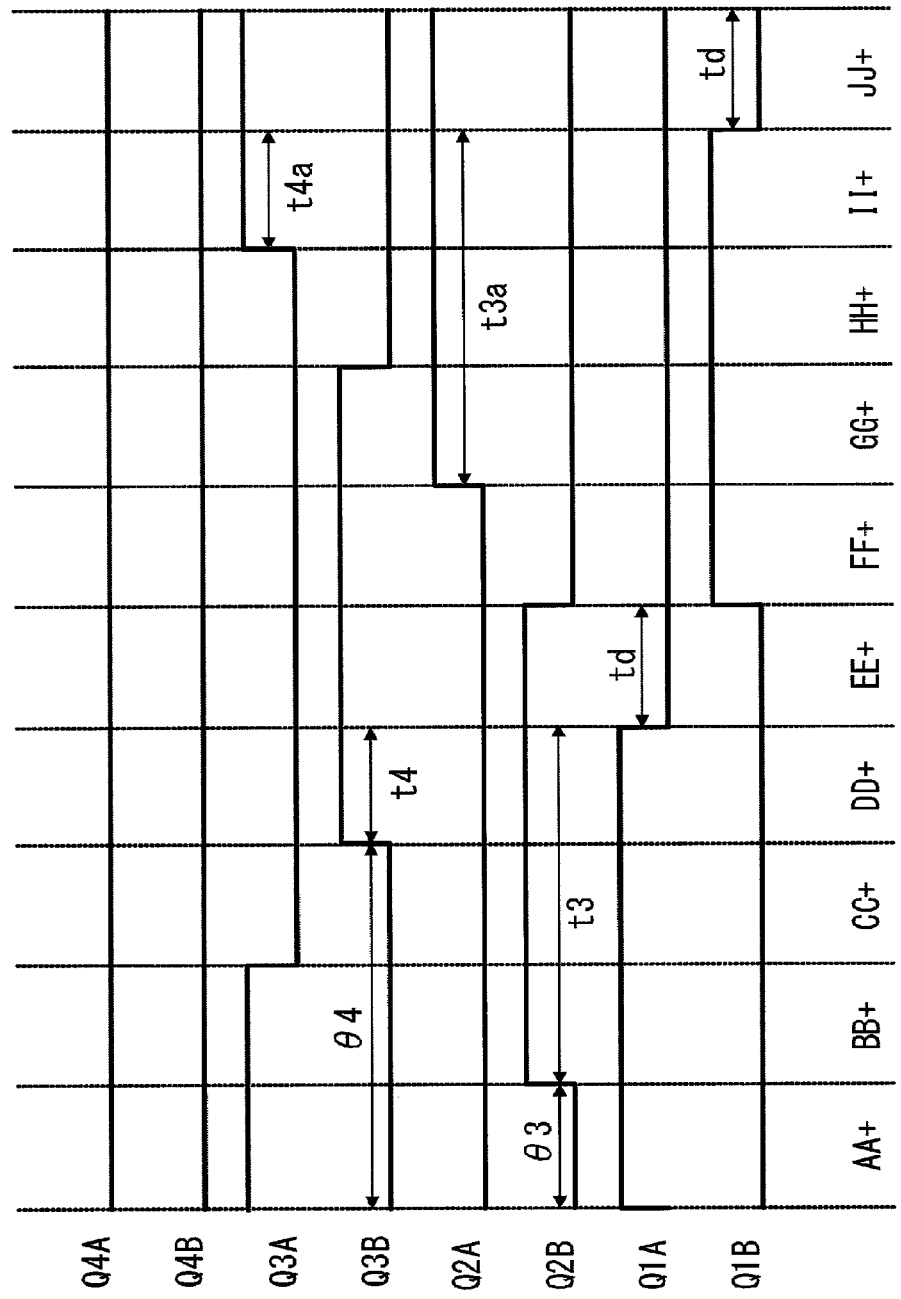
FIG. 55 is a waveform diagram of drive signals in step-up discharging by the phase shift method in the battery charge/discharge device according to embodiment 2 of the present invention.

FIG. 54 is a diagram showing waveforms of the drive signals 21*a*, 21*b* for the semiconductor switching elements Q of the first switching circuit 5 and the second switching circuit 8 in step-down discharging of the battery charge/discharge device 100. FIG. 55 is a diagram showing waveforms of the drive signals 21*a*, 21*b* for the semiconductor switching elements Q of the first switching circuit 5 and the second switching circuit 8 in step-up discharging of the battery charge/discharge device 100.

As shown in FIG. 54, the operation of step-down discharging of the battery charge/discharge device 100 is reverse to that of step-down charging, and corresponds to operation obtained by replacing the drive signals for the first switching circuit 5 and the drive signals for the second switching circuit 8 in step-down charging with each other. In addition, operation in each period AA– to JJ– also corresponds to operation obtained by reversing the first switching circuit 5 part and the second switching circuit 8 part in each period A– to J– during step-down charging.

As shown in FIG. 55, the operation of step-up discharging of the battery charge/discharge device 100 is reverse to that of step-up charging, and corresponds to operation obtained by replacing the drive signals for the first switching circuit 5 and the drive signals for the second switching circuit 8 in step-up charging with each other. In addition, operation in each period AA+ to JJ+ also corresponds to operation obtained by reversing the first switching circuit 5 part and the second switching circuit 8 part in each period A+ to J+ during step-up charging.

If voltage of the battery 2 is denoted by VB, the second switching circuit 8 outputs a positive pulse of voltage VB during the diagonal ON time t3 in which Q1A (second reference element) and Q2B (second diagonal element) are both ON, and outputs a negative pulse of voltage (–VB) during a diagonal ON time t3*a* in which Q1B and Q2A are both ON, to apply these pulses to the second winding 3*b* of the transformer 3. If the turns ratio between the first winding 3*a* and the second winding 3*b* of the transformer 3 is NL:NB, at this time, voltage of (±VB)×NL/NB is applied to the first winding 3*a* of the transformer 3.

In step-down discharging shown in FIG. 54, voltage of the DC power supply 1 is lower than voltage generated at the first winding 3*a*, and in step-up discharging shown in FIG. 55, voltage of the DC power supply 1 is higher than voltage generated at the first winding 3*a*. In both operations, power is transmitted from the battery 2 to the DC power supply 1.

In battery discharging in which the battery charge/discharge device 100 transmits power from the battery 2 to the DC power supply 1, the first switching circuit 5 and the second switching circuit 8 are controlled as follows.

The entire drive signals are generated using, as a reference, the second bridge circuit (Q1A, Q1B) in the second switching circuit 8. Q4A and Q4B in the first bridge circuit (Q4A, Q4B) in the first switching circuit 5 are kept in an OFF state.

In the three bridge circuits other than the first bridge circuit (Q4A, Q4B), the positive-side (high-voltage-side) Q1A, Q2A, Q3A and the negative-side (low-voltage-side) Q1B, Q2B, Q3B composing the bridge circuits are each controlled at an ON time ratio of 50% excluding the short-circuit prevention time td. In this case, in switching of the semiconductor switching elements Q of the second switching circuit 8 on the power transmitting side, the control circuit 20 performs control so that, during the short-circuit prevention time td, voltage of the capacitor 13 connected in parallel to each semiconductor switching element Q increases to be voltage of the second smoothing capacitor 7 or decreases to be close to zero voltage, thereby performing zero voltage switching.

A phase shift amount θ3 (third phase shift amount) of the drive signal for the second diagonal element Q2B relative to the phase of the drive signal for the second reference element Q1A, and a phase shift amount θ4 (fourth phase shift amount) of the drive signal for the first diagonal element Q3B relative to the phase of the drive signal for the second reference element Q1A are determined in accordance with the duty cycle which is a control command. That is, the phase shift amounts θ3, θ4 are controlled in accordance with the duty cycle.

In step-down discharging shown in FIG. 54, the phase shift amount θ3 is equal to the phase shift amount θ4, and both phase shift amounts θ3, θ4 are changed in accordance with the duty cycle. In step-up discharging shown in FIG. 55, the phase shift amount θ3 is kept minimum, and the phase shift amount θ4 is changed in accordance with the duty cycle.

As shown in FIG. 54 and FIG. 55, the diagonal ON time t3 during which Q1A and Q2B are both ON is determined by the phase shift amount θ3, and the diagonal ON time t3a during which Q1B and Q2A are both ON is also equal to the diagonal ON time t3.

In the control circuit 20, for the first bridge circuit (Q4A, Q4B), drive signals equal to those for the second bridge circuit (Q1A, Q1B) are assumed as virtual drive signals, and the period during which the virtual ON period of Q4A based on the virtual drive signal for Q4A overlaps the ON period of Q3B, is defined as a virtual diagonal ON time t4. The virtual diagonal ON time t4 is determined by the phase shift amount θ4. A virtual diagonal ON time t4a during which the virtual ON period of Q4B based on the virtual drive signal for Q4B overlaps the ON period of Q3A is also equal to the virtual diagonal ON time t4.

Thus, the battery charge/discharge device 100 has four control modes of step-up charging, step-down charging, step-down discharging, and step-up discharging, to perform bidirectional power transmission. As described above, in charging in which power is transmitted from the DC power supply 1 to the battery 2, the phase shift amount θ1 of the drive signal for the first diagonal element Q3B and the phase shift amount θ2 of the drive signal for the second diagonal element Q2B relative to the phase of the drive signal for the first reference element Q4A are controlled in accordance with the duty cycle. In discharging in which power is transmitted from the DC power supply 1 to the battery 2, the phase shift amount θ3 of the drive signal for the second diagonal element Q2B and the phase shift amount θ4 of the drive signal for the first diagonal element Q3B relative to the phase of the drive signal for the second reference element Q1A are controlled in accordance with the duty cycle.

Figure 56:
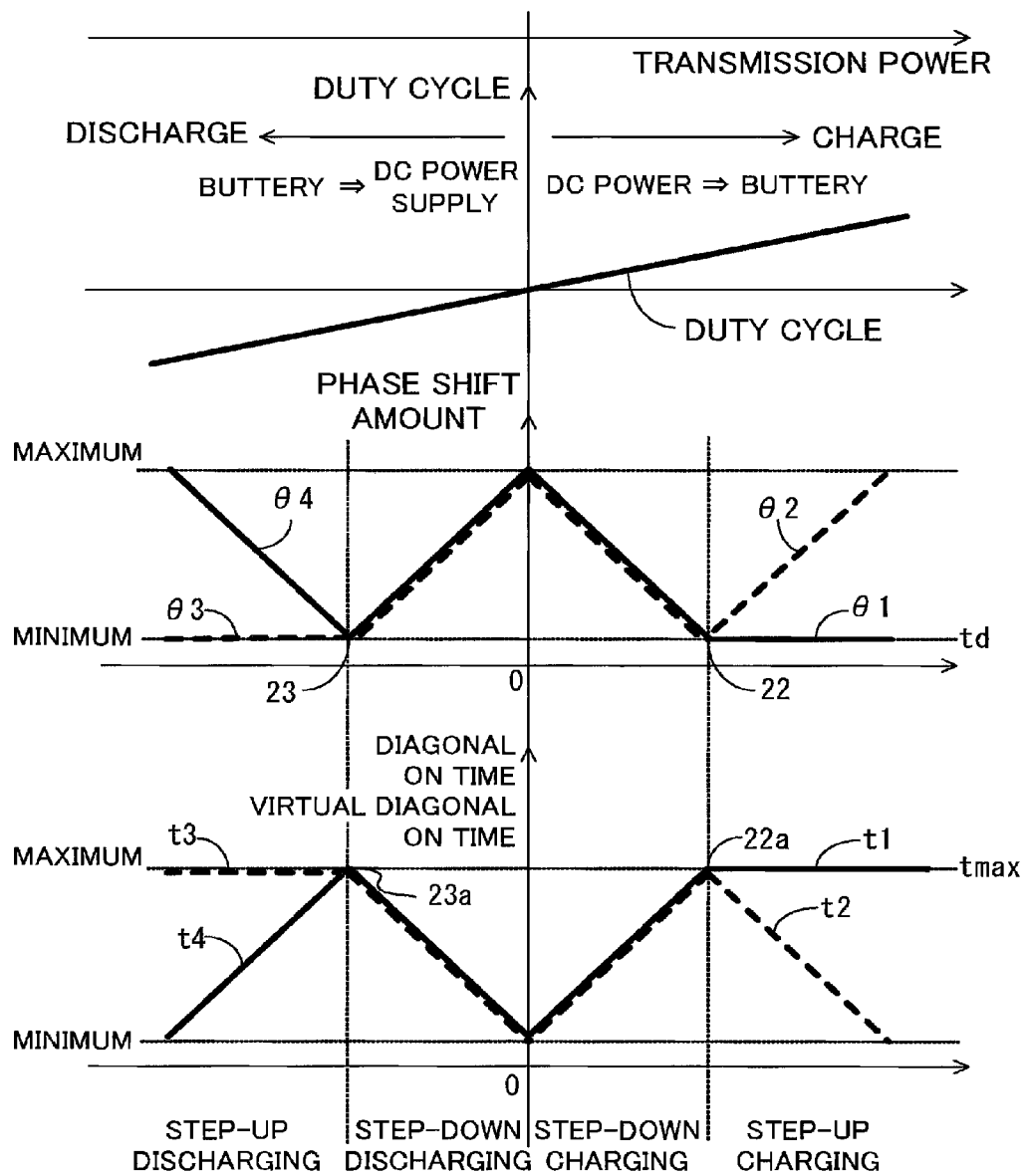
FIG. 56 is a waveform diagram illustrating basic control operation of the battery charge/discharge device according to embodiment 2 of the present invention.

FIG. 56 is a waveform diagram illustrating basic control operation of the battery charge/discharge device 100 according to the present embodiment 2, and shows the phase shift amounts θ1 to θ4 according to the duty cycle, and the diagonal ON times t1, t3 and the virtual diagonal ON times t2, t4. The basic control operation is control operation at a stage before an offset phase described later is added. As shown in FIG. 56, the duty cycle is determined in accordance with the transmission power. In this case, power in the charging direction is assumed to be positive.

Since both the phase shift amount θ1 in charging and the phase shift amount θ4 in discharging are a phase shift amount of the first diagonal element Q3B, they are continuously drawn by the same solid line. Since both the phase shift amount θ2 in charging and the phase shift amount θ3 in discharging are a phase shift amount of the second diagonal element Q2B, they are continuously drawn by the same dotted line. Similarly, the diagonal ON time t1 and the virtual diagonal ON time t4 are continuously drawn by the same solid line, and the virtual diagonal ON time t2 and the diagonal ON time t3 are continuously drawn by the same dotted line.

First, control in the case where the battery charge/discharge device 100 charges the battery 2 from the DC power supply 1 will be described.

A period during which power is transmitted from the first winding 3a to the second winding 3b of the transformer 3 and voltage is generated at the second winding 3b is the diagonal ON time t1 during which Q4A and Q3B are both ON and the diagonal ON time t1a during which Q4B and Q3A are both ON.

In step-up operation, by increasing the above period as much as possible, loss relevant to the current circulation periods of the first switching circuit 5 and the second switching circuit 8 can be reduced.

Therefore, in control for step-up charging, the control circuit 20 sets the diagonal ON time t1 (=t1a) to a maximum ON time tmax so that a period during which voltage is applied to the first winding 3a of the transformer 3 is maximized. The maximum ON time tmax is set on the basis of the short-circuit prevention time td needed for each semiconductor switching element Q of the first switching circuit 5 to perform zero voltage switching. In this case, the phase shift amount θ1 of the drive signal for Q3B relative to the phase of the drive signal for Q4A is minimum, and equal to the short-circuit prevention time td.

In the step-up charging, a period during which the second reactor 10 is excited by the second switching circuit 8 is present in the diagonal ON time (t1, t1a) during which voltage is applied to the transformer 3. That is, the phase shift amount θ2 of the drive signal for the second diagonal element Q2B relative to the phase of the drive signal for Q4A is equal to or greater than the phase shift amount θ1, and a first reference point 22 at which both phase shift amounts θ1 and θ2 are minimum (short-circuit prevention time td) is set as a base point. When the duty cycle increases, the control circuit 20 increases the phase shift amount θ2 while keeping the phase shift amount θ1 minimum.

When the phase shift amounts θ1 and θ2 are at the first reference point 22 at which both of them are minimum (short-circuit prevention time td), the diagonal ON time t1 and the virtual diagonal ON time t2 are at a point 22a at which both of them are the maximum ON time tmax. From the point 22a as a base point, when the duty cycle increases, the control circuit 20 decreases the virtual diagonal ON time t2 while keeping the diagonal ON time t1 at the maximum ON time tmax.

In the case of step-down charging, the phase shift amount θ1 and the phase shift amount θ2 are equal to each other, and both phase shift amounts θ1 and θ2 are changed in accordance with the duty cycle.

When the phase shift amounts θ1 and θ2 are maximum, both the diagonal ON time t1 and the virtual diagonal ON time t2 are minimum, and power transmission is not performed. In step-down charging, when the duty cycle is zero, the phase shift amounts θ1 and θ2 are maximum, and when the duty cycle increases, the control circuit 20 decreases both phase shift amounts θ1 and θ2. At this time, the diagonal ON time t1 and the virtual diagonal ON time t2 increase.

When both phase shift amounts θ1 and θ2 are maximum, the control circuit 20 switches from control in which the second bridge (Q1A, Q1B) in the second switching circuit 8 is kept in an OFF state, to control in which the first bridge (Q4A, Q4B) in the first switching circuit 5 is kept in an OFF state, thus switching the power transmission direction. In this switching, both the diagonal ON time t1 and the virtual diagonal ON time t2 are minimum, that is, power transmission is not performed. Therefore, the switching can be smoothly performed without causing influence by the switching.

In control for step-up discharging in which the battery 2 is discharged to transmit power to the DC power supply 1, the control circuit 20 sets the diagonal ON time t3 (=t3a) to the maximum ON time tmax so that a period during which voltage is applied to the second winding 3b of the transformer 3 is maximized. In this case, the phase shift amount θ3 of the drive signal for Q2B relative to the phase of the drive signal for Q1A becomes minimum (short-circuit prevention time td). The phase shift amount θ4 of the drive signal for Q3B relative to the phase of the drive signal for Q1A is equal to or greater than the phase shift amount θ3.

From a second reference point 23 as a base point, at which both phase shift amounts θ3 and θ4 are minimum (short-circuit prevention time td), when discharge power increases and the duty cycle increases in the negative direction, the control circuit 20 increases the phase shift amount θ4 while keeping the phase shift amount θ3 minimum.

When the phase shift amounts θ3 and θ4 are at the second reference point 23 at which both of them are minimum (short-circuit prevention time td), the diagonal ON time t3 and the virtual diagonal ON time t4 are at a point 23a at which both of them are the maximum ON time tmax. From the point 23a as a base point, when the duty cycle increases in the negative direction, the control circuit 20 decreases the virtual diagonal ON time t4 while keeping the diagonal ON time t3 at the maximum ON time tmax.

In the case of step-down discharging, the phase shift amount θ3 and the phase shift amount θ4 are equal to each other, and both phase shift amounts θ3 and θ4 are changed in accordance with the duty cycle.

When the phase shift amounts θ3 and θ4 are maximum, both the diagonal ON time t3 and the virtual diagonal ON time t4 are minimum, and power transmission is not performed. In step-down discharging, when the duty cycle is zero, the phase shift amounts θ3 and θ4 are maximum, and when the duty cycle increases in the negative direction, the control circuit 20 decreases both phase shift amounts θ3 and θ4. At this time, the diagonal ON time t3 and the virtual diagonal ON time t4 increase.

When both phase shift amounts θ3 and θ4 are maximum, the control circuit 20 switches from control in which the first bridge (Q4A, Q4B) in the first switching circuit 5 is kept in an OFF state, to control in which the second bridge (Q1A, Q1B) in the second switching circuit 8 is kept in an OFF state, thus switching the power transmission direction. In this switching, power transmission is not performed, and therefore the switching can be smoothly performed without causing influence by the switching.

As described above, the battery charge/discharge device 100 has a simple circuit configuration that is symmetric with respect to the transformer 3, and the control circuit 20 controls the phase shift amounts θ1 to θ4 in accordance with the duty cycle, thereby enabling bidirectional power conversion to be performed irrespective of the power transmission direction and voltages of the DC power supply 1 and the battery 2. Thus, the battery charge/discharge device 100 can achieve bidirectional power conversion operation with simple control.

As described above, in charging of the battery 2, Q1A and Q1B of the second bridge circuit (Q1A, Q1B) are kept in an OFF state. Therefore, when the circulation current flowing through the transformer 3 decreases to be 0 [A], the diode of Q1A or Q1B is turned off and the current flowing through the transformer 3 is kept at 0 [A]. Also in power transmission from the battery 2 to the DC power supply 1, similarly, when the circulation current flowing through the transformer 3 decreases to be 0 [A], the diode of Q4A or Q4B is turned off and the current flowing through the transformer 3 is kept at 0 [A].

Thus, reverse current does not flow through the transformer 3, so that reactive power can be suppressed and loss can be reduced. Therefore, the battery charge/discharge device 100, with a simple circuit configuration, can perform bidirectional power transmission while preventing reverse flow of transformer current over a wide voltage range and thus can achieve loss reduction. In addition, the peak value and the effective value of the transformer current can be reduced, and size reduction of the transformer 3 can be promoted.

In the basic control operation shown in FIG. 56, in the step-up charge control part and the step-up discharge control part, there are periods during which step-up operation cannot be performed due to the short-circuit prevention time td and the charge current i remains constant, as in the charge control and the discharge control shown in FIG. 4 in the above embodiment 1.

In this case, the battery charge/discharge device 100 has four control modes of step-up charging, step-down charging, step-down discharging, and step-up discharging. Step-up charging is performed using the first reference point 22 as a base point, and step-up discharging is performed using the second reference point 23 as a base point. At the time of switching between step-down charging and step-down discharging, the control is switched between control of keeping the second bridge (Q1A, Q1B) in the second switching circuit 8 in an OFF state, and control of keeping the first bridge (Q4A, Q4B) in the first switching circuit 5 in an OFF state, thereby switching the power transmission direction. Therefore, irrespective of voltages of the DC power supply 1 and the battery 2, the charge current i is positive in the step-up charge control using the first reference point 22 as a base point, and the charge current i is negative in the step-up discharge control using the second reference point 23 as a base point, and a period during which the charge current i remains at a constant value is present in both the step-up charge control period and the step-up discharge control period.

Figure 57:
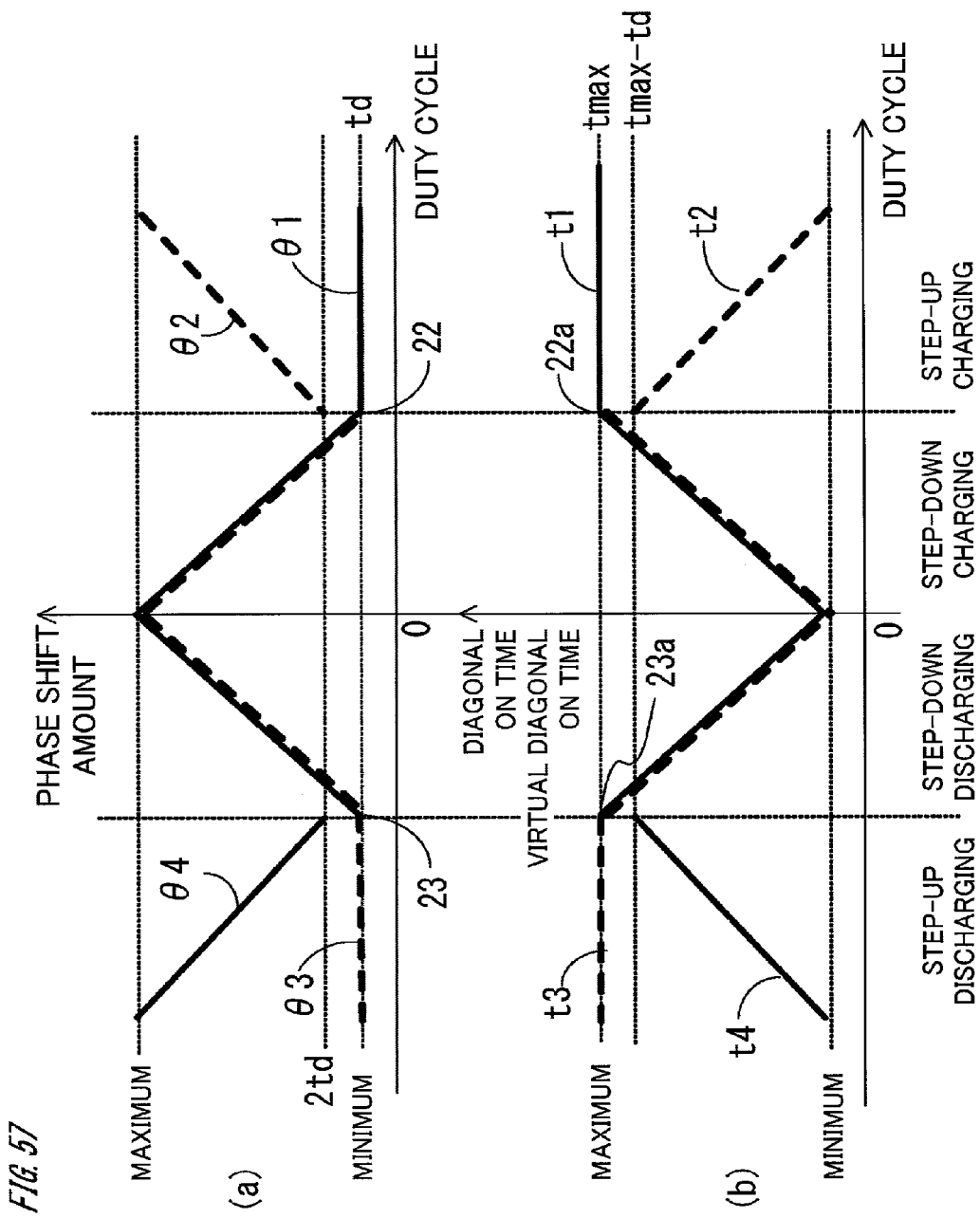
FIG. 57 is a waveform diagram illustrating control operation of the battery charge/discharge device according to embodiment 2 of the present invention.

In the present embodiment, as shown in FIG. 57, the control circuit 20 performs control so as to add the offset phase to both the phase shift amount θ2 in the step-up charge control period and the phase shift amount θ4 in the step-up discharge control period. The offset phase is a phase corresponding to the short-circuit prevention time td.

FIG. 57 is a waveform diagram illustrating control operation of the battery charge/discharge device 100 according to the present embodiment, and shows the phase shift amounts θ1 to θ4 according to the duty cycle, and the diagonal ON times t1, t3 and the virtual diagonal ON times t2, t4.

In step-up charge control, the phase shift amount θ1 is kept minimum, and the offset phase is added to the value of the phase shift amount θ2 calculated on the basis of the duty cycle. At this time, the diagonal ON time t1 is kept maximum, and the short-circuit prevention time td is subtracted from the calculated value of the virtual diagonal ON time t2. In step-up discharge control, the phase shift amount θ3 is kept minimum, and the offset phase is added to the value of the phase shift amount θ4 calculated on the basis of the duty cycle. At this time, the diagonal ON time t3 is kept maximum, and the short-circuit prevention time td is subtracted from the calculated value of the virtual diagonal ON time t4.

Figure 58:
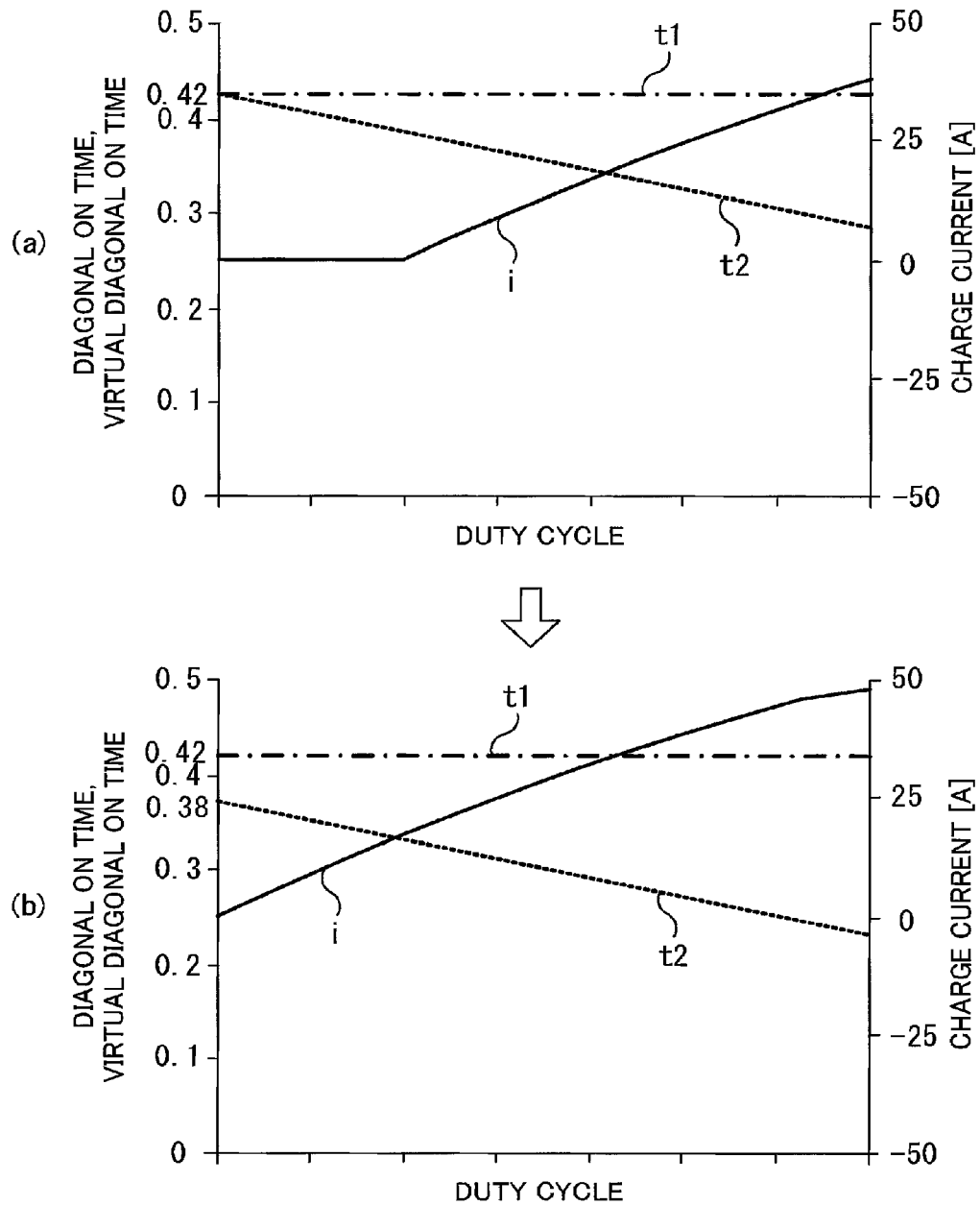
FIG. 58 is a waveform diagram showing charge current in the battery charge/discharge device according to embodiment 2 of the present invention.
Figure 59:
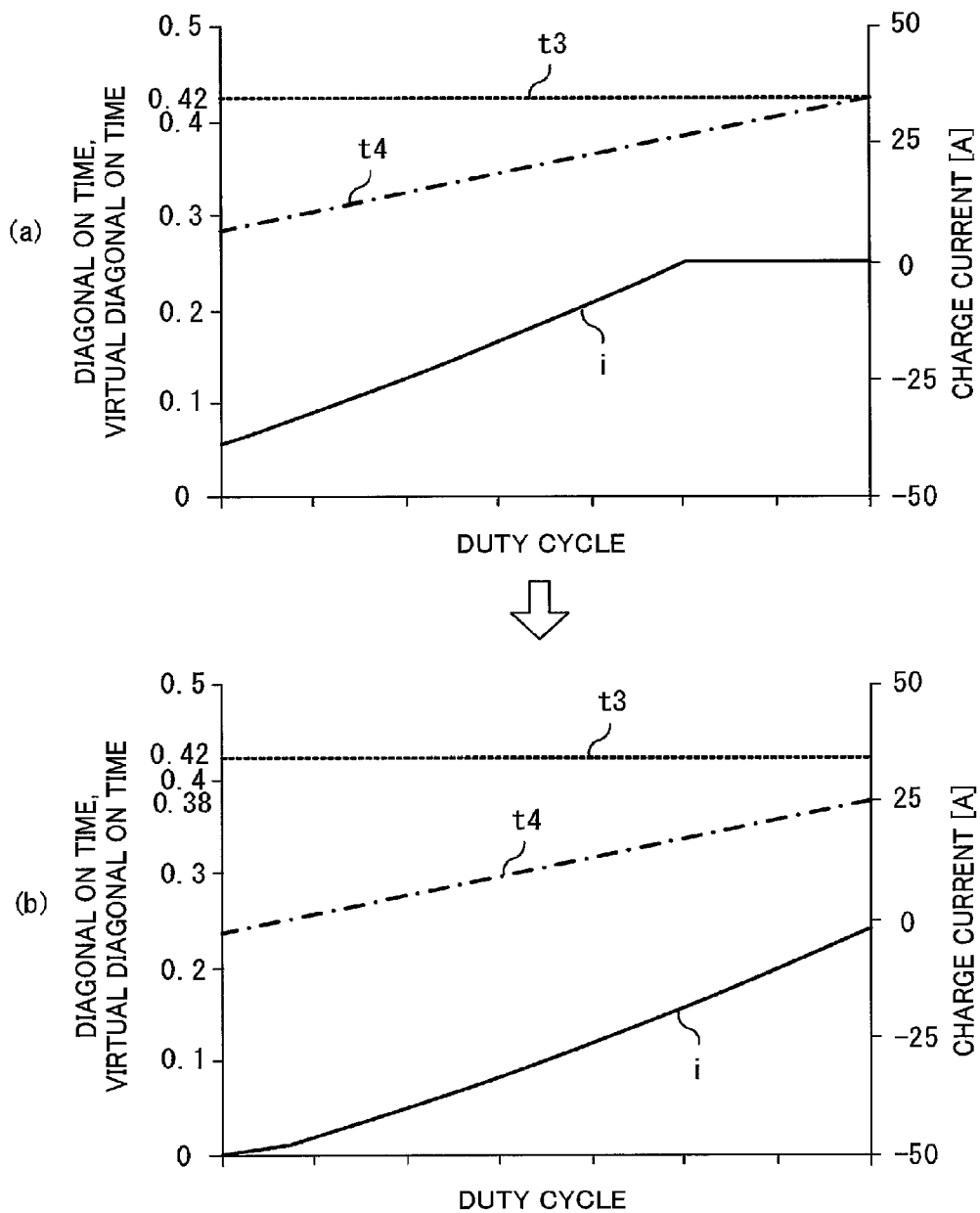
FIG. 59 is a waveform diagram showing charge current in the battery charge/discharge device according to embodiment 2 of the present invention.
Figure 60:
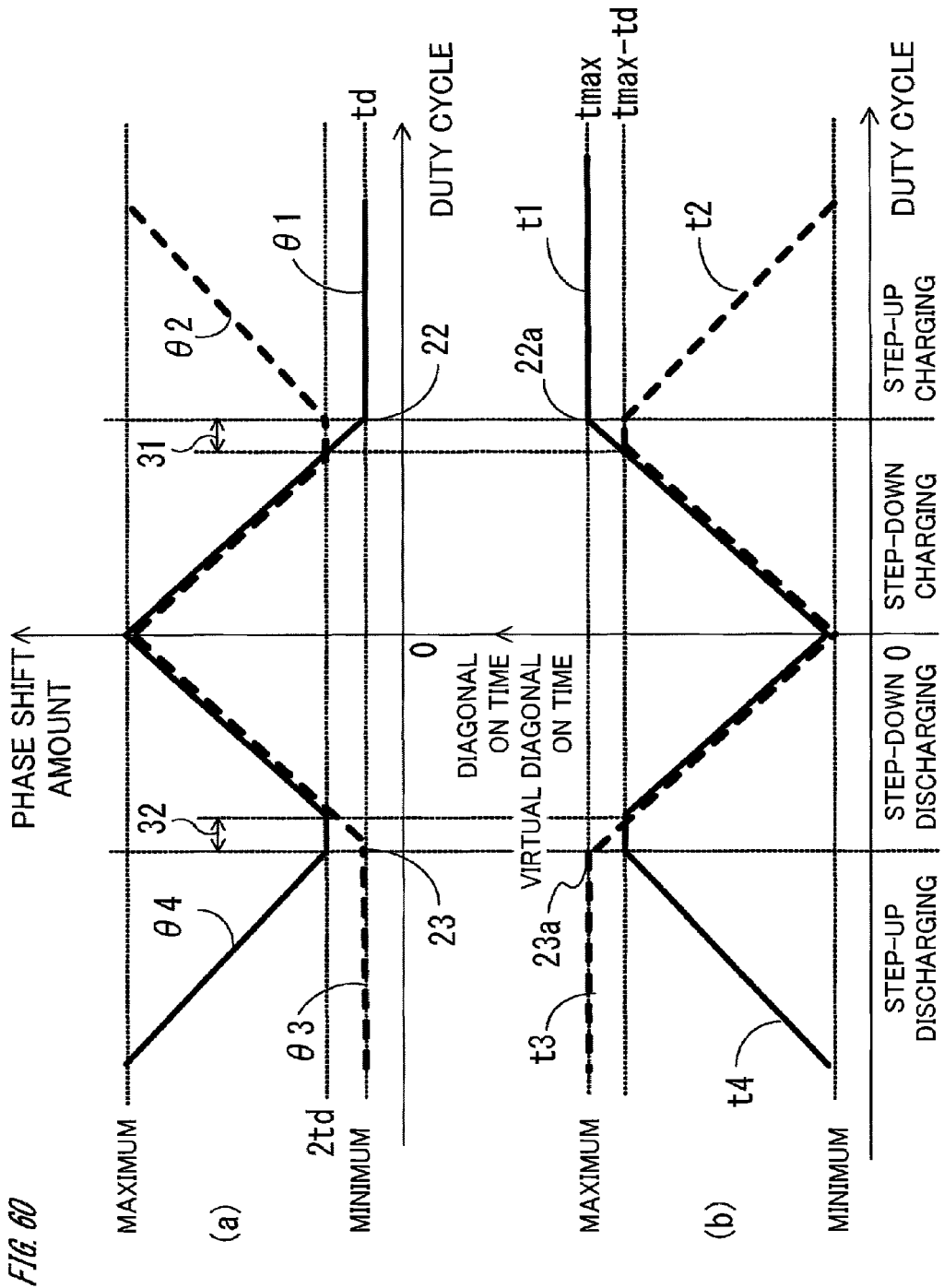
FIG. 60 is a waveform diagram illustrating control operation of a battery charge/discharge device according to embodiment 3 of the present invention.

FIG. 58(a) and FIG. 58(b) show transition of the charge current i in step-up charge control, in comparison between before and after the offset phase is added, and FIG. 59(a) and FIG. 59(b) show transition of the charge current i in step-up discharge control, in comparison between before and after the offset phase is added. Here, the voltage value of the DC power supply 1 and the voltage value of the battery 2 are set to be equal to each other, and the turns ratio of the transformer 3 is set at 1:1. In addition, the short-circuit prevention time td is set at 4% of the switching cycle, and normalization is performed with the switching cycle set at 1.

As shown in FIG. 58(b), by adding the offset phase, the difference between the diagonal ON time t1 and the virtual diagonal ON time t2 becomes longer than the short-circuit prevention time td. That is, in charge control in which the duty cycle is positive or zero, in the case where transmission power to the battery 2 is positive or zero and step-up control is performed in which output voltage to the battery 2 is higher than voltage generated at the second winding 3b of the transformer 3, the phase shift amount θ2 is controlled to be greater than the phase shift amount θ1 by an amount exceeding the short-circuit prevention time, irrespective of the duty cycle.

Therefore, in step-up charge control, it is possible to ensure a period during which only one of the positive-side and negative-side semiconductor switching elements is turned on to generate a route (circulation route) through which current circulates so that the second reactor 10 is excited. Thus, a period during which the charge current i remains constant is eliminated, and the transmission power can be reliably controlled.

As shown in FIG. 59(b), by adding the offset phase, the difference between the diagonal ON time t3 and the virtual diagonal ON time t4 becomes longer than the short-circuit prevention time td. That is, in discharge control in which the duty cycle is negative, in the case where transmission power to the battery 2 is negative or zero and step-up control is performed in which output voltage to the first DC power supply 1 is higher than voltage generated at the first winding 3a of the transformer 3, the phase shift amount θ4 is controlled to be greater than the phase shift amount θ3 by an amount exceeding the short-circuit prevention time, irrespective of the duty cycle.

Therefore, in step-up discharge control, it is possible to ensure a period during which only one of the positive-side and negative-side semiconductor switching elements is turned on to generate a route (circulation route) through which current circulates so that the first reactor 9 is excited. Thus, a period during which the charge current i remains constant is eliminated, and the transmission power can be reliably controlled.

As described above, in the present embodiment, in the control by the phase shift method, which has four control modes of step-up charging, step-down charging, step-down discharging, and step-up discharging, the offset phase corresponding to the short-circuit prevention time td is added to both the phase shift amount θ2 in the step-up charge control period and the phase shift amount θ4 in the step-up discharge control period, to perform the control. Thus, deterioration in controllability due to the short-circuit prevention time can be prevented, and the transmission power can be reliably controlled by reliable step-up operation.

Embodiment 3

In the above embodiment 2, as a result of addition of the offset phase, at the first reference point 22, the phase shift amount θ2 and the virtual diagonal ON time t2 become discontinuous, and at the second reference point 23, the phase shift amount θ4 and the virtual diagonal ON time t4 become discontinuous. In the present embodiment 3, control operation for eliminating the above discontinuity will be described.

Figure 61:
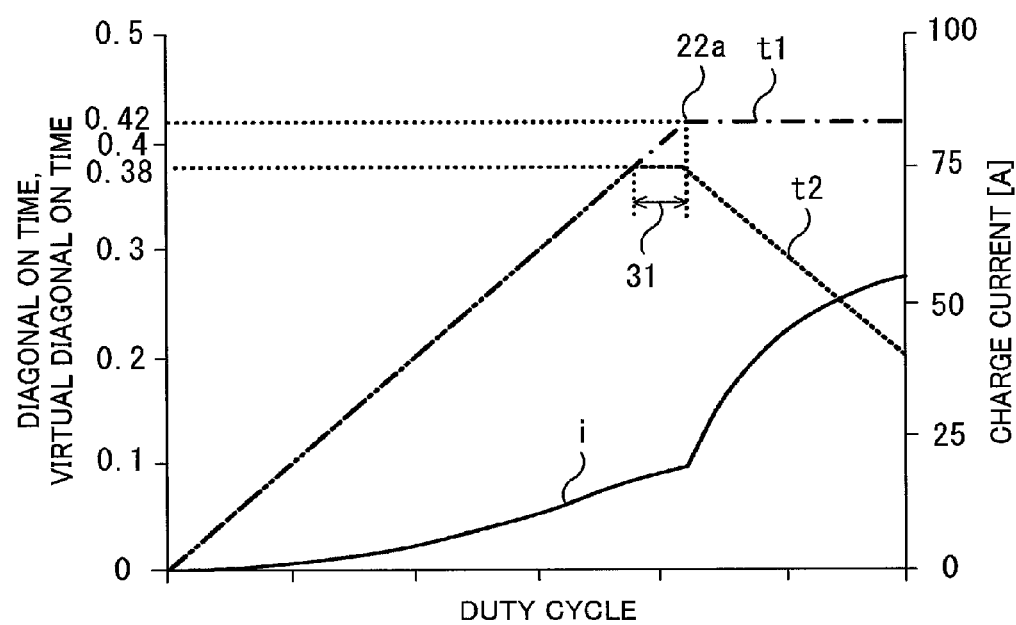
FIG. 61 is a waveform diagram showing charge current in the battery charge/discharge device according to embodiment 3 of the present invention.

FIG. 61 is a waveform diagram illustrating control operation of the battery charge/discharge device 100 according to the present embodiment 3, and shows the phase shift amounts θ1 to θ4 according to the duty cycle, and the diagonal ON times t1, t3 and the virtual diagonal ON times t2, t4. Only a difference from the control operation shown in FIG. 57 in the above embodiment 2 will be described.

As shown in FIG. 61, a first adjustment period 31 immediately close to the first reference point 22 is provided in the step-down charge control period during which two phase shift amounts θ1, θ2 are controlled to be decreased at an equal amount in accordance with increase in the duty cycle. During the first adjustment period 31, only the phase shift amount θ1 is decreased, and the phase shift amount θ2 is kept at a phase greater than the minimum value (short-circuit prevention time td) by the offset phase (short-circuit prevention time td). In charge control, step-up operation is not actually performed until the difference between the two phase shift amounts θ1, θ2 exceeds the short-circuit prevention time td, and therefore step-up operation is not performed in the first adjustment period 31.

Similarly, a second adjustment period 32 immediately close to the second reference point 23 is provided in the step-down discharge control period during which the two phase shift amounts θ3, θ4 are controlled to be decreased at an equal amount in accordance with negative-direction increase in the duty cycle. During the second adjustment period 32, only the phase shift amount θ3 is decreased, and the phase shift amount θ4 is kept at a phase greater than the minimum value (short-circuit prevention time td) by the offset phase (short-circuit prevention time td). In discharge control, step-up operation is not actually performed until the difference between the two phase shift amounts θ3, θ4 exceeds the short-circuit prevention time td, and therefore step-up operation is not performed in the second adjustment period 32.

FIG. 61 shows transition of the charge current i in charge control obtained by such control as described above. A period during which the charge current i remains constant is not present in the step-up charge control period. In this case, since the voltage value of the battery 2 is set to be lower than the voltage value of the DC power supply 1, the charge current i changes even in the step-down charge control period. It is noted that, in the case where the voltage value of the battery 2 is set to be higher than the voltage value of the DC power supply 1, in the step-down charge control period, the charge current i does not change and becomes a constant value, i.e., zero.

Also in discharge control, a period during which the charge current i remains constant is not present in the step-up discharge control period, though not shown.

As described above, providing the first and second adjustment periods 31 and 32 enables elimination of discontinuity of the phase shift amounts θ2, θ4 and the virtual diagonal ON times t2, t4 at the first reference point 22 and the second reference point 23. Thus, sharp change in the ON times of the drive signals 21a, 21b can be prevented, and occurrence of oscillation of current or voltage in the first and second switching circuits 5 and 8 can be prevented, whereby the control reliability of the battery charge/discharge device 100 is improved.

Control discontinuity at the first reference point 22 and the second reference point 23 can also be eliminated by other methods, and this will be described with reference to FIG. 62.

Figure 62:
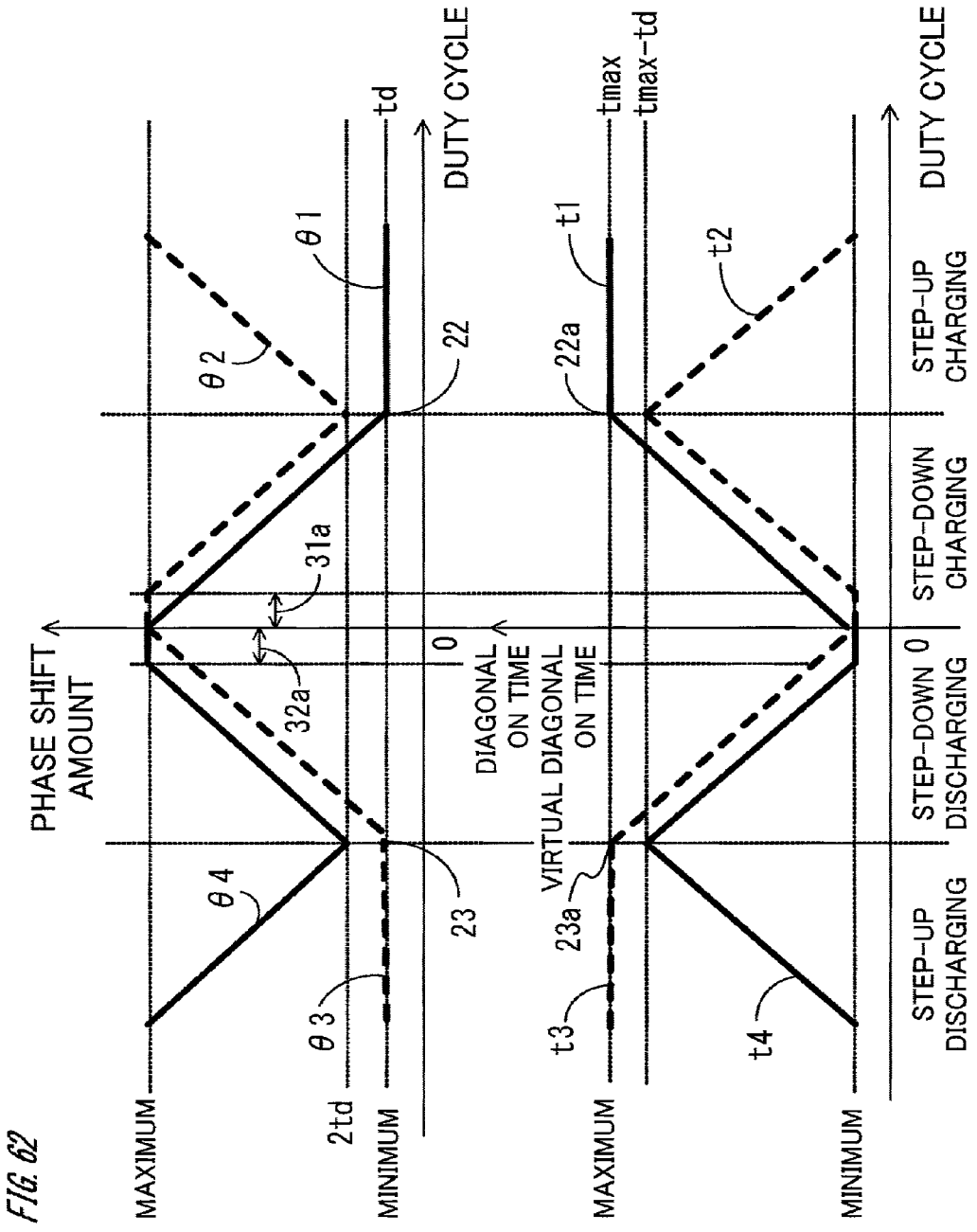
FIG. 62 is a waveform diagram illustrating control operation of a battery charge/discharge device in another example of embodiment 3 of the present invention.

As shown in FIG. 62, a first adjustment period 31a immediately close to the charge/discharge switch point at which the duty cycle is zero is provided in the step-down charge control period during which the two phase shift amounts θ1, θ2 are controlled to be decreased in accordance with increase in the duty cycle. During the first adjustment period 31a, only the phase shift amount θ1 is decreased and the phase shift amount θ2 is kept maximum, and during a period other than the first adjustment period 31a, the two phase shift amounts θ1, θ2 are decreased while the phase shift amount θ2 is kept at a phase greater than the phase shift amount θ1 by the offset phase (short-circuit prevention time td). In charge control, step-up operation is not actually performed until the difference between the two phase shift amounts θ1, θ2 exceeds the short-circuit prevention time td, and therefore step-up operation is not performed in either the first adjustment period 31a or the other period.

Similarly, a second adjustment period 32a immediately close to the charge/discharge switch point at which the duty cycle is zero is provided in the step-down discharge control period during which the two phase shift amounts θ3, θ4 are controlled to be decreased in accordance with negative-direction increase in the duty cycle. During the second adjustment period 32a, only the phase shift amount θ3 is decreased and the phase shift amount θ4 is kept maximum, and during a period other than the second adjustment period 32a, the two phase shift amounts θ3, θ4 are decreased while the phase shift amount θ4 is kept at a phase greater than the phase shift amount θ3 by the offset phase (short-circuit prevention time td). In discharge control, step-up operation is not actually performed until the difference between the two phase shift amounts θ3, θ4 exceeds the short-circuit prevention time td, and therefore step-up operation is not performed in either the second adjustment period 32a or the other period.

Figure 63:
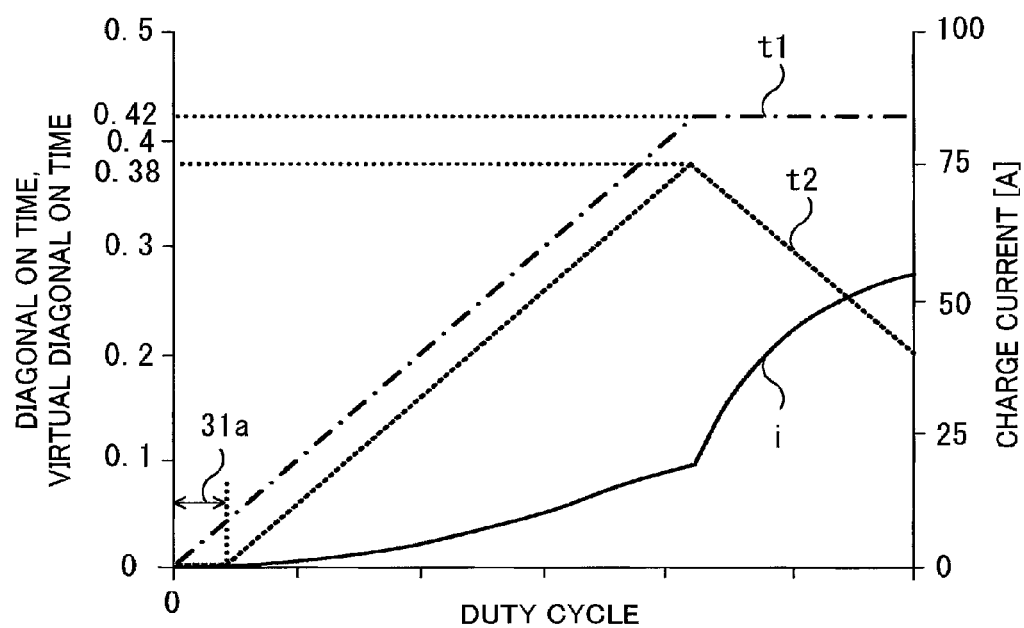
FIG. 63 is a waveform diagram showing charge current of the battery charge/discharge device in another example of embodiment 3 of the present invention.

FIG. 63 shows transition of the charge current i in charge control obtained by such control as described above. A period during which the charge current i remains constant is not present in the step-up charge control period. In this case, since the voltage value of the battery 2 is set to be lower than the voltage value of the DC power supply 1, the charge current i changes even in the step-down charge control period.

Also in discharge control, a period during which the charge current i remains constant is not present in the step-up discharge control period, though not shown.

Also in this case, providing the first and second adjustment periods 31a and 32a enables elimination of discontinuity at the first reference point 22 and the second reference point 23, and sharp change in the ON times of the drive signals 21a, 21b can be prevented. Therefore, occurrence of oscillation of current or voltage in the first and second switching circuits 5 and 8 can be prevented, whereby the control reliability of the battery charge/discharge device 100 can be improved.

Embodiment 4

Next, embodiment 4 of the present invention will be described.

In the above embodiments 1 to 3, control by the phase shift method is used. In the present embodiment 4, the case of using pulse width modulation (PWM) control will be described.

Also in the present embodiment, the circuit configuration of the battery charge/discharge device 100 is the same as that shown in FIG. 1 in the above embodiment 1, and the basic operation of the control circuit 20 shown in FIG. 2 is also the same as in the above embodiment 1.

In the present embodiment, zero voltage switching is not performed, and therefore the capacitors 13 connected in parallel to the semiconductor switching elements Q may be omitted. In the first switching circuit 5, the bridge circuit (Q4A, Q4B) is referred to as a bridge circuit A, and the bridge circuit (Q3A, Q3B) is referred to as a bridge circuit B. In the second switching circuit 8, the bridge circuit (Q2A, Q2B) is referred to as a bridge circuit C, and the bridge circuit (Q1A, Q1B) is referred to as a bridge circuit D.

In general, control by the phase shift method is employed in the case of performing zero voltage switching by using a resonance phenomenon. However, in the case of not performing zero voltage switching, the ON time which is a pulse width is adjusted by PWM control while the phase at which each semiconductor switching element is turned on is fixed.

Figure 64:
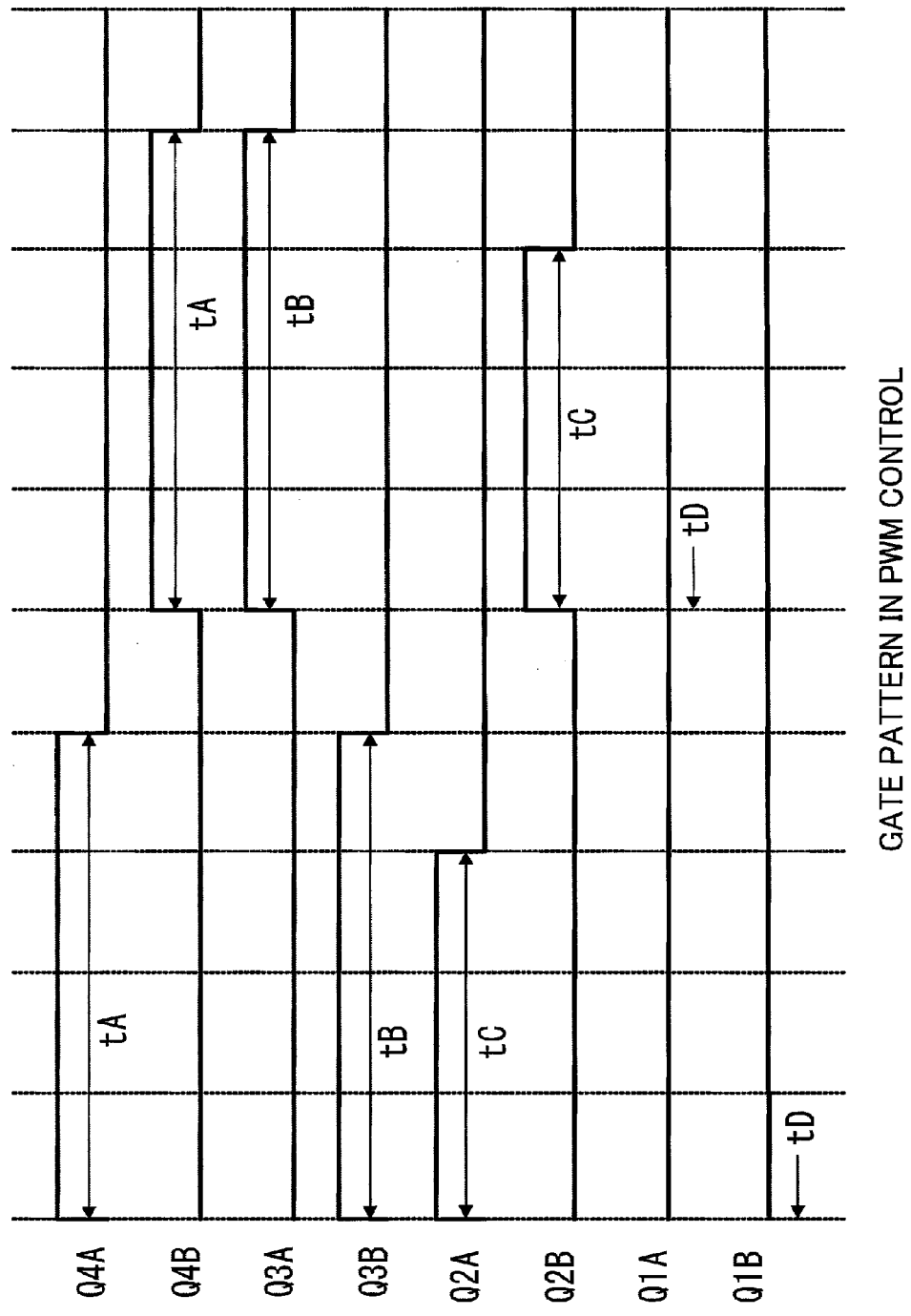
FIG. 64 is a waveform diagram of drive signals in PWM control of a battery charge/discharge device according to embodiment 4 of the present invention.

FIG. 64 is a diagram showing waveforms of drive signals 21a, 21b by PWM control in the battery charge/discharge device 100 according to embodiment 4 of the present invention. In FIG. 64, for convenience sake, the drive signals for Q4A, Q4B, Q3A, Q3B, Q2A, Q2B, Q1A, Q1B are denoted by the reference characters of these elements. In addition, tA, tB, tC, tD denote the ON times of the semiconductor switching elements in the bridge circuits A, B, C, D, respectively. In this case, the ON time tD of the bridge circuit D is zero.

The drive signals Q4A, Q3B, Q2A, Q1B are signals of which timings of rising, i.e., turning on, are at the same phase, and the drive signals Q4B, Q3A, Q2B, Q1A are signals that lag from the phase of Q4A, Q3B, Q2A, Q1B by half cycle.

Figure 65:
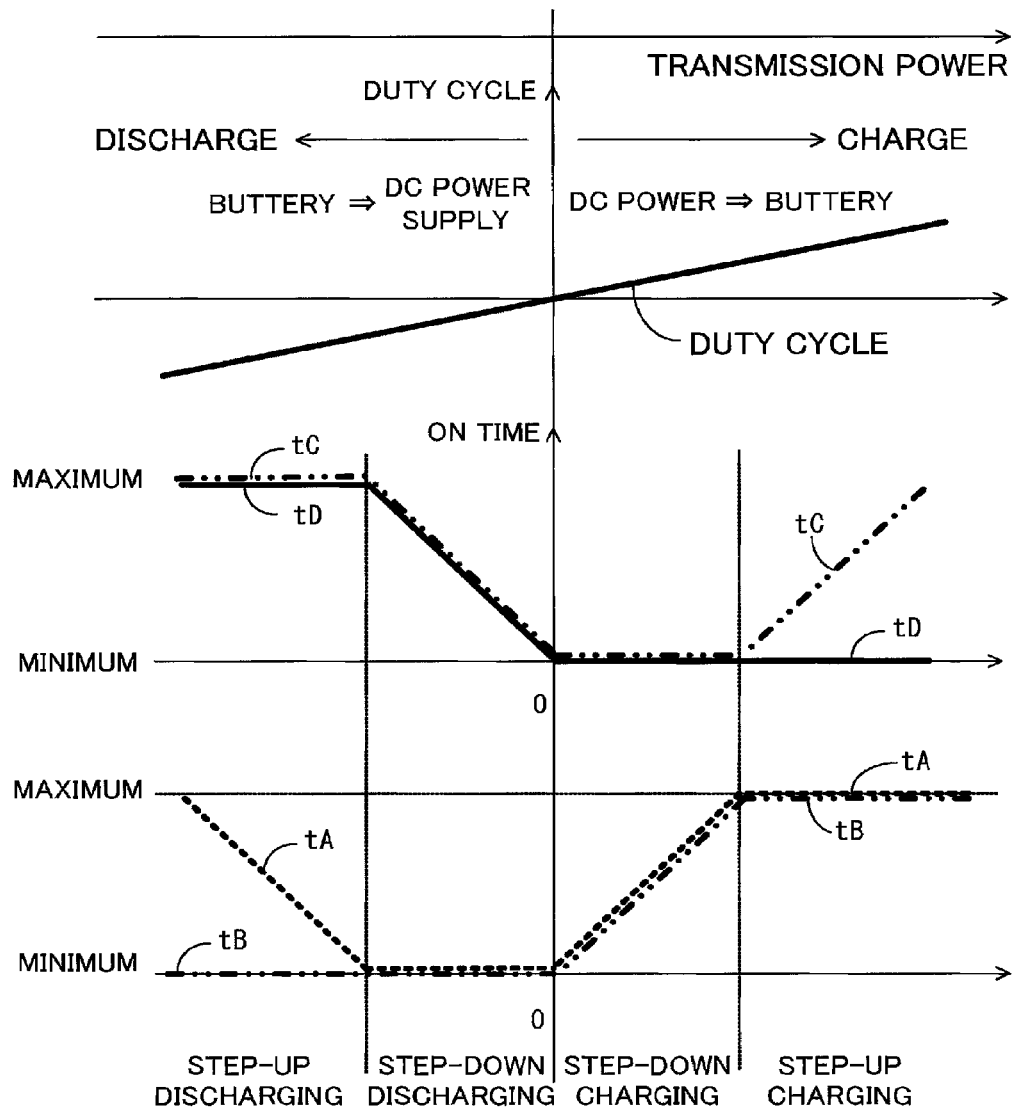
FIG. 65 is a waveform diagram illustrating control operation of the battery charge/discharge device according to embodiment 4 of the present invention.

FIG. 65 is a waveform diagram illustrating control operation of the battery charge/discharge device 100 according to the present embodiment 4. In this case, power in the charging direction is defined as positive.

As shown in FIG. 65, the control circuit 20 changes the ON times tA, tB, tC, tD of the semiconductor switching elements in the bridge circuits A, B, C, D in accordance with the duty cycle, thereby providing four control modes of step-up charging, step-down charging, step-down discharging, and step-up discharging. The duty cycle is determined in the same manner as in the above embodiment 1.

At the point at which the duty cycle is zero, the control is switched between the charge control and the discharge control. Here, it is assumed that the charge control is performed when the duty cycle is positive or zero, and the discharge control is performed when the duty cycle is negative.

Regarding charge control, step-down charge control and then step-up charge control will be described.

In step-down charge control, when the duty cycle increases, the ON time tA of the bridge circuit A and the ON time tB of the bridge circuit B are increased at an equal value from zero to maximum, and the ON time tC of the bridge circuit C and the ON time tD of the bridge circuit D are kept at zero. In step-up charge control, the ON times tA, tB are kept maximum and the ON time tD is kept at zero, and the ON time tC is increased when the duty cycle increases.

Next, regarding discharge control, step-down discharge control and then step-up discharge control will be described.

In step-down discharge control, when the duty cycle increases in the negative direction, the ON time tC and the ON time tD are increased at an equal value from zero to maximum, and the ON time tA and the ON time tB are kept at zero. In step-up discharge control, the ON times tC, tD are kept maximum and the ON time tB is kept at zero, and the ON time to is increased.

In charge control, when voltage of the battery 2 is higher than voltage generated at the second winding 3b of the transformer 3, step-up charge control is used to provide a period for exciting the second reactor 10 and control the second switching circuit 8 so as to perform step-up operation. In discharge control, when voltage of the DC power supply 1 is higher than voltage generated at the first winding 3a of the transformer 3, step-up discharge control is used to provide a period for exciting the first reactor 9 and control the first switching circuit 5 so as to perform step-up operation.

Figure 66:
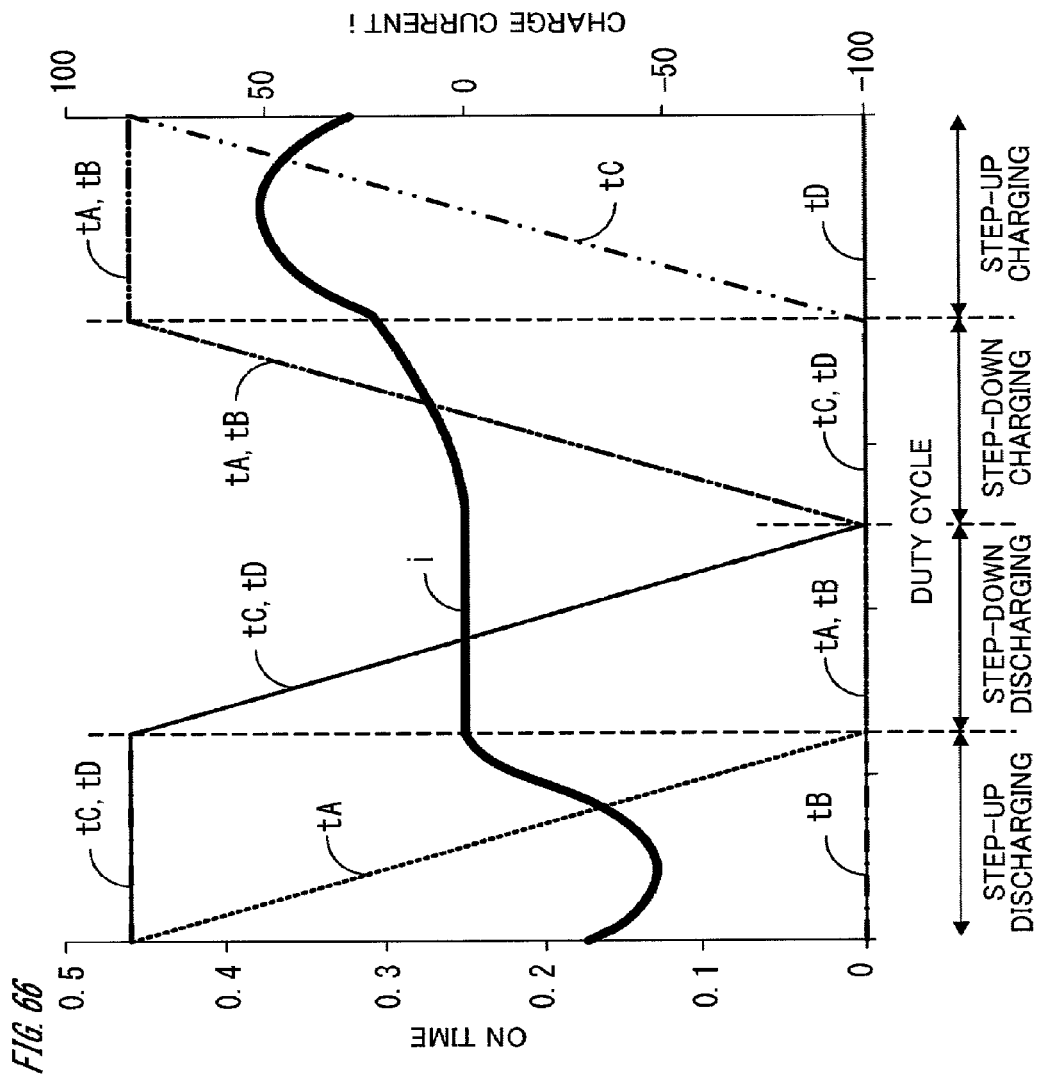
FIG. 66 is a waveform diagram showing charge current in the battery charge/discharge device according to embodiment 4 of the present invention.
Figure 67:
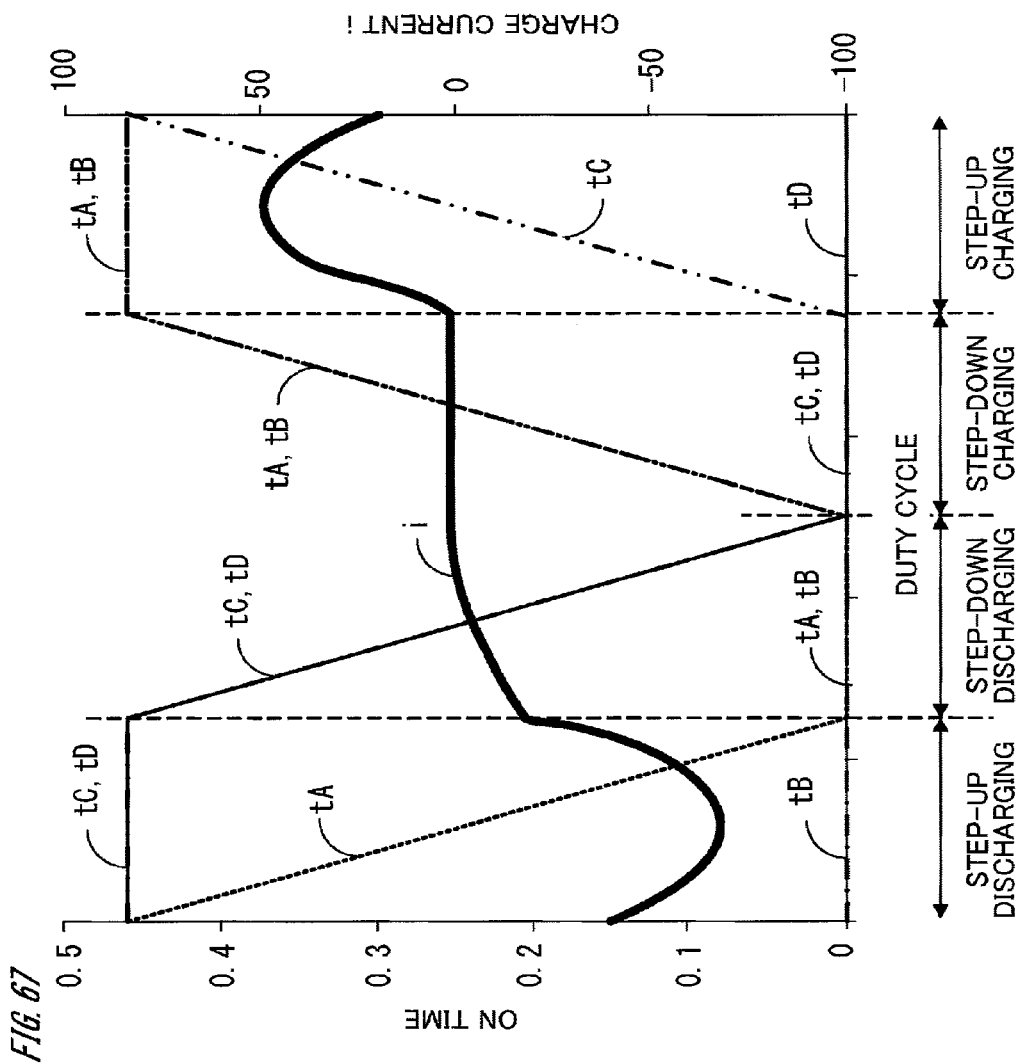
FIG. 67 is a waveform diagram showing charge current in the battery charge/discharge device according to embodiment 4 of the present invention.

FIG. 66 and FIG. 67 show transition of the charge current i obtained by such control as described above. FIG. 66 shows the case where the voltage value of the battery 2 is set to be lower than the voltage value of the DC power supply 1, and the turns ratio of the transformer 3 is set at 1:1. FIG. 67 shows the case where the voltage value of the battery 2 is set to be higher than the voltage value of the DC power supply 1, and the turns ratio of the transformer 3 is set at 1:1. The short-circuit prevention time td is set at 4% of the switching cycle, and normalization is performed with the switching cycle set at 1.

The short-circuit prevention time in PWM control does not overlap the ON time in step-up operation and the ON time in step-down operation, and a phenomenon in which step-up operation cannot be performed due to the short-circuit prevention time does not occur. Therefore, in either case shown in FIG. 66 and FIG. 67, step-up operation can be reliably performed in step-up charge control and step-up discharge control. Thus, the transmission power can be controlled without a period during which the charge current i remains constant.

As shown in FIG. 66, in the case where the voltage value of the battery 2 is set to be lower than the voltage value of the DC power supply 1, during the step-down discharge control period, the charge current i does not change and becomes a constant value, i.e., zero. As shown in FIG. 67, in the case where the voltage value of the battery 2 is set to be higher than the voltage value of the DC power supply 1, during the step-down charge control period, the charge current i does not change and becomes a constant value, i.e., zero.

Embodiment 5

Next, embodiment 5 of the present invention will be described.

Figure 68:
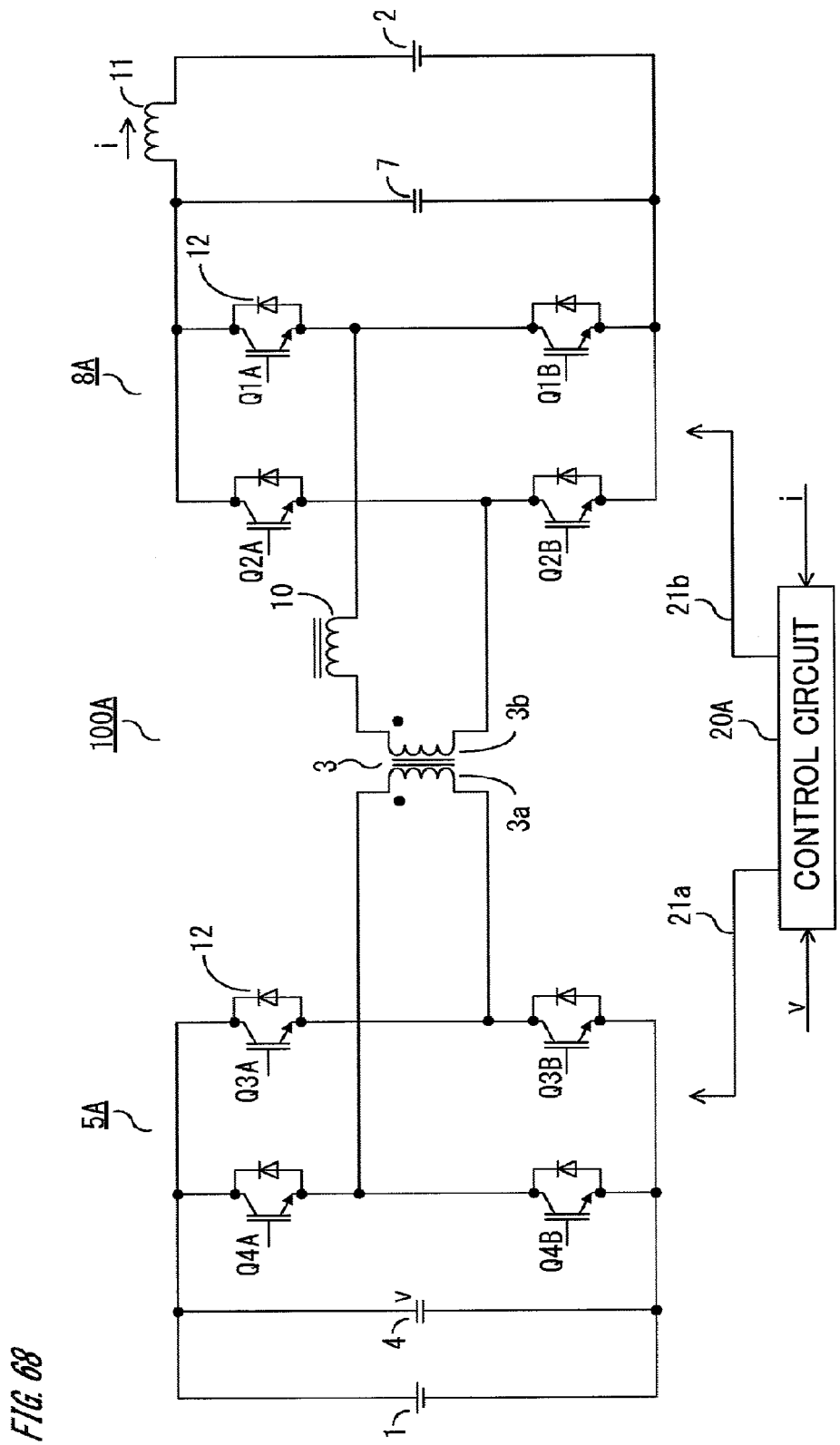
FIG. 68 is a circuit configuration diagram of a battery charge device according to embodiment 5 of the present invention.

FIG. 68 is a diagram showing the circuit configuration of a battery charge device 100A as a DC/DC converter according to embodiment 5 of the present invention. As shown in FIG. 68, the battery charge device 100A charges the battery 2 from the DC power supply 1 through power conversion involving step-up operation and step-down operation.

The battery charge device 100A includes: a high-frequency transformer 3 (hereinafter, simply referred to as a transformer 3) as an isolation transformer; a first smoothing capacitor 4 connected in parallel to the DC power supply 1; a first switching circuit 5A as a first converter unit; a second smoothing capacitor 7 connected in parallel to the battery 2; a second switching circuit 8A as a second converter unit; and a second reactor 10 connected on an AC input/output line of the second switching circuit 8A. The battery charge device 100A further includes a control circuit 20A for controlling the first switching circuit 5A and the second switching circuit 8A.

The first switching circuit 5A is a full-bridge circuit having a plurality of semiconductor switching elements Q4A, Q4B, Q3A, Q3B (hereinafter, simply referred to as Q4A, Q4B, Q3A, Q3B or semiconductor switching elements Q) such as IGBT or MOSFET, to which diodes 12 are respectively connected in antiparallel, and has a DC side connected to the first smoothing capacitor 4 and an AC side connected to a first winding 3a of the transformer 3, to perform power conversion between DC and AC.

The second switching circuit 8A is a full-bridge circuit having a plurality of semiconductor switching elements Q2A, Q2B, Q1A, Q1B (hereinafter, simply referred to as Q2A, Q2B, Q1A, Q1B or semiconductor switching elements Q) such as IGBT or MOSFET, to which diodes 12 are respectively connected in antiparallel, and has a DC side connected to the second smoothing capacitor 7 and an AC side connected to a second winding 3b of the transformer 3, to perform power conversion between DC and AC.

For the second switching circuit 8A, the second reactor 10 is connected on the AC input/output line between the semiconductor switching elements Q and the transformer 3, and the second reactor 10 and the second winding 3b are connected in series. Further, a reactor 11 is connected to the DC side of the second switching circuit 8A.

A current sensor (not shown) for detecting current flowing through the reactor 11 as charge current i (the arrow indicates the positive direction) of the battery 2 is provided between the second smoothing capacitor 7 and the battery 2, and the sensing output is inputted to the control circuit 20A. A voltage sensor (not shown) for detecting voltage v of the first smoothing capacitor 4 is provided, and the sensing output is inputted to the control circuit 20A. The control circuit 20A generates drive signals 21a, 21b for performing switching control of the semiconductor switching elements Q of the first switching circuit 5A and the second switching circuit 8A, on the basis of the values of charge current i and voltage v that are inputted, thereby performing drive control of the first switching circuit 5A and the second switching circuit 8A.

The current sensor for detecting charge current i of the battery 2 may be provided on the second switching circuit 8A side with respect to the second smoothing capacitor 7.

The control and operation in step-up charging and step-down charging of the battery charge device 100A are performed by the same phase shift method as in the above embodiment 2. However, in the above embodiment 2, the battery charge/discharge device 100 performs bidirectional power transmission, whereas in the present embodiment 5, the battery charge device 100A performs unidirectional power transmission only for charging. In addition, in the present embodiment 5, capacitors are not provided in parallel to the semiconductor switching elements Q, and the first reactor is not connected on the AC input/output line of the first switching circuit 5A. Therefore, switching of the first and second switching circuits 5A and 8A is not zero voltage switching.

As described above, the battery charge device 100A according to the present embodiment has two control modes of step-up charging and step-down charging, to perform power transmission from the DC power supply 1 to the battery 2. As in the above embodiment 2, in accordance with the duty cycle (≥0), the control circuit 20A controls the phase shift amount θ1 of the drive signal for the first diagonal element Q3B and the phase shift amount θ2 of the drive signal for the second diagonal element Q2B relative to the phase of the drive signal for the first reference element Q4A.

Figure 69:
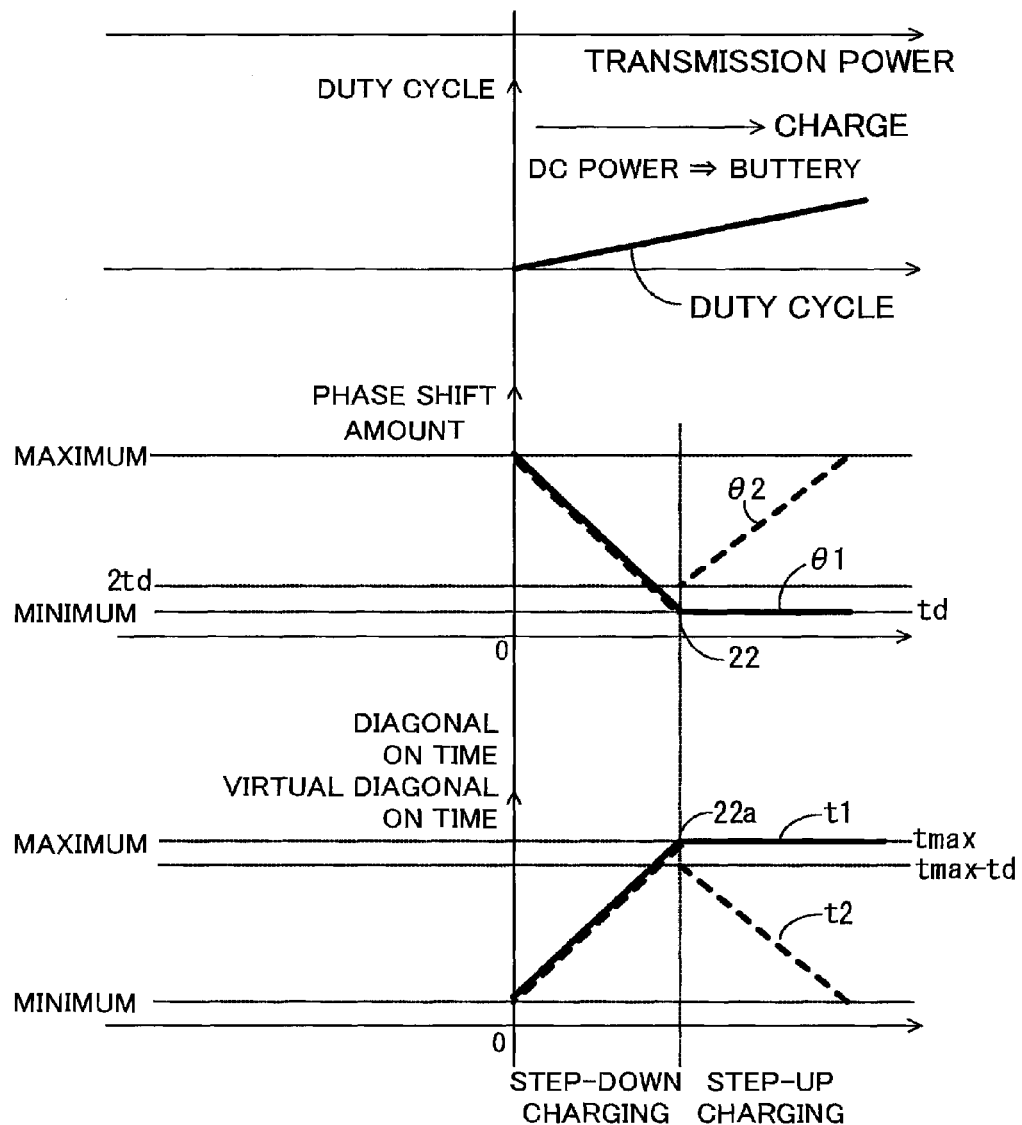
FIG. 69 is a waveform diagram illustrating control operation of the battery charge device according to embodiment 5 of the present invention.

FIG. 69 is a waveform diagram illustrating control operation of the battery charge device 100A according to the present embodiment, and shows the phase shift amounts θ1, θ2 according to the duty cycle, and the diagonal ON time t1 and the virtual diagonal ON time t2. FIG. 69 is the same as the range of duty cycle≥0 in FIG. 57 illustrating the control operation in the above embodiment 2.

As shown in FIG. 69, the control circuit 20A performs control by adding an offset phase to the phase shift amount θ2 in the step-up charge control period. The offset phase is a phase corresponding to the short-circuit prevention time td set for preventing the positive-side semiconductor switching element and the negative-side semiconductor switching element from being turned on at the same time.

In step-up charge control, the phase shift amount θ1 is kept minimum, and the offset phase is added to the value of the phase shift amount θ2 calculated on the basis of the duty cycle. At this time, the diagonal ON time t1 is kept maximum, and the short-circuit prevention time td is subtracted from the calculated value of the virtual diagonal ON time t2.

In this case, transition of the charge current i in step-up charge control is the same as that in the above embodiment 2 (see FIG. 58(b)).

As shown in FIG. 58(b), by adding the offset phase, the difference between the diagonal ON time t1 and the virtual diagonal ON time t2 becomes longer than the short-circuit prevention time td. That is, in charge control in which the duty cycle is positive or zero, in the case where transmission power to the battery 2 is positive or zero and step-up control is performed in which output voltage to the battery 2 is higher than voltage generated at the second winding 3b of the transformer 3, the phase shift amount θ2 is controlled to be greater than the phase shift amount θ1 by an amount exceeding the short-circuit prevention time, irrespective of the duty cycle.

Therefore, in step-up charge control, it is possible to ensure a period during which only one of the positive-side and negative-side semiconductor switching elements is turned on to generate a route (circulation route) through which current circulates so that the second reactor 10 is excited. Thus, a period during which the charge current i remains constant is eliminated, and the transmission power can be reliably controlled. Thus, deterioration in controllability due to the short-circuit prevention time can be prevented, and the transmission power can be reliably controlled by reliable step-up operation.

In the above embodiment 5, power conversion involving step-up operation and step-down operation is applied. However, as in the above embodiment 1, power conversion involving only step-up operation may be applied to perform charging from the DC power supply 1 to the battery 2.

Embodiment 6

In the above embodiment 5, the first and second switching circuits 5A and 8A are not configured to perform zero voltage switching. However, only the first switching circuit on the power supplying side may be configured to perform zero voltage switching.

Figure 70:
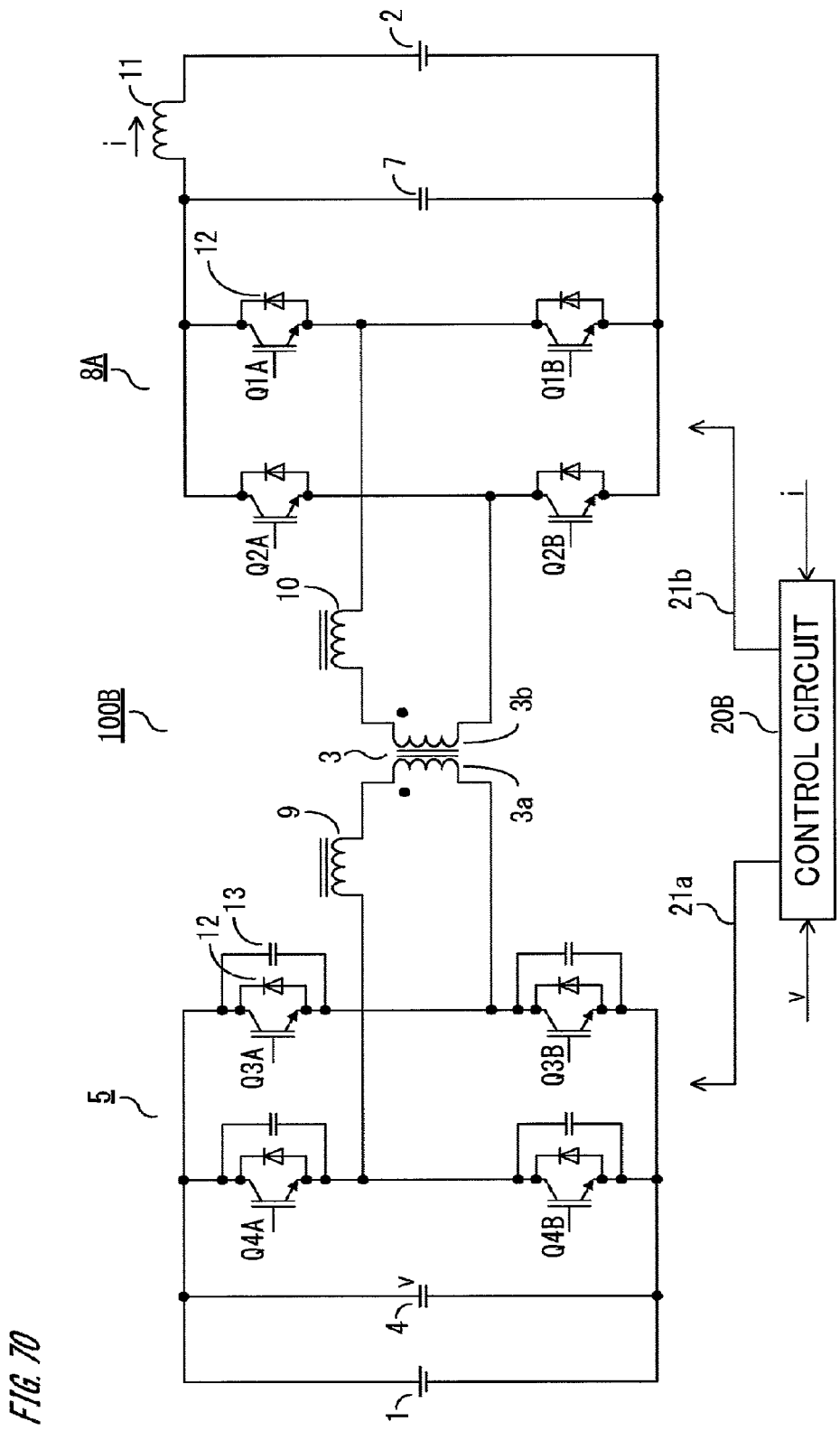
FIG. 70 is a circuit configuration diagram of a battery charge device according to embodiment 6 of the present invention.

FIG. 70 is a diagram showing the circuit configuration of a battery charge device 100B as a DC/DC converter according to embodiment 6 of the present invention.

As shown in FIG. 70, the capacitors 13 are connected in parallel to the respective semiconductor switching elements Q of the first switching circuit 5, and the first reactor 9 is connected on the AC input/output line of the first switching circuit 5. A control circuit 20B controls the first and second phase shift amounts θ1, θ2 in accordance with the duty cycle (≥0), thereby performing control so that each semiconductor switching element Q in the first switching circuit 5 performs zero voltage switching, using the capacitors 13 and the first reactor 9 in the first switching circuit 5.

The other configuration and control are the same as in the above embodiment 5.

In the present embodiment 6, the same effect as in the above embodiment 5 is obtained, and in addition, switching loss can be reduced by zero voltage switching of the first switching circuit 5.

In the above embodiments, the battery 2 is used for one DC power supply (second DC power supply), but the present invention is not limited thereto. Both of the first and second DC power supplies may be configured from batteries.

It is noted that, within the scope of the present invention, the above embodiments may be freely combined with each other, or each of the above embodiments may be modified or simplified as appropriate.

The invention claimed is:

1. A DC/DC converter which performs power transmission between a first DC power supply and a second DC power supply, the DC/DC converter comprising:
   a transformer;
   a first converter unit formed by a full-bridge circuit including two bridge circuits each having a plurality of semiconductor switching elements to which antiparallel diodes are respectively connected, the first converter unit being connected between the first DC power supply and a first winding of the transformer;
   a second converter unit formed by a full-bridge circuit including two bridge circuits each having a plurality of semiconductor switching elements to which antiparallel diodes are respectively connected, the second converter unit being connected between the second DC power supply and a second winding of the transformer;
   a second reactor connected on an AC input/output line of the second converter unit; and
   a control circuit which calculates a duty cycle on the basis of transmission power from the first DC power supply to the second DC power supply and a command value therefor, and performs drive control of the semiconductor switching elements in the first converter unit and the second converter unit, wherein
   in first power transmission from the first DC power supply to the second DC power supply, in which the duty cycle is positive or zero,
      the control circuit controls a first phase shift amount which is a phase shift amount between drive signals for, among the plurality of semiconductor switching elements in the first converter unit, a semiconductor switching element as a first reference element, and a semiconductor switching element as a first diagonal element which is diagonal to the first reference element, and controls a second phase shift amount which is a phase shift amount between drive signals for the first reference element and a semiconductor switching element as a second diagonal element which is diagonal to a semiconductor switching element as a second reference element among the plurality of semiconductor switching elements in the second converter unit, and
      in a case where the transmission power from the first DC power supply to the second DC power supply is positive or zero and step-up control is performed in which output voltage to the second DC power supply is higher than voltage generated at the second winding of the transformer, the control circuit performs control so that, the second phase shift amount becomes greater than the first phase shift amount by an amount exceeding a short-circuit prevention time for the semiconductor switching elements in the first and second converter units.

2. The DC/DC converter according to claim 1, further comprising a first reactor connected on an AC input/output line of the first converter unit, wherein
   in second power transmission from the second DC power supply to the first DC power supply, in which the duty cycle is negative,
      the control circuit controls a third phase shift amount which is a phase shift amount between a drive signal for the second reference element and a drive signal for the second diagonal element, and a fourth phase shift amount which is a phase shift amount between a drive signal for the second reference element and a drive signal for the first diagonal element, and in a case where the transmission power from the first DC power supply to the second DC power supply is negative or zero and step-up control is performed in which output voltage to the first DC power supply is higher than voltage generated at the first winding of the transformer, the control circuit performs control so that, the fourth phase shift amount becomes greater than the third phase shift amount by an amount exceeding the short-circuit prevention time for the semiconductor switching elements in the first and second converter units.

3. The DC/DC converter according to claim 2, wherein parallel capacitors are respectively connected to the plurality of semiconductor switching elements of the first converter unit and the second converter unit, and in the first power transmission, the control circuit, by controlling the first and second phase shift amounts, performs control so that the semiconductor switching elements in the first converter unit perform zero voltage switching, using the first reactor and the parallel capacitors in the first converter unit, and in the second power transmission, the control circuit, by controlling the third and fourth phase shift amounts, performs control so that the semiconductor switching elements in the second converter unit perform zero voltage switching, using the second reactor and the parallel capacitors in the second converter unit.

4. The DC/DC converter according to claim 3, wherein in the first power transmission, during a first period during which the duty cycle is greater than a first reference point at which the first and second phase shift amounts are both minimum, when the duty cycle increases, the control circuit keeps the first phase shift amount minimum and increases the second phase shift amount, and in the second power transmission, during a second period during which the duty cycle is greater in a negative direction than a second reference point at which the third and fourth phase shift amounts are both minimum, when the duty cycle increases in the negative direction, the control circuit keeps the third phase shift amount minimum and increases the fourth phase shift amount.

5. The DC/DC converter according to claim 4, wherein the control circuit
controls the first reference element and the second reference element by drive signals having the same phase,
controls, at a same ON time ratio, the semiconductor switching elements on a positive side and the semiconductor switching elements on a negative side in the four bridge circuits in the first converter unit and the second converter unit,
sets the first reference point and the second reference point as an identical reference point at which the duty cycle is zero, and
performs control by adding an offset phase corresponding to the short-circuit prevention time, to at least one of the second phase shift amount in the first period in the first power transmission and the fourth phase shift amount in the second period in the second power transmission, in accordance with a polarity of the transmission power from the first DC power supply to the second DC power supply when the duty cycle is zero.

6. The DC/DC converter according to claim 5, wherein the control circuit performs control by: if the transmission power is positive when the duty cycle is zero, adding the offset phase to the second phase shift amount in the first period; if the transmission power is negative when the duty cycle is zero, adding the offset phase to the fourth phase shift amount in the second period; and if the transmission power is zero when the duty cycle is zero, adding the offset phase to both the second phase shift amount in the first period and the fourth phase shift amount in the second period.

7. The DC/DC converter according to claim 6, wherein in a case where a turns ratio between the first winding and the second winding of the transformer is set at NL: NB, the control circuit performs control by: when a voltage value of the first DC power supply is greater than NL/NB times of a voltage value of the second DC power supply, adding the offset phase to the second phase shift amount in the first period; when the voltage value of the first DC power supply is smaller than NL/NB times of the voltage value of the second DC power supply, adding the offset phase to the fourth phase shift amount in the second period; and when the voltage value of the first DC power supply is equal to NL/NB times of the voltage value of the second DC power supply, adding the offset phase to both the second phase shift amount in the first period and the fourth phase shift amount in the second period.

8. The DC/DC converter according to claim 5, wherein in a case where a turns ratio between the first winding and the second winding of the transformer is set at NL:NB, the control circuit performs control by: when a voltage value of the first DC power supply is greater than NL/NB times of a voltage value of the second DC power supply, adding the offset phase to the second phase shift amount in the first period; when the voltage value of the first DC power supply is smaller than NL/NB times of the voltage value of the second DC power supply, adding the offset phase to the fourth phase shift amount in the second period; and when the voltage value of the first DC power supply is equal to NL/NB times of the voltage value of the second DC power supply, adding the offset phase to both the second phase shift amount in the first period and the fourth phase shift amount in the second period.

9. The DC/DC converter according to claim 4, wherein in the first power transmission,
the control circuit turns off all the semiconductor switching elements of the bridge circuit that includes the second reference element among the four bridge circuits in the first and second converter units,
the control circuit controls, at a same ON time ratio, the semiconductor switching elements on a positive side and the semiconductor switching elements on a negative side in the other three bridge circuits, and
during a period during which the duty cycle is equal to or smaller than the first reference point, when the duty cycle increases, the control circuit performs control by decreasing both the first and second phase shift amounts,
in the second power transmission,
the control circuit turns off all the semiconductor switching elements of the bridge circuit that includes the first reference element among the four bridge circuits in the first and second converter units,
the control circuit controls, at the same ON time ratio, the semiconductor switching elements on the positive side and the semiconductor switching elements on the negative side in the other three bridge circuits, and during a period during which a negative-direction magnitude of the duty cycle is equal to or smaller than the second reference point, when the negative-direction magnitude of the duty cycle increases, the control circuit performs control by decreasing both the third and fourth phase shift amounts, when the first and second phase shift amounts are maximum at an equal amount in the first power transmission, and when the third and fourth phase shift amounts are maximum at an equal amount in the second power transmission, the control circuit switches between the first power transmission and the second power transmission, and the control circuit performs control by adding an offset phase corresponding to the short-circuit prevention time to both the second phase shift amount in the first period in the first power transmission and the fourth phase shift amount in the second period in the second power transmission.

10. The DC/DC converter according to claim 9, wherein in the first power transmission, during the period during which the duty cycle is equal to or smaller than the first reference point, excluding a first adjustment period immediately close to the first reference point, the control circuit controls the first and second phase shift amounts so as to be decreased at an equal amount in accordance with the duty cycle, and during the first adjustment period, the control circuit decreases only the first phase shift amount and keeps the second phase shift amount, and in the second power transmission, during the period during which the negative-direction magnitude of the duty cycle is equal to or smaller than the second reference point, excluding a second adjustment period immediately close to the second reference point, the control circuit controls the third and fourth phase shift amounts so as to be decreased at an equal amount in accordance with the duty cycle, and during the second adjustment period, the control circuit decreases only the third phase shift amount and keeps the fourth phase shift amount.

11. The DC/DC converter according to claim 9, wherein in the first power transmission, during the period during which the duty cycle is equal to or smaller than the first reference point, excluding a first adjustment period immediately close to a point at which the duty cycle is zero, the control circuit controls the second phase shift amount so as to be a phase greater than the first phase shift amount by the offset phase, and during the first adjustment period, the control circuit decreases only the first phase shift amount and keeps the second phase shift amount, and in the second power transmission, during the period during which the negative-direction magnitude of the duty cycle is equal to or smaller than the second reference point, excluding a second adjustment period immediately close to the point at which the duty cycle is zero, the control circuit controls the fourth phase shift amount so as to be a phase greater than the third phase shift amount by the offset phase, and during the second adjustment period, the control circuit decreases only the third phase shift amount and keeps the fourth phase shift amount.

12. The DC/DC converter according to claim 1, further comprising a first reactor connected on an AC input/output line of the first converter unit, wherein parallel capacitors are respectively connected to the plurality of semiconductor switching elements of the first converter unit, and in the first power transmission, the control circuit, by controlling the first and second phase shift amounts, performs control so that the semiconductor switching elements in the first converter unit perform zero voltage switching, using the parallel capacitors and the first reactor.

13. A DC/DC converter which performs bidirectional power transmission between a first DC power supply and a second DC power supply, the DC/DC converter comprising:

a transformer;

a first converter unit formed by a full-bridge circuit including a bridge circuit A and a bridge circuit B each having a plurality of semiconductor switching elements to which antiparallel diodes are respectively connected, the first converter unit being connected between the first DC power supply and a first winding of the transformer and performing bidirectional power conversion between DC and AC;

a second converter unit formed by a full-bridge circuit including a bridge circuit C and a bridge circuit D each having a plurality of semiconductor switching elements to which antiparallel diodes are respectively connected, the second converter unit being connected between the second DC power supply and a second winding of the transformer and performing bidirectional power conversion between DC and AC;

a first reactor and a second reactor connected on AC input/output lines of the first converter unit and the second converter unit, respectively; and a control circuit which calculates a duty cycle on the basis of transmission power from the first DC power supply to the second DC power supply and a command value therefor, and performs drive control of the semiconductor switching elements in the first converter unit and the second converter unit by PWM control, wherein in first power transmission from the first DC power supply to the second DC power supply, in which the duty cycle is positive or zero, the control circuit uses:

a first control in which, when the duty cycle increases, an ON time tA of the semiconductor switching elements in the bridge circuit A and an ON time tB of the semiconductor switching elements in the bridge circuit B are increased at an equal value to maximum, and an ON time tC of the semiconductor switching elements in the bridge circuit C and an ON time tD of the semiconductor switching elements in the bridge circuit D are both kept at zero; and a second control in which the ON times tA and tB are kept maximum and the ON time tD is kept at zero, and the ON time tC is increased when the duty cycle increases, and in a case where voltage of the second DC power supply is higher than voltage generated at the second winding of the transformer, control is performed to provide a period for exciting the second reactor so that the second converter unit performs step-up operation, in second power transmission from the second DC power supply to the first DC power supply, in which the duty cycle is negative, the control circuit uses:

a third control in which, when the duty cycle increases in a negative direction, the ON time tC and the ON time tD are increased at an equal value to maximum, and the ON time tA and the ON time tB are both kept at zero; and a fourth control in which the ON times tC and tD are kept maximum and the ON time tB is kept at zero, and the ON time tA is increased, and in a case where voltage of the first DC power supply is higher than voltage generated at the first winding of the transformer, control is performed to provide a period for exciting the first reactor so that the first converter unit performs step-up operation, and when the ON times tA and tB are minimum in the first power transmission, and when the ON times tC and tD are minimum in the second power transmission, the control circuit switches between the first power transmission and the second power transmission.

\* \* \* \* \*